United States Patent
Takahashi

(10) Patent No.: US 8,040,583 B2
(45) Date of Patent: Oct. 18, 2011

(54) LIQUID DEVICE, LIQUID DEVICE MANUFACTURING APPARATUS AND METHOD, AND IMAGE DISPLAY DEVICE

(75) Inventor: Kenichi Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 110 days.

(21) Appl. No.: 12/522,675

(22) PCT Filed: Jan. 10, 2008

(86) PCT No.: PCT/JP2008/050165
§ 371 (c)(1),
(2), (4) Date: Jul. 9, 2009

(87) PCT Pub. No.: WO2008/084822
PCT Pub. Date: Jul. 17, 2008

(65) Prior Publication Data
US 2010/0053717 A1  Mar. 4, 2010

(30) Foreign Application Priority Data

Oct. 1, 2007  (JP) .................................. 2007-002552
Oct. 1, 2007  (JP) .................................. 2007-002553

(51) Int. Cl.
*G02B 26/02* (2006.01)
(52) U.S. Cl. ....................................................... 359/228
(58) Field of Classification Search ................... 359/228
See application file for complete search history.

(56) References Cited

U.S. PATENT DOCUMENTS

2009/0059348 A1 * 3/2009 Niwano et al. ................. 359/296

FOREIGN PATENT DOCUMENTS

| JP | 2004-252444 | 9/2004 |
| JP | 2005-233954 | 9/2005 |
| JP | 2006-259040 | 9/2006 |
| JP | 2006-285031 | 10/2006 |

OTHER PUBLICATIONS

International Search Report dated Apr. 15, 2008.

* cited by examiner

*Primary Examiner* — Euncha Cherry
(74) *Attorney, Agent, or Firm* — K&L Gates LLP

(57) ABSTRACT

The present invention relates to a liquid device, liquid device manufacturing apparatus and method, and an image display device that are so configured as to achieve increase in the capacitance and allow suppression of breakdown. An insulating film 43 having a higher insulating property and a higher dielectric constant than a water-repellent film 44 is newly formed between a lower electrode 42 and the water-repellent film 44, to thereby compensate for the dielectric strength and suppress breakdown. As the material of the insulating film 43, one having a higher insulating property and a higher dielectric constant is preferable. For example, polymer materials and inorganic materials are cited. For example, SOG is a silica-based inorganic coating material. A solution thereof is applied and deposited by a spin-coating method or the like, followed by being turned to glass through baking at a comparatively-low temperature. The present invention can be applied to a liquid device.

8 Claims, 43 Drawing Sheets

|  | AT-201 | AT-732 | AT-902 |
|---|---|---|---|
| RELATIVE DIELECTRIC CONSTANT | 6.5 | 14 | 20 |
| BAKING TEMPERATURE | 300 | 300 | 300 |

|  | COMPARATIVE EXAMPLE 1 | WORKING EXAMPLE 1 | WORKING EXAMPLE 2 | WORKING EXAMPLE 3 |
|---|---|---|---|---|
| INSULATING FILM THICKNESS (nm) | - | 100 | 100 | 200 |
| WATER-REPELLEMENT FILM THICKNESS (nm) | 300 | 150 | 80 | 80 |
| GAP BETWEEN ELECTRODES ($\mu$m) | 100 | 100 | 100 | 100 |

|  | WORKING EXAMPLE 1 | WORKING EXAMPLE 4 | WORKING EXAMPLE 5 |
|---|---|---|---|
| RELATIVE DIELECTRIC CONSTANT OF INSULATING FILM | 20 | 14 | 6.5 |
| INSULATING FILM THICKNESS (nm) | 100 | 100 | 100 |
| WATER-REPELLEMENT FILM THICKNESS (nm) | 150 | 150 | 150 |
| GAP BETWEEN ELECTRODES ($\mu$m) | 100 | 100 | 100 |

FIG. 51

| | COMPARATIVE EXAMPLE 2 | WORKING EXAMPLE 6 | WORKING EXAMPLE 7 |
|---|---|---|---|
| INSULATING FILM THICKNESS (nm) | - | 100 | 100 |
| WATER-REPELLEMENT FILM THICKNESS (nm) | 800 | 150 | 150 |
| GAP BETWEEN ELECTRODES ($\mu$m) | 100 | 100 | 100 |
| APPLIED RECTANGULAR-WAVE AMPLITUDE VOLTAGE (V) | 20 | 10 | 15 |

LIQUID DEVICE, LIQUID DEVICE MANUFACTURING APPARATUS AND METHOD, AND IMAGE DISPLAY DEVICE

CROSS REFERENCE TO RELATED APPLICATIONS

The present application is to claim the right of priority on the basis of Japanese Patent Applications No. 2007-002552 and No. 2007-002553 filed in Japan on Jan. 10, 2007, and these applications are incorporated herein by reference.

BACKGROUND

The present invention relates to a liquid device, liquid device manufacturing apparatus and method, and an image display device, and particularly to a liquid device, liquid device manufacturing apparatus and method, and an image display device that are so configured as to achieve increase in the dielectric constant and be capable of suppressing the occurrence of breakdown.

Conventionally, there is an electrowetting technique in which deformation and displacement of a liquid are generated by utilizing electrowetting of controlling the electrostatic wettability and the desired effect is achieved by this phenomenon, and utilizing this technique in various fields is considered.

For example, for an optical shutter employing a liquid crystal, various improvement methods are carried out, such as improvement in the angle between the liquid crystal molecules and the polarizer absorption axis (refer to e.g. Patent document 1), improvement in electric field application (refer to e.g. Patent document 2 and Patent document 3), alignment treatment (refer to e.g. Patent document 4), and provision of recesses and projections on a substrate (refer to e.g. Patent document 5). However, all of the cases involve problems such as low light extraction efficiency and very-low response speed, and a method of using the above-described electrowetting technique instead of these methods is considered.

Furthermore, for example, as methods for increasing the number of parallaxes in a three-dimensional display device, there is a method in which a micro-lens array is moved relative to a light-emitting pixel and light is refracted to plural directions (refer to e.g. Patent document 6) and a method in which the position of the droplet of a liquid lens is controlled (refer to e.g. Patent document 7). However, a method of using the electrowetting technique instead of these methods is considered.

Moreover, utilizing this electrowetting technique also for a focus variable lens whose focal length is arbitrarily varied, flow path control of a liquid, a liquid pump, and so on is considered.

The principle of such an electrowetting technique will be described.

FIG. 1 is a diagram showing a basic configuration example of a liquid device to which the electrowetting technique is applied.

As shown in FIG. 1, in a liquid device 1, an insulating water-repellent film 12 having water repellency against a polar liquid 13 is formed on one electrode 11, and the other electrode 14 is provided for the polar liquid 13 disposed on the water-repellent film 12. The voltage of a power supply 15 is applied between the electrode 11 and the electrode 14. The wettability of the polar liquid 13 to the water-repellent film 12 changes depending on the magnitude of this applied voltage, and the contact angle θ between the polar liquid 13 and the water-repellent film 12 changes. That is, the interfacial shape of the polar liquid 13 changes. Therefore, for example, the liquid device 1 can exert influences on the optical path of transmission light that passes through this polar liquid by controlling the magnitude of the applied voltage.

More specifically, the following equations (1) to (3) apply to the wettability of the polar liquid 13 to the water-repellent film 12.

$$\gamma_{LV}\cos\theta = \gamma_{SV}\gamma_{SL} + \gamma_{EW} \quad (1)$$

$$\gamma_{EW} = d \times \sigma_L^2 / 2 \times \epsilon_0 \times \epsilon_r \quad (2)$$

$$\sigma_L = \epsilon_0 \times \epsilon_r \times V/d \quad (3)$$

In these equations, $\gamma_{LV}$ denotes the interfacial tension between the liquid and the vapor. $\gamma_{SV}$ denotes the interfacial tension between the solid and the vapor. $\gamma_{SL}$ denotes the interfacial tension between the solid and the liquid. $\gamma_{EW}$ denotes the interfacial tension dependent on the intensity of the electric field. $\epsilon_0$ denotes the permeability of vacuum. $\epsilon_r$ denotes the relative dielectric constant of the water-repellent film 12. Furthermore, V denotes the magnitude of the applied voltage, and d denotes the length between the electrodes.

That is, the wettability of the polar liquid 13 to the water-repellent film 12 changes depending on the magnitude of the applied voltage, and the polar liquid 13 deforms or moves.

In addition to this, there is also e.g. a method in which the polar liquid 13 is moved or deformed by changing the voltage application position. The principle of this method is similar to that of the above-described case. Moreover, there is also another method. In this method, in addition to the polar liquid 13, a nonpolar liquid that does not mix with the polar liquid 13 and is not affected by the applied voltage is provided. This nonpolar liquid is pushed by the polar liquid 13 whose shape is changed by the applied voltage, so that the shape of the nonpolar liquid changes. The desired effect is achieved by this shape change of the nonpolar liquid. The principle of this method is similar to that of the case of FIG. 1.

Patent document 1: Japanese Patent Laid-open No. 2005-284261
Patent document 2: Japanese Patent Laid-open No. 2003-262847
Patent document 3: Japanese Patent Laid-open No. 2002-131717
Patent document 4: Japanese Patent Laid-open No. 2002-148625
Patent document 5: Japanese Patent Laid-open No. 2000-347171
Patent document 6: Japanese Patent Laid-open No. 2002-176660
Patent document 7: Japanese Patent Laid-open No. 2003-215478

SUMMARY

Technical Problem

However, the conventional methods are impractical because the drive voltage is as very high as about 30 V and the power consumption as the device is possibly too high.

In order to drive the liquid device 1 with lower voltage, increase in the capacitance of the liquid device 1, i.e. increase in the dielectric constant of the water-repellent film 12 and reduction in the thickness of the water-repellent film 12, is required as indicated by Equations (1) to (3).

However, the relative dielectric constant of the material used as the water-repellent film 12 is normally as very low as about 2, and the reduction in the thickness possibly causes breakdown even with very low voltage. Therefore, in order to avoid the breakdown, the thickness of the water-repellent film 12 needs to be set large, which possibly leads to high operating voltage.

The present invention is made in view of these circumstances and is to achieve increase in the capacitance and allow suppression of the breakdown.

Technical Solution

A first aspect of the present invention is a liquid device having a first electrode and a second electrode between which voltage is applied, an insulating part that is formed on the surface of the first electrode and structurally insulates the first electrode from the second electrode, and a liquid that is disposed between the insulating part and the second electrode and has polarity. An electric field is applied to the insulating part through voltage application between the first electrode and the second electrode to thereby control the wettability of the surface of the insulating part to the liquid and cause deformation or displacement of the liquid. The insulating part is formed of a double-layer structure with a first layer and a second layer. The first layer is formed between the second layer and the surface of the first electrode and has a higher dielectric property and a higher insulating property than the second layer. The second layer is formed between the first layer and the liquid and has higher water repellency than the first layer.

The following configuration is possible. Specifically, the first electrode is composed of a plurality of electrodes and the surface of the whole of the first electrode is not a flat surface. Furthermore, the first layer is so formed that recesses and projections on the surface of the whole of the first electrode are absorbed and the surface of the first layer becomes a flat surface.

A second aspect of the present invention is a liquid device manufacturing apparatus that manufactures a liquid device having a first electrode and a second electrode between which voltage is applied, an insulating part that is formed on the surface of the first electrode and structurally insulates the first electrode from the second electrode, and a liquid that is disposed between the insulating part and the second electrode and has polarity. An electric field is applied to the insulating part through voltage application between the first electrode and the second electrode to thereby control the wettability of the surface of the insulating part to the liquid and cause deformation or displacement of the liquid. The liquid device manufacturing apparatus has first forming means that forms a first layer having a high dielectric property and a high insulating property as the insulating part on the surface of a transparent substrate on which the first electrode is disposed, and second forming means that forms a second layer having higher water repellency than the first layer as the insulating part on the surface of the first layer formed by the first forming means.

The first forming means can form the first layer by using a spin-coating method in which the film thickness is rendered uniform by utilizing centrifugal force.

If the first electrode is composed of a plurality of electrodes and the surface of the whole of the first electrode is not a flat surface, the first forming means can form the first layer in such a way that recesses and projections on the surface of the whole of the first electrode are absorbed and the surface becomes a flat surface.

The second aspect of the present invention is also a liquid device manufacturing method of a liquid device manufacturing apparatus that manufactures a liquid device having a first electrode and a second electrode between which voltage is applied, an insulating part that is formed on the surface of the first electrode and structurally insulates the first electrode from the second electrode, and a liquid that is disposed between the insulating part and the second electrode and has polarity. An electric field is applied to the insulating part through voltage application between the first electrode and the second electrode to thereby control the wettability of the surface of the insulating part to the liquid and cause deformation or displacement of the liquid. The liquid device manufacturing method has a first forming step of forming a first layer having a high dielectric property and a high insulating property as the insulating part on the surface of a transparent substrate on which the first electrode is disposed, and a second forming step of forming a second layer having higher water repellency than the first layer as the insulating part on the surface of the first layer formed by treatment of the first forming step.

A third aspect of the present invention is an image display device that displays an image by emitting light. The image display device has a liquid device having a first electrode and a second electrode between which voltage is applied, an insulating part that is formed on the surface of the first electrode and structurally insulates the first electrode from the second electrode, and a liquid that is disposed between the insulating part and the second electrode and has polarity. An electric field is applied to the insulating part through voltage application between the first electrode and the second electrode to thereby control the wettability of the surface of the insulating part to the liquid and cause deformation or displacement of the liquid. The insulating part is formed of a double-layer structure with a first layer and a second layer. The first layer is formed between the second layer and the surface of the first electrode and has a higher dielectric property and a higher insulating property than the second layer. The second layer is formed between the first layer and the liquid and has higher water repellency than the first layer. The light that is emitted is caused to pass through the liquid device, and the amount or direction of the light is controlled based on deformation or displacement of the liquid by the liquid device.

The following configuration is possible. Specifically, the first electrode is composed of a plurality of electrodes and the surface of the whole of the first electrode is not a flat surface. Furthermore, the first layer is so formed that recesses and projections on the surface of the whole of the first electrode are absorbed and the surface of the first layer becomes a flat surface.

In the first aspect of the present invention, the insulating part that is formed on the surface of the first electrode and structurally insulates the first electrode from the second electrode is formed of the double-layer structure with the first layer and the second layer. The first layer having a higher dielectric property and a higher insulating property than the second layer is formed between the second layer and the surface of the first electrode, and the second layer having higher water repellency than the first layer is formed between the first layer and the liquid.

In the second aspect of the present invention, the first layer having a high dielectric property and a high insulating property is formed as the insulating part on the surface of the transparent substrate on which the first electrode is disposed. On the surface of the first layer, the second layer having higher water repellency than the first layer is formed as the insulating part.

In the third aspect of the present invention, the liquid device is provided. This liquid device includes the first electrode and the second electrode between which voltage is applied, the insulating part that is formed on the surface of the first electrode and structurally insulates the first electrode from the second electrode, and the liquid that is disposed between the insulating part and the second electrode and has polarity. In this liquid device, an electric field is applied to the insulating part through voltage application between the first electrode and the second electrode to thereby control the wettability of the surface of the insulating part to the liquid and cause deformation or displacement of the liquid. The insulating part is formed of the double-layer structure with the first layer and the second layer. The first layer having a higher dielectric property and a higher insulating property than the second layer is formed between the second layer and the surface of the first electrode. The second layer having higher water repellency than the first layer is formed between the first layer and the liquid. The emitted light is caused to pass through the liquid device, and the amount or direction of the light is controlled based on the deformation or displacement of the liquid by the liquid device.

Advantageous Effects

According to the present invention, the deformation and displacement of a liquid can be caused by utilizing electrowetting of controlling the electrostatic wettability. In particular, increase in the capacitance is achieved and breakdown can be suppressed, which allows the lowering of the power consumption and enhancement in the reliability.

Additional features and advantages of the present invention are described in, and will be apparent from, the following Detailed Description and the Figures.

BRIEF DESCRIPTION OF DRAWINGS

FIG. 51 is a table showing another example of experimental conditions.

Figure 1:
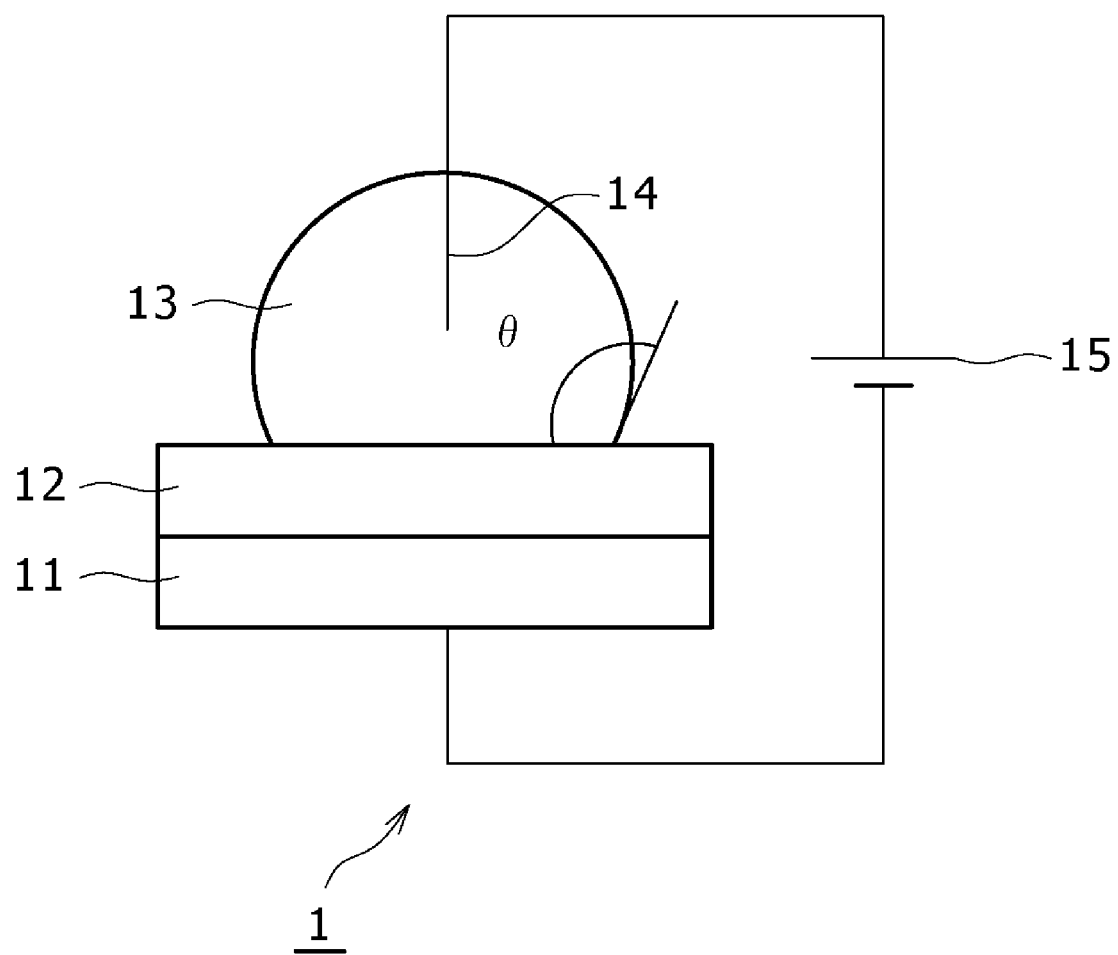
FIG. 1 is a diagram for explaining the operation principle of a liquid device.

EXPLANATION OF REFERENCE NUMERALS 31 liquid device, 41 lower substrate, 42 lower electrode, 43 insulating film, 44 water-repellent film, 45 rib, 46 nonpolar liquid, 47 polar liquid, 48 upper electrode, 49 upper substrate, 61 power supply, 62 switch unit, 101 manufacturing apparatus, 111 controller, 133 insulating film forming section, 134 water-repellent thin film forming section, 301 image display device, 321 liquid device, 601 image display device, 612 parallax generator, 641 liquid lens

DETAILED DESCRIPTION

Embodiments of the present invention will be described below.

Figure 2:
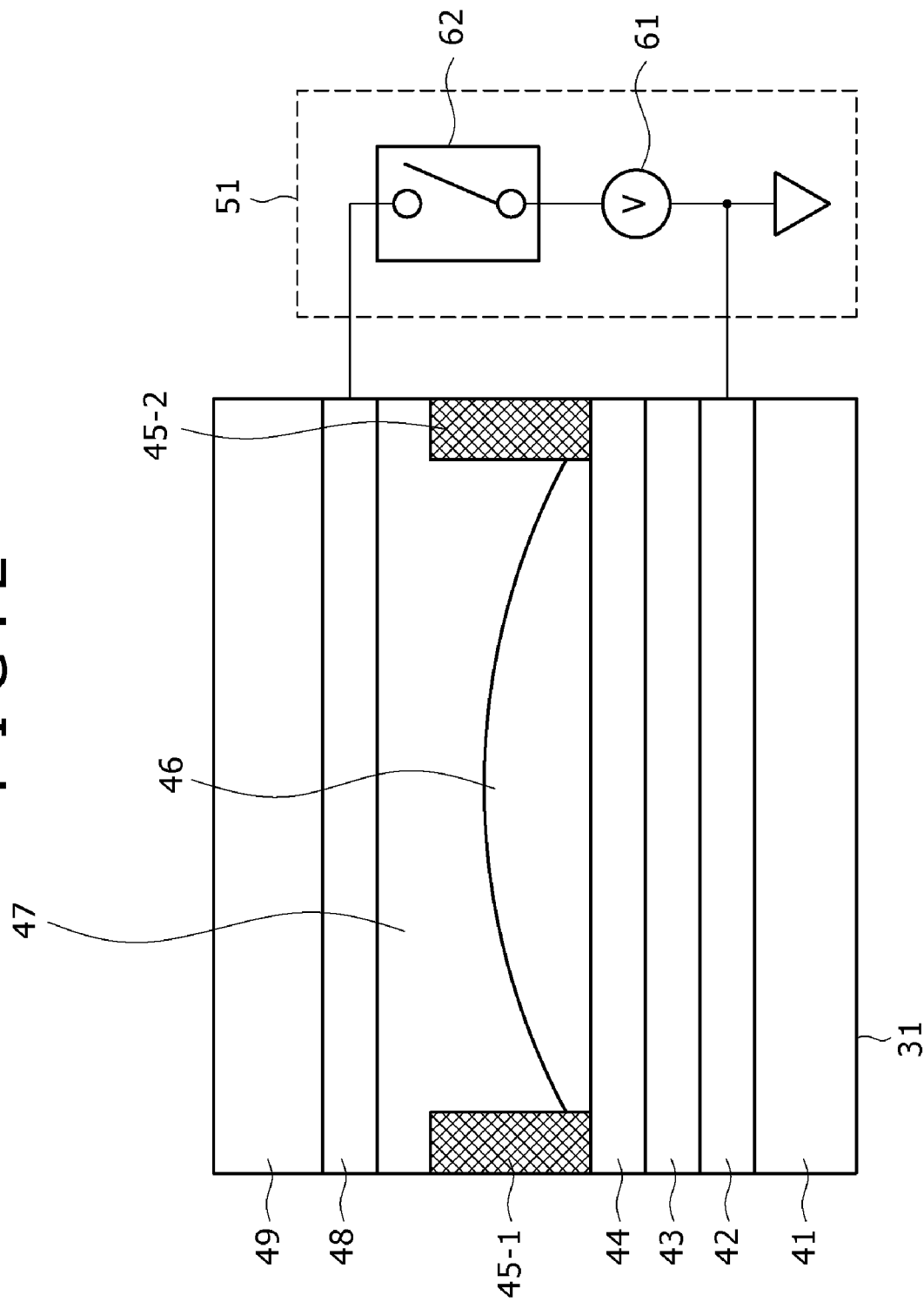
FIG. 2 is a diagram showing a configuration example of a liquid device to which the present invention is applied.

FIG. 2 is a sectional view for explaining a configuration example of a liquid device to which the present invention is applied.

The liquid device refers to an electrooptical element that generates deformation and displacement of a liquid by utilizing electrowetting of controlling the electrostatic wettability and achieves the desired effect by using this phenomenon. FIG. 2 shows a configuration example of a liquid device 31 that exerts optical influences on transmission light that passes through the liquid device 31 along the upward and downward directions in the drawing.

As shown in FIG. 2, the liquid device 31 forms a multilayer structure composed of a lower substrate 41, a lower electrode 42, an insulating film 43, a water-repellent film 44, a rib 45-1, a rib 45-2, a nonpolar liquid 46, a polar liquid 47, an upper electrode 48, and an upper substrate 49.

The lower substrate 41 and the upper substrate 49 are formed by using a transparent material that allows the passage of light, such as glass or silicon.

The lower electrode 42 and the upper electrode 48 are electrodes for applying voltage to the insulating film 43 and the water-repellent film 44 as described later, and are formed of a transparent electrode composed of e.g. ITO (indium tin oxide) or ZnO (zinc oxide). It is obvious that another material having the characteristics similar to these materials may be used. To the lower electrode 42 and the upper electrode 48 of this liquid device 31, voltage is applied by a controller 51 as described later.

The insulating film 43 and the water-repellent film 44 are an insulating part for structurally insulating the lower electrode 42 and the upper electrode 48. As the insulating film 43, e.g. a film composed of a material whose insulating property and dielectric constant are higher than at least those of the water-repellent film 44, such as a polymer material or an inorganic material, is used. Specific examples of the material of the insulating film 43 will be described later.

The water-repellent film 44 is in contact with the nonpolar liquid 46 and the polar liquid 47, which is a movable part. Therefore, it is preferable that the water-repellent film 44 be composed of a material whose hydrophobicity against these liquids is high, and the water-repellent film 44 is formed by using a substance having water repellency higher than at least that of the insulating film 43. Furthermore, the water-repellent film 44 serves also as a layer for structurally insulating the lower electrode 42 and the upper electrode 48 as described above. Therefore, it is preferable that the water-repellent film 44 be composed of a material whose dielectric constant is also high. For example, it is formed by using PVdF or PTFE, which is a fluorinated polymer. As other materials, e.g. Teflon (registered trademark) AF (AF1601S series) made by DuPont Co. and Cytop made by Asahi Glass Co., Ltd. are cited. However, the relative dielectric constants of these water-repellent films are each about 2, which is extremely lower than that of the insulating film 43. It is obvious that another material having the characteristics similar to these materials may be used.

The rib 45-1 and the rib 45-2 are partition that separates the parts through which light passes, of the arranged liquid devices, from each other. They are so formed as to surround the nonpolar liquid 46 (and a part of the polar liquid 47) applied on the part through which light passes. Although the liquid device 31 is often used solely, it is frequently used in such a way that the plural liquid devices 31 are arranged in a planar manner. For example, the plural liquid devices 31 are often so arranged in a planar manner and used that one liquid device 31 corresponds to one pixel in an image display device, an imaging device, or the like. The rib 45-1 and the rib 45-2 are partition that separates adjacent liquid devices from each other in such a case.

That is, although the rib 45-1 and the rib 45-2 are shown in FIG. 2 in such a manner as to be separated into two portions because FIG. 2 is a sectional view, they are continuous with each other and are formed as one component in practice. Hereinafter, if there is no need to make a description with distinguishing between the rib 45-1 and the rib 45-2, they will be referred to as the rib 45. In addition, the part surrounded by this rib 45 will be referred to as a rib pixel. It is desired that this rib 45 does not dissolve in the polar liquid 47 and the nonpolar liquid 46 and does not react with them. Typically a polymer resin is used, and e.g. an epoxy resin or an acrylic resin is used. It is obvious that another material having the characteristics similar to these resins may be used.

The nonpolar liquid 46 and the polar liquid 47 are formed in the rib pixel. These two droplets form two layers because they do not mix with each other but are separated from each other. As the nonpolar liquid 46, e.g. a hydrocarbon material such as decane, dodecane, hexadecane, or undecane, or silicone oil is used. As the polar liquid 47, typically an aqueous solution prepared by dissolving an electrolyte such as potassium chloride or sodium chloride in water is used.

As described above, this liquid device 31 is provided with the controller 51 for voltage application. A power supply 61 and a switch unit 62 are provided in the controller 51. The switch unit 62 has two states: on-operation of electrically connecting both the terminals to each other; and off-operation of electrically disconnecting both the terminals. The supply voltage of the power supply 61 is variable within a predetermined range and can be set to any voltage as long as this voltage is within the range. The range of this supply voltage may be any. For example, the minimum value may be 0 volts and the maximum value may be such a voltage that the nonpolar liquid 46 is sufficiently deformed as described later and troubles such as breakdown do not occur.

The controller 51 is so configured as to be capable of applying voltage with any magnitude within the allowable range between the lower electrode 42 and the upper electrode 48 through control of the operation of the switch unit 62 and the supply voltage of the power supply 61. For example, in the case of the example of FIG. 2, one electrode of the power supply 61 is connected to the upper electrode 48 via the switch unit 62 and the other electrode of the power supply 61 is connected to the lower electrode 42. In response to the on-operation of the switch unit 62, i.e. the connecting thereof, the voltage set in the power supply 61 is applied to the lower electrode 42 and the upper electrode 48. In response to the off-operation of the switch unit 62, i.e. the disconnecting thereof, the potential difference between the lower electrode 42 and the upper electrode 48 becomes zero. This power supply 61 may be any power supply, and the switch unit 62 may also be any component as long as it can control the voltage application between the lower electrode 42 and the upper electrode 48 by the power supply 61.

Due to this voltage application between the upper electrode 48 and the lower electrode 42, an electric field is generated in the polar liquid 47. Specifically, due to the application of any voltage between the upper electrode 48 and the lower electrode 42, the wettability (interfacial tension) between the polar liquid 47 and the water-repellent film 44 changes depending on the magnitude of the voltage. Thus, due to the deformation (movement) of the polar liquid 47, the nonpolar liquid 46 is deformed (moved). Depending on the deformation (movement) amount of the nonpolar liquid 46, optical influences such as transmittance control and optical path control are exerted on transmission light that passes through the rib pixel of the liquid device 31 along the upward and downward directions in the drawing.

The nonpolar liquid 46 may be any liquid as long as it does not mix with the polar liquid 47 and deforms (moves) as a result of change in the wettability between the water-repellent film 44 and the polar liquid 47 due to voltage application. Furthermore, the polar liquid 47 may be any substance as long as it is a transparent liquid that does not mix with the nonpolar liquid 46 and its wettability to the water-repellent film 44 changes depending on the voltage applied between the lower electrode 42 and the upper electrode 48. In addition, it is preferable that the nonpolar liquid 46 and the polar liquid 47 have low viscosity in order to enhance the response speed.

As above, in the liquid device 31, to which the present invention is applied, the insulating film 43 is newly provided in addition to the water-repellent film 44 as the insulating part for structurally insulating the lower electrode 42 from the upper electrode 48.

Figures 3, 4:
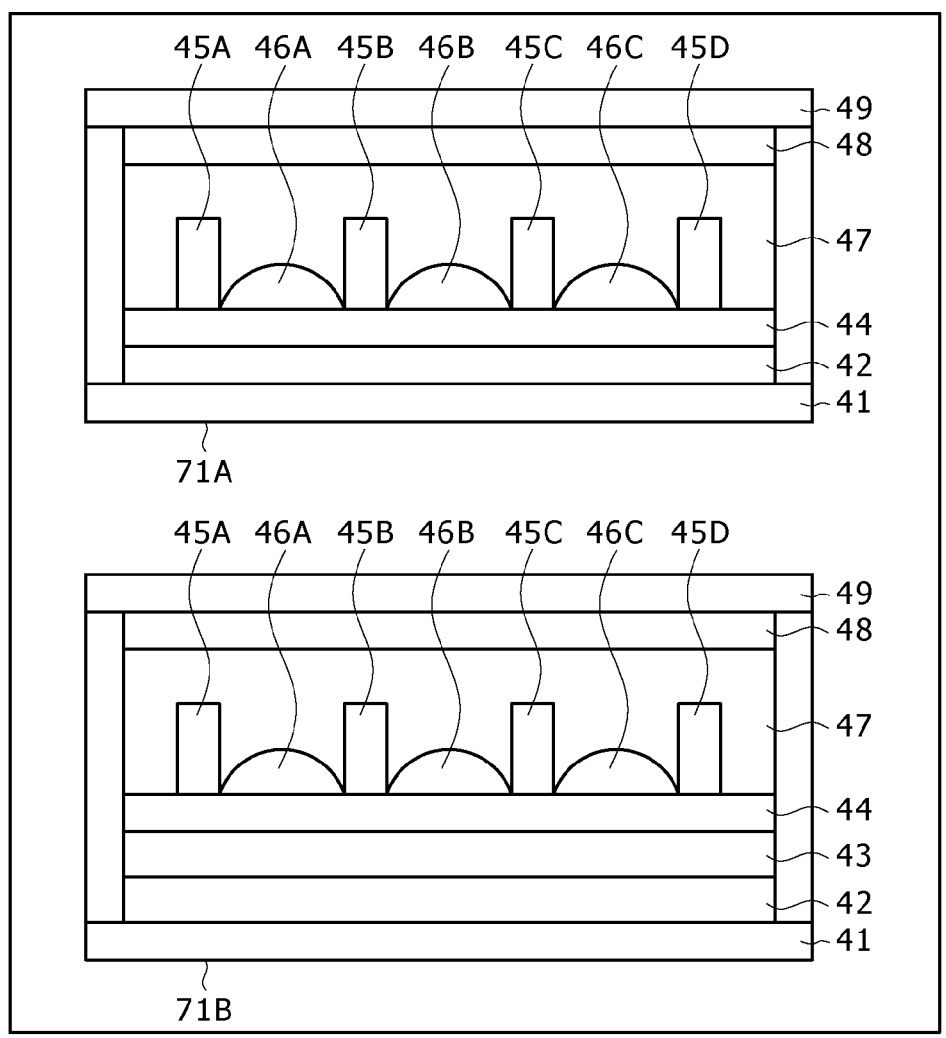
FIG. 3 is a diagram showing a configuration example of a liquid device array.
FIG. 4 is a diagram showing examples of the relative dielectric constant of an insulating film.

A liquid device array 71A shown on the upper side of FIG. 3 is obtained by arranging the conventional liquid devices in an array, and a liquid device array 71B shown on the lower side of FIG. 3 is obtained by arranging the liquid devices 31, to which the present invention is applied, in an array.

As shown in FIG. 3, in the conventional liquid device array 71A, only the water-repellent film 44 is formed on the upper surface of the lower electrode 42. In contrast, in the liquid device array 71B, to which the present invention is applied, the insulating film 43 is newly formed between the lower electrode 42 and the water-repellent film 44.

The water-repellent film 44 has the insulating property as well as the hydrophobicity. Therefore, it is possible to structurally insulate the lower electrode 42 and the upper electrode 48 with only the water-repellent film 44. However, the dielectric strength of the water-repellent film 44 is low, and the film thickness thereof needs to be set large in order to keep sufficient strength. However, if the film thickness is increased, the dielectric constant is lowered. Thus, the drive voltage is increased, which possibly causes increase in the power consumption and so on.

To address this, in the liquid device array 71B, to which the present invention is applied, the insulating film 43 having insulating property and dielectric constant higher than those of the water-repellent film 44 is newly formed between the lower electrode 42 and the water-repellent film 44, to thereby compensate for the dielectric strength and suppress breakdown. That is, the liquid device array 71B achieves the insulating property by the insulating film 43 and achieves water repellency by the water-repellent film 44. Furthermore, in the liquid device array 71B, increase in the dielectric constant, which is difficult to achieve for the water-repellent film 44 because the water repellency and a high relative dielectric constant contradict each other, is also achieved by the insulating film 43. Moreover, reduction in the thickness of the water-repellent film 44 is also achieved because high strength is ensured by the insulating film 43.

It is preferable that the material of the insulating film 43 have higher insulating property and higher dielectric constant. For example, polymer materials and inorganic materials are cited. Some of the polymer materials have a high dielectric constant due to the molecular design thereof. In contrast, when they are in a thin film state, the electrical stability and breakdown strength thereof are not so high. On the other hand, some of the inorganic materials have high insulating property and high dielectric constant. For example, Spin-On-glass (SOG) is available. The SOG is a silica-based inorganic coating material. A solution thereof is applied and deposited by a spin-coating method or the like, followed by being turned to glass through baking at a comparatively-low temperature. Examples of the silica-based inorganic insulating coating material include AT-201, AT-732, and AT-902 (made by Nissan Chemical Industries, Ltd.), which are commercially available as insulating hard coat films for electrode protection. The relative dielectric constants and baking temperature of them are shown in the table of FIG. 4.

As shown in the table of FIG. 4, the baking temperature of these coating materials is about 300° C. and therefore these materials can be used even when glass is used as the substrate. This baking temperature is lower than 500° C., which is the baking temperature of general SOG. This allows easy manufacturing of the liquid device. Furthermore, while the relative dielectric constant of silica ($SiO2$) is about 2, the relative dielectric constants of these materials are as extremely high as 6.5 to 20, and extremely higher than that of the general water-repellent film 44, whose relative dielectric constant is about 2. Thus, increase in the dielectric constant can be achieved compared with the conventional liquid device. It is obvious that the insulating film 43 may be formed by using another material having the characteristics similar to these materials.

Figure 5:
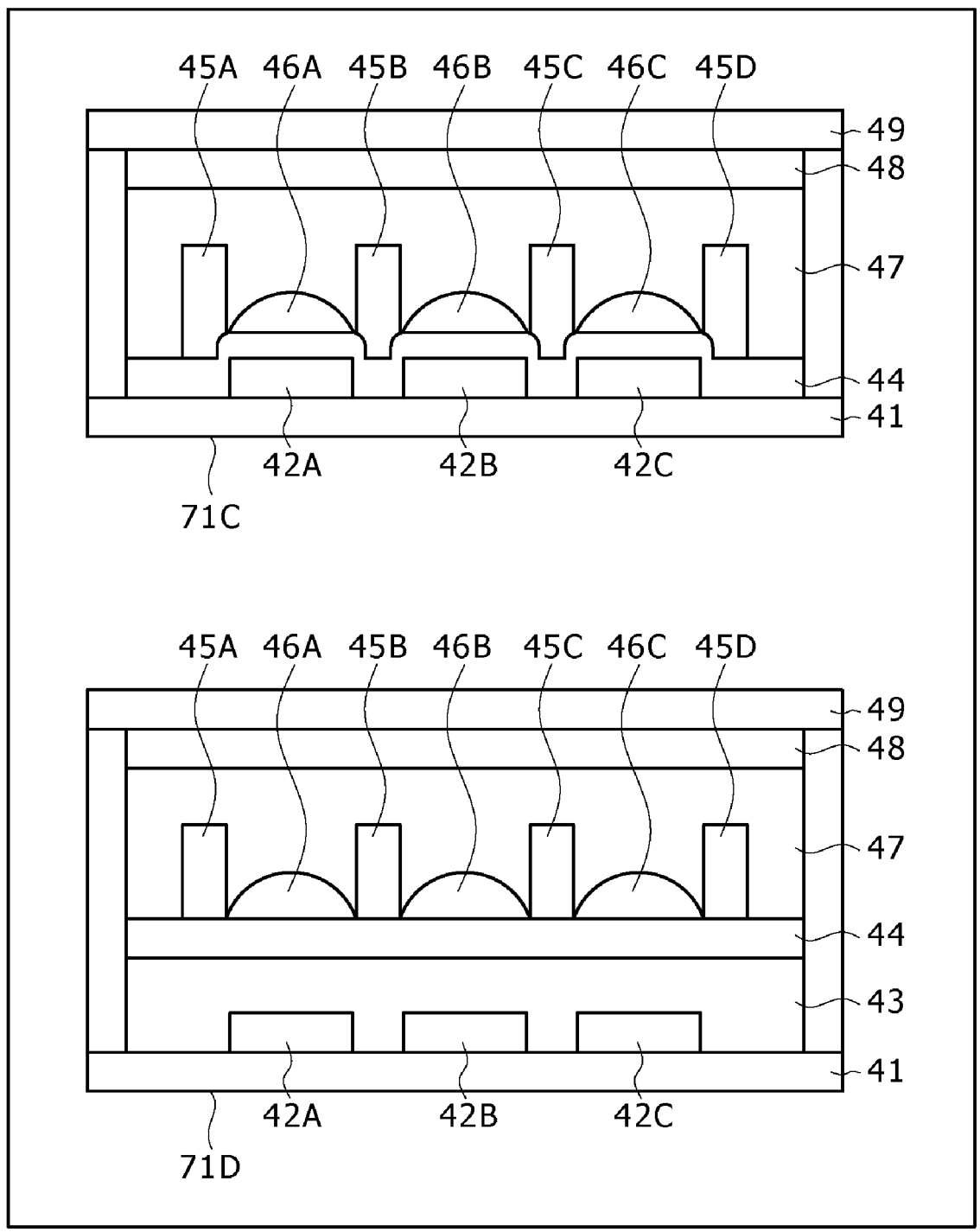
FIG. 5 is a diagram showing a configuration example of the liquid device array.

Moreover, there is a case in which the lower electrode 42 is subjected to patterning as shown in FIG. 5 in the liquid device array. A liquid device array 71C shown on the upper side of FIG. 5 is obtained by arranging the conventional liquid devices of this case in an array, and a liquid device array 71D shown on the lower side of FIG. 5 is obtained by arranging the liquid devices 31, to which the present invention is applied, of this case in an array.

For example, in the case of the liquid device array 71A and the liquid device array 71B shown in FIG. 3, a common voltage is applied to the respective liquid devices included in the liquid device array, and therefore the respective liquid devices operate similarly to each other. In contrast, in the liquid device array 71C and the liquid device array 71D shown in FIG. 5, the lower electrodes 42 of the respective liquid devices are independent of each other like lower electrodes 42A to 42C, and different voltages can be applied to them. That is, the respective liquid devices can operate independently of each other.

As shown in FIG. 3, if the lower electrode 42 is formed as a layer in the whole of the liquid device array and is not subjected to patterning (if it is a so-called blanket-film electrode), the thickness of the lower electrode 42 is uniform across the whole of the liquid device array. On the other hand, as shown in FIG. 5, if the lower electrode 42 is subjected to patterning, the thicknesses of the lower electrodes 42 are not uniform across the whole of the liquid device array. Moreover, the thickness of the lower electrode 42 is often not uniform as a whole in each liquid device.

In such a case, as shown on the upper side of FIG. 5, recesses and projections are formed also in the water-repellent film 44 due to recesses and projections of the lower electrodes 42 in the conventional liquid device array 71C. In contrast, as shown on the lower side of FIG. 5, recesses and projections are not generated in the water-repellent film 44 because the upper surface is planarized by the insulating film 43 in the liquid device array 71D, to which the present invention is applied.

Figure 6:
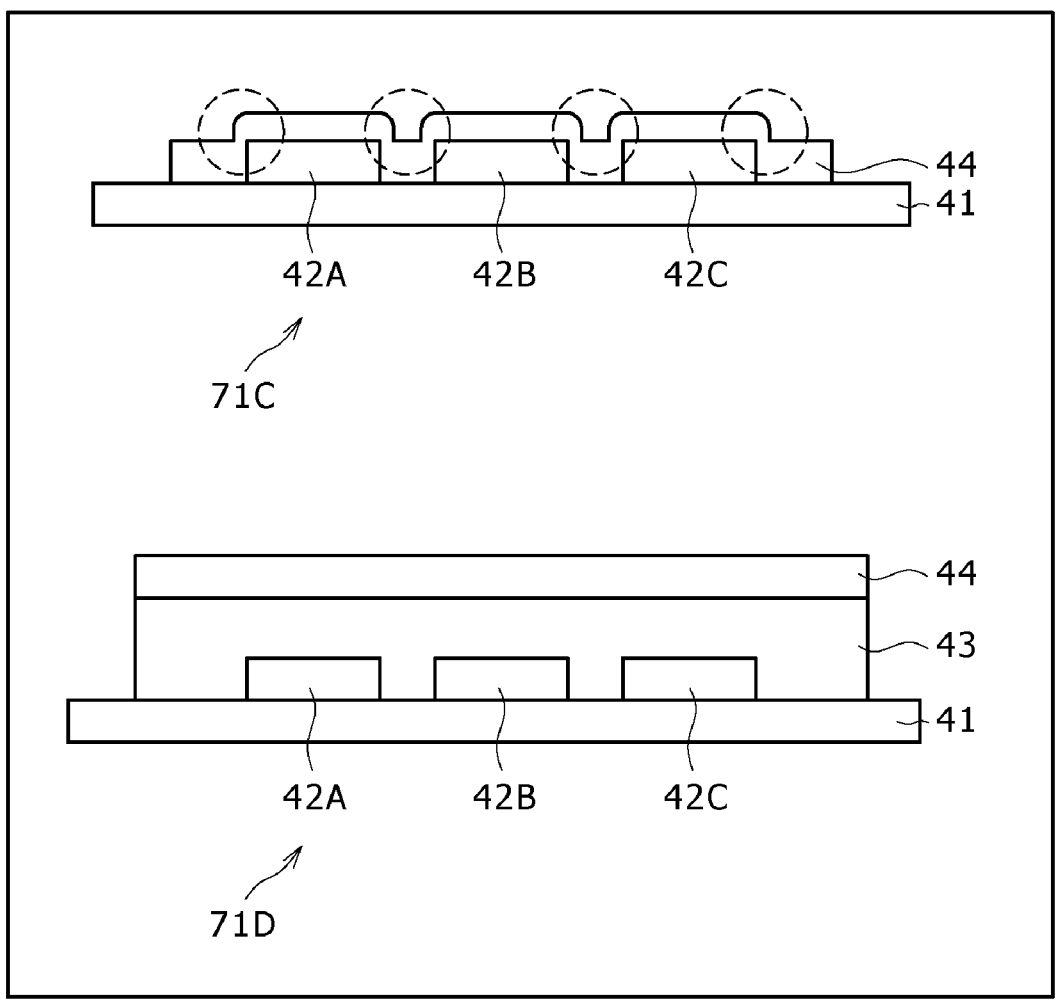
FIG. 6 is a diagram for explaining the film thickness of a water-repellent film.

Therefore, as shown on the upper side of FIG. 6, the conventional liquid device array 71C involves a possibility of the occurrence of a part in which the film thickness of the water-repellent film 44 is locally-small depending on the electrode shape like the parts surrounded by the dotted-line circles. Furthermore, the electrode edge part surrounded by the dotted-line circle is also a part on which an electric field focuses, and therefore involves the possibility the breakdown easily occurs. In other words, the need to increase the film thickness of the water-repellent film 44 arises in order to suppress the breakdown, which possibly lowers the dielectric constant. In contrast, as shown on the lower side of FIG. 6, in the liquid device array 71D, to which the present invention is applied, the insulating film 43 formed on the lower electrodes 42 absorbs the recesses and projections of the lower electrodes 42 and planarizes the upper surface. Therefore, the water-repellent film 44 is applied on this flat surface with a uniform film thickness. Therefore, the liquid device array 71D can suppress the occurrence of breakdown from the electrode edge part, on which an electric field focuses. In other words, because the breakdown is suppressed, reduction in the thickness of the water-repellent film 44 having a comparatively-low relative dielectric constant is achieved and increase in the dielectric constant of the liquid device can be achieved.

Experimental results will be shown below. The objective of the experiment is to confirm the effects of the insulating film 43. Therefore, of the components of the liquid device 31, the components unnecessary for the experiment are simplified.

First, for a blanket-film electrode structure in which micro-patterning of the lower electrode 42 was not performed, like the structure shown in FIG. 3, comparison of the condition of the occurrence of breakdown was made between a structure with only the water-repellent film like the conventional structure and a double-layered structure with the insulating film 43 and the water-repellent film 44 like the structure of the present invention.

In the experiment, in the multilayered structure shown in FIG. 2, the nonpolar liquid 46 was omitted and the gap between the layer of the water-repellent film 44 and the layer of the upper electrode 48 was filled with only water as the polar liquid 47. Furthermore, the distance between the lower electrode 42 and the upper electrode 48 was set to 100 μm. A rectangular wave of 30 Hz was applied between the lower electrode 42 and the upper electrode 48 with variation in the amplitude voltage thereof, and the deterioration of the film (the change of the color thereof to brown) arising due to breakdown and gas generation due to electrolysis of water were confirmed. The graph shown in FIG. 7 shows the relationship between the breakdown amplitude voltage when the breakdown was observed (hereinafter, referred to as the breakdown amplitude voltage) and the film thickness of the water-repellent film 44 (hereinafter, referred to as the water-repellent film thickness).

Figure 7:
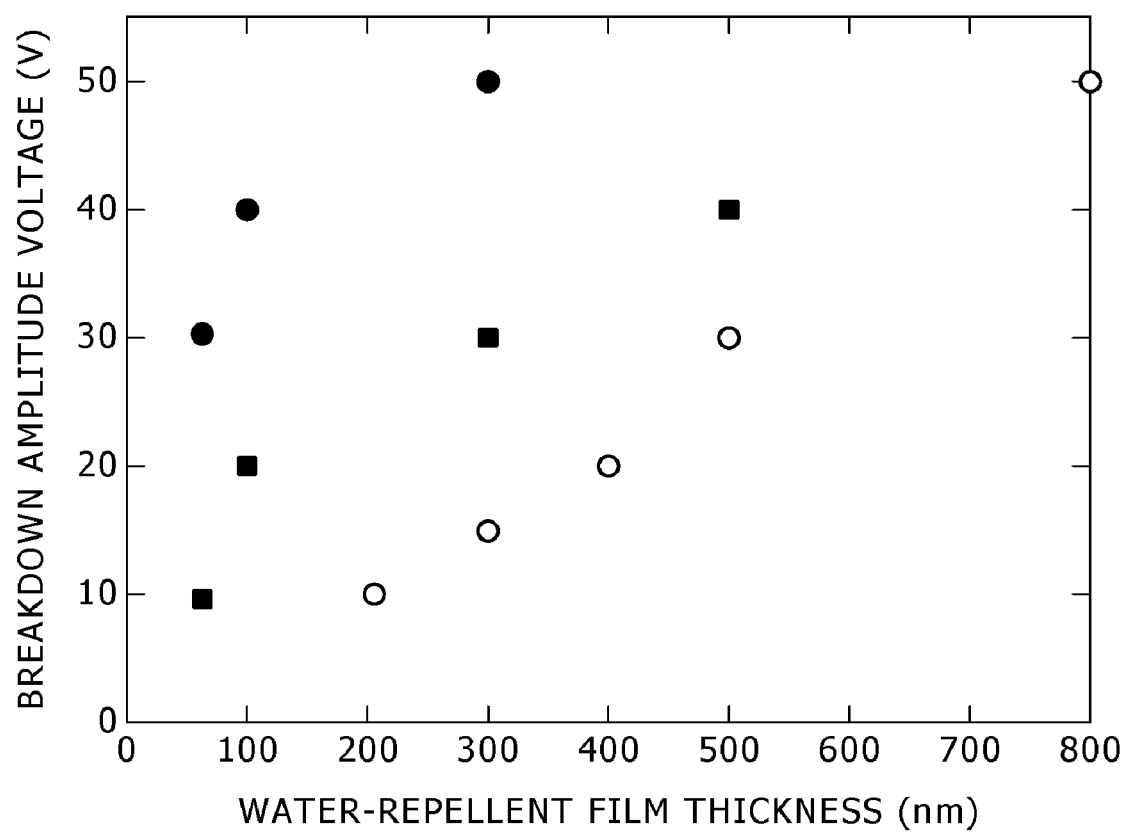
FIG. 7 is a graph showing the relationships between the water-repellent film thickness and the breakdown amplitude voltage.

In FIG. 7, the white circles (○) indicate the relationship between the breakdown amplitude voltage and the water-repellent film thickness when the insulating film 43 is not provided but only the water-repellent film 44 is provided like in the configuration of the conventional liquid device. The black circles (●) indicate the relationship between the breakdown amplitude voltage and the water-repellent film thickness when the film thickness of the insulating film 43 composed of an inorganic material is 100 nm. The black squares (■) indicate the relationship between the breakdown amplitude voltage and the water-repellent film thickness when the film thickness of the insulating film 43 composed of an inorganic material is 50 nm.

As shown in FIG. 7, in the case in which only the water-repellent film 44 is provided, indicated by the white circles, the breakdown easily occurs when the amplitude is about 20 V if the film thickness is equal to or smaller than 500 nm. In contrast, as indicated by the black squares, if the insulating film 43 having a film thickness of 50 nm is given, the breakdown does not occur up to about 20 V even if the film thickness of the water-repellent film 44 is 100 nm. Moreover, if the insulating film 43 having a film thickness of 100 nm is given, the breakdown does not occur up to about 40 V even if the film thickness of the water-repellent film 44 is 100 nm. That is, due to the provision of the insulating film 43, the occurrence of the breakdown is suppressed obviously.

Furthermore, the capacitance of the water-repellent film 44 having a relative dielectric constant of 2 and a film thickness of 500 nm is $3.54 \times 10^{-5}$ F per a unit area of 1 m$^2$. In contrast, the composite capacitance of two layers of the insulating film 43 having a relative dielectric constant of 20 and a film thickness of 100 nm and the water-repellent film 44 having a relative dielectric constant of 2 and a film thickness of 100 nm is $1.16 \times 10^{-4}$ F. Therefore, the latter has higher capacitance. That is, even with the same applied voltage, the generative force by electrowetting is higher in the case of forming the double-layered structure based on the insulating film 43 and the water-repellent film 44 like in the present invention than in the case in which only the water-repellent film 44 is provided like in the conventional structure by a factor of about 4.5.

Next, a similar experiment was carried out for the liquid devices having a patterning-electrode structure obtained by subjecting the lower electrode 42 to micro-patterning like the structures shown in FIG. 5.

Specifically, also in this case, in the multilayered structure shown in FIG. 2, the nonpolar liquid 46 was omitted and the gap between the layer of the water-repellent film 44 and the layer of the upper electrode 48 was filled with only water as the polar liquid 47. Furthermore, the distance between the lower electrode 42 and the upper electrode 48 was set to 100 μm. A rectangular wave of 30 Hz was applied between the lower electrode 42 and the upper electrode 48 with variation in the amplitude voltage thereof, and the deterioration of the film (the change of the color thereof to brown) arising due to breakdown and gas generation due to electrolysis of water were confirmed.

As the lower electrodes 42, plural ITO electrodes were disposed in a line manner on the lower substrate 41 with a film thickness of 30 nm, an electrode width of 30 μm, and an electrode interval of 5 µm. Hereinafter, the electrode thus disposed in a line manner will be referred to as the line electrode.

Figure 8:
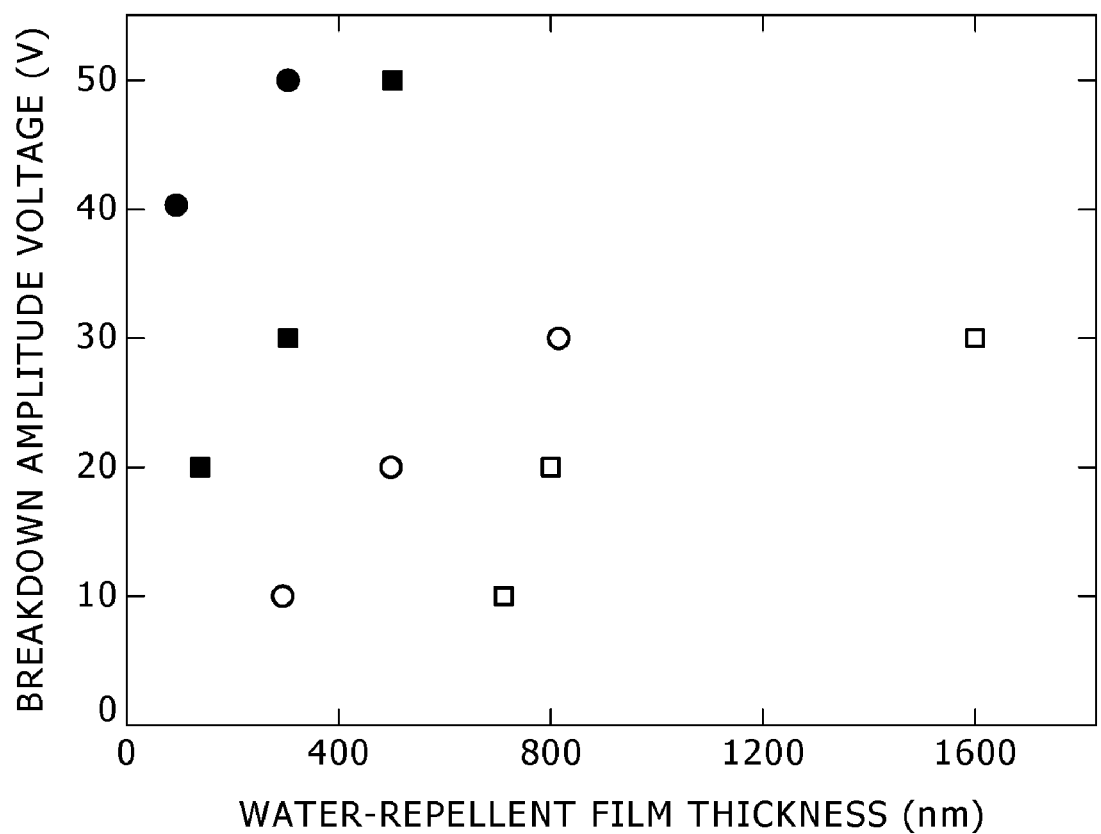
FIG. 8 is a graph showing the relationships between the water-repellent film thickness and the breakdown amplitude voltage.

The graph shown in FIG. 8 shows the relationship between the breakdown amplitude voltage and the water-repellent film thickness in this case. In FIG. 8, the white circles (○) indicate the relationship between the breakdown amplitude voltage and the water-repellent film thickness when the insulating film 43 is not provided but only the water-repellent film 44 is provided like in the configuration of the conventional liquid device. For this case, the phases of the applied rectangular wave are aligned with each other between adjacent line electrodes, and the breakdown amplitude voltage indicates the voltage between the lower electrode 42 and the upper electrode 48.

Furthermore, the white squares (□) indicate the relationship between the breakdown amplitude voltage and the water-repellent film thickness when only the water-repellent film 44 is provided, as with the case of the white circles. However, for this case, the phases of the applied rectangular wave are shifted from each other by 180 degrees between adjacent line electrodes. That is, in this case, the potential difference twice the amplitude voltage arises between the line electrodes. It should be noted that the breakdown amplitude voltage of this case indicates the potential difference between the lower electrodes 42, i.e. between the line electrodes.

Moreover, the black circles (●) indicate the relationship between the breakdown amplitude voltage and the water-repellent film thickness when the insulating film 43 that has a film thickness of 100 nm and is composed of an inorganic material is newly provided like in the liquid device 31 and the phases of the applied rectangular wave are aligned with each other between adjacent line electrodes. The black squares (■) indicate the relationship between the breakdown amplitude voltage and the water-repellent film thickness when the insulating film 43 that has a film thickness of 100 nm and is composed of an inorganic material is newly provided, as with the case of the black circles, but the phases of the applied rectangular wave are shifted from each other by 180 degrees between adjacent line electrodes.

As shown in FIG. 8, irrespective of whether or not the insulating film 43 is provided, the load is smaller and the breakdown voltage is higher when the rectangular wave having the aligned phases is applied to the respective line electrodes than when the rectangular wave having phases shifted from each other by 180 degrees is applied to adjacent line electrodes.

Nevertheless, if the insulating film 43 composed of an inorganic material is newly provided, even when the rectangular wave having phases shifted from each other by 180 degrees is applied to adjacent line electrodes, which provides the larger load, the breakdown voltage is higher than when only the conventional water-repellent film 44 is provided and the rectangular wave having the aligned phases is applied to the respective line electrodes, which provides the smaller load. That is, also in the case of the patterning-electrode structure, the breakdown voltage is higher when the insulating film 43 composed of an inorganic material is newly provided than when only the water-repellent film 44 is provided conventionally, irrespective of the condition of the phase of the applied voltage.

By the way, if only the water-repellent film 44 is provided, the breakdown strength in the first experiment for the blanket-film electrode structure should be the same as that in the present experiment for the patterning-electrode structure. However, in practice, the breakdown strength of the patterning-electrode structure in the present experiment was lower.

This will be attributed to the following reason. Specifically, the major solvent for coating the water-repellent film was an extremely-special solution containing fluorine, and the wettability was different between the ITO electrodes and the underlying glass substrate. Therefore, unevenness occurred between the small areas corresponding to the electrode interval of 5 µm and the 30 µm areas on the electrodes, and the uniform, dense water-repellent film 44 was not formed.

In contrast, in the case of coating the insulating film 43, such unevenness does not occur because the wettability of the surface thereof becomes uniform, so that the uniform, dense water-repellent film 44 is formed. Accordingly, difference in the experimental result does not arise between the first experiment for the blanket-film electrode structure and the present experiment for the patterning-electrode structure. That is, forming the insulating film 43 allows suppression of the unevenness of the water-repellent film 44 due to such a wettability difference and hence the formation of the uniform, dense water-repellent film 44. This can suppress the lowering of the breakdown voltage due to the unevenness of the water-repellent film 44.

When the film thickness of the insulating film 43 was set to 50 nm, the breakdown strength when the phases of the applied rectangular wave were shifted from each other by 180 degrees between adjacent line electrodes was substantially the same as that when only the water-repellent film 44 was provided; the effect of the insulating film 43 could not be sufficiently achieved. That is, the film thickness of the insulating film 43 needs to be large to some extent in order to achieve the sufficient effect thereof.

Next, manufacturing of the liquid device 31, to which the present invention is applied, will be described.

Figure 9:
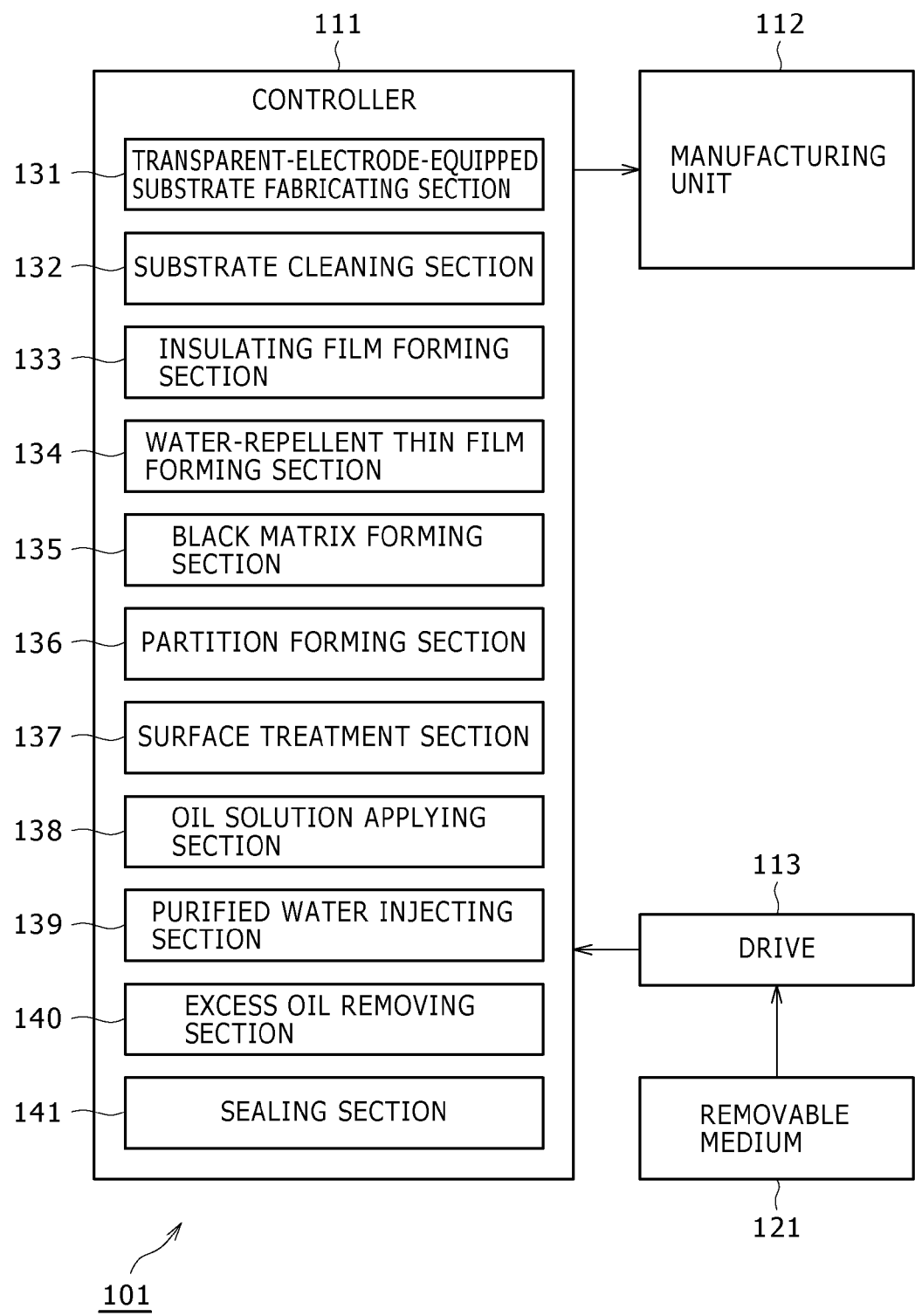
FIG. 9 is a block diagram showing a configuration example of a liquid device manufacturing apparatus to which the present invention is applied.

FIG. 9 is a block diagram showing a major configuration example of a manufacturing apparatus for the liquid device 31.

In FIG. 9, a manufacturing apparatus 101 for manufacturing the liquid device 31 has a controller 111, a manufacturing unit 112, and a drive 113. The controller 111 is a processor that controls the operation of the manufacturing unit 112, which actually manufactures the liquid device 31. The controller 111 has a transparent-electrode-equipped substrate fabricating section 131, a substrate cleaning section 132, an insulating film forming section 133, a water-repellent thin film forming section 134, a black matrix forming section 135, a partition forming section 136, a surface treatment section 137, an oil solution applying section 138, a purified water injecting section 139, an excess oil removing section 140, and a sealing section 141 that control the operation of the respective steps in the manufacturing of the liquid device 31 by the manufacturing unit 112.

Furthermore, the drive 113 reads out various kinds of information, such as information relating to the control of the manufacturing unit 112, stored in a predetermined removable media 121 loaded according to need, and supplies the information to the controller 111. The controller 111 can control the manufacturing unit 112 by using the information. Specifically, the controller 111 has a memory medium for storing the information, and acquires and stores the latest information by utilizing the removable media 121 loaded in the drive 113, so that the controller 111 can control the manufacturing unit 112 based on the latest information.

Figure 10:
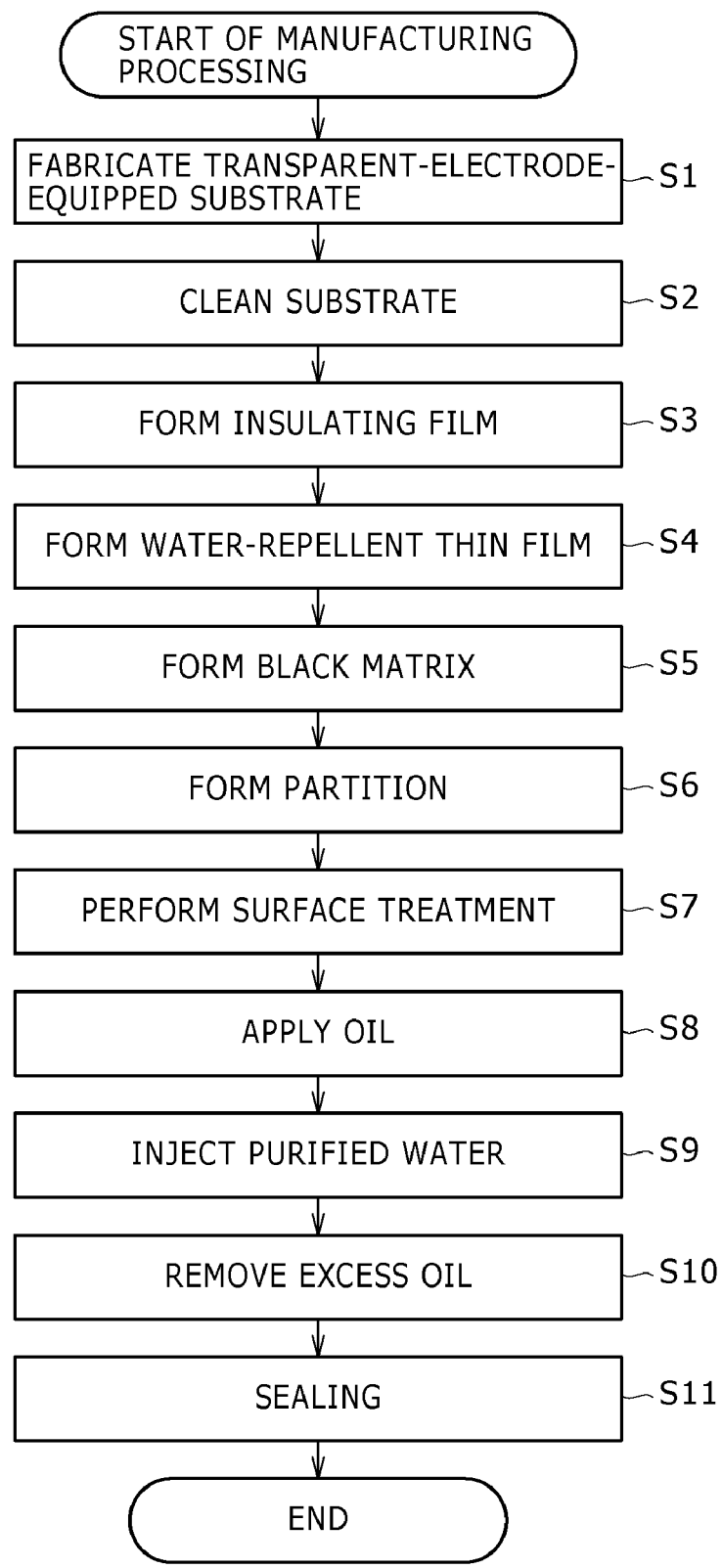
FIG. 10 is a flowchart for explaining an example of the flow of manufacturing processing.

With reference to the flowchart of FIG. 10, an example of the flow of the manufacturing processing executed by the respective processors in the controller will be described. The description will be made with reference to FIGS. 11 to 20 according to need.

Figure 11:
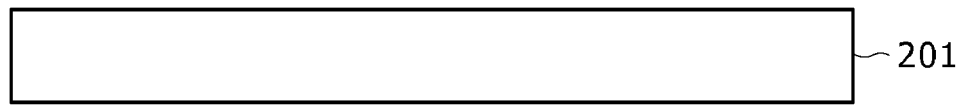
FIG. 11 is a diagram for explaining a manufacturing step for the liquid device.

Upon the start of the manufacturing processing, in Step S1, the transparent-electrode-equipped substrate fabricating section 131 in the controller 111 controls the manufacturing unit 112 to employ a transparent material such as glass or silicon as the lower substrate 41 and form a transparent electrode such as an ITO film as the lower electrode 42 on the lower substrate 41. Thereby, as shown in FIG. 11, a transparent-electrode-equipped substrate 201 that is transparent and has a predetermined size is fabricated. The upper substrate 50 and the upper electrode 49 are also produced in a similar manner, and therefore the description thereof is omitted.

After the transparent-electrode-equipped substrate 201 is produced, in Step S2, the substrate cleaning section 132 cleans the transparent-electrode-equipped substrate 201 by an ultrasonic substrate cleaning apparatus with a cleaning agent or the like used also in a cleaning step for a glass substrate or the like of an LCD (Liquid Crystal Display) or the like. Thereafter, the substrate cleaning section 132 sufficiently removes the cleaning agent by deionized water. Further, the substrate cleaning section 132 also performs dry cleaning in an UV ozone dry treatment apparatus in the manufacturing unit 112.

Figure 12:
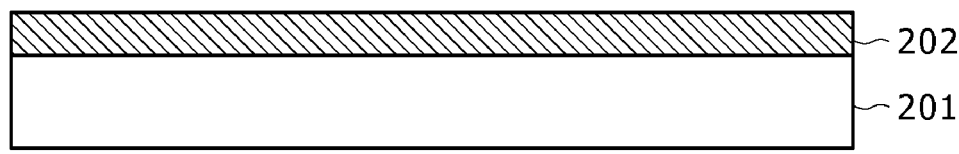
FIG. 12 is a diagram for explaining a manufacturing step for the liquid device.

In Step S3, the insulating film forming section 133 controls the manufacturing unit 112 to deposit an insulating film 202 (the insulating film 43) on the surface of the transparent-electrode-equipped substrate 201 as shown in FIG. 12. The insulating film forming section 133 deposits the insulating film 202 by a spin-coating method in which the concentration of the stock solution is so adjusted that a predetermined film thickness will be obtained and a uniform film is applied by dropping the solution with the transparent-electrode-equipped substrate 201 rotated and utilizing centrifugal force. In the case of film deposition methods such as a sputtering method and a vapor deposition method, problems possibly occur that the film thickness is extremely too small and that the density of the obtained film is low and a liquid and so on easily enters the film, etc. By applying and depositing a solution of an inorganic coating material by a spin-coating method, these problems can be avoided. After the deposition of the insulating film 202, the insulating film forming section 133 increases the temperature in steps of 50° C. for 30 minutes for each increase step so that the film density will not be deteriorated, and bakes the insulating film 202 at 300° C. for one hour. The obtained film thickness is 50 to 200 nm. If the film thickness needs to be further increased, this step is repeated. It should be noted that if the temperature increase rate is high and if achievement of a film having a large thickness is attempted from the start by setting the rotational speed of the spin-coating extremely low, a problem that small cracks occur in the film and so on possibly arises.

Figure 13:
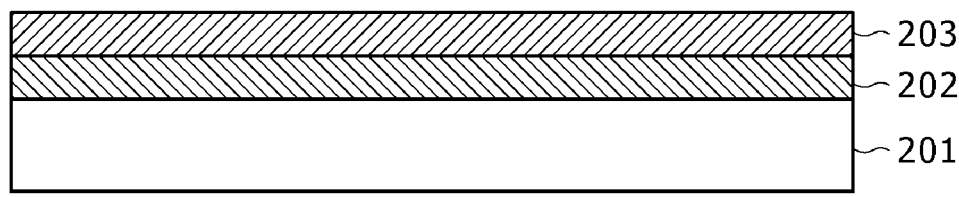
FIG. 13 is a diagram for explaining a manufacturing step for the liquid device.

In Step S4, the water-repellent thin film forming section 134 controls the manufacturing unit 112 to further deposit a water-repellent film 203 having water repellency on the surface of the insulating film 202 deposited on the transparent-electrode-equipped substrate 201 as shown in FIG. 13. The methods for forming this water-repellent film 203 are roughly categorized into wet-type methods and dry-type methods. As the wet-type method, e.g. a spin-coating method, a dip-coating method, or a screen-printing method, in which a solution in which a water-repellent material is dissolved is used, is available. As the dry-type method, e.g. a vapor deposition method is available.

If the water-repellent film 203 is used solely like in the conventional structure, the film thickness of the water-repellent film 203 needs to be equal to or larger than 500 nm, preferably equal to or larger than 800 nm in order to develop the desired insulating property. If a double-layered structure with the insulating film 202 and the water-repellent film 203 is employed as shown in FIG. 13, it is sufficient that the film thickness of the water-repellent film 203 is equal to or larger than about 100 nm. Such film thickness adjustment can be achieved through adjustment of the concentration of the stock solution and the rotational speed at the time of the spin-coating.

Furthermore, the water-repellent thin film forming section 134 may modify the surface of the water-repellent film 203, and may give a surfactant to a general-purpose resist agent to apply the agent on the water-repellent surface according to need. As dry-type methods, e.g. an ultraviolet ozone treatment method and an oxygen plasma ashing method are available. It is preferable that these surface treatments be performed by the minimum necessary amount because excess treatment leads to the deficiency of even the essential water repellency.

After the water-repellent film 203 is formed, in Step S5, the black matrix forming section 135 controls the manufacturing unit 112 to form a black matrix that optically separates the respective rib pixels from each other so that the incidence of extra light can be avoided. Specifically, the black matrix forming section 135 controls the manufacturing unit 112 to uniformly deposit a resist material by a spin-coating method and then perform exposure, development, and so on by a photolithography method. Thereby, for example, partitions 204-1 to 204-4 formed of a black resist containing a black pigment or dye are formed as the black matrix on the water-repellent film 203 as shown in FIG. 14.

In general, a water-repellent material also has oil repellency. Thus, although a resist solution is applied, it is impossible to deposit a film on the water-repellent material. It is possible to deposit a film with e.g. SU8, made by MicroChem Corp., which is an agent that allows a high-aspect-ratio pattern, due to the high viscosity thereof and the effects of the added surfactant and so on. However, it has transparency and offers no light blocking. Thus, by accordingly adjusting a surfactant similarly also for a substance called the black resist, film formation on the water-repellent film is permitted. After these resist materials are applied, the desired patterning is formed in accordance with the respective standard procedures (exposure intensity, development condition, and so on).

Figure 14:
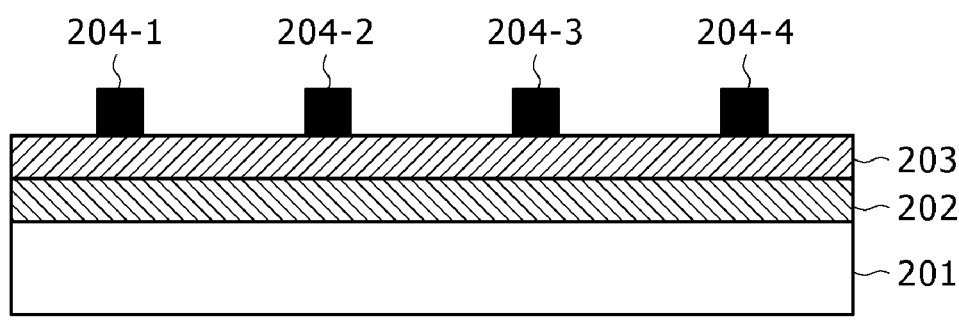
FIG. 14 is a diagram for explaining a manufacturing step for the liquid device.

Although the black matrix is shown as four partitions like the partitions 204-1 to 204-4 in FIG. 14, it is formed in a mesh manner in practice. Therefore, in practice, the partitions 204-1 to 204-4 are continuous with each other and are formed as one component. Hereinafter, if there is no need to make a description with distinguishing among these partitions 204-1 to 204-4, they will be referred to as the partition 204.

Figure 15:
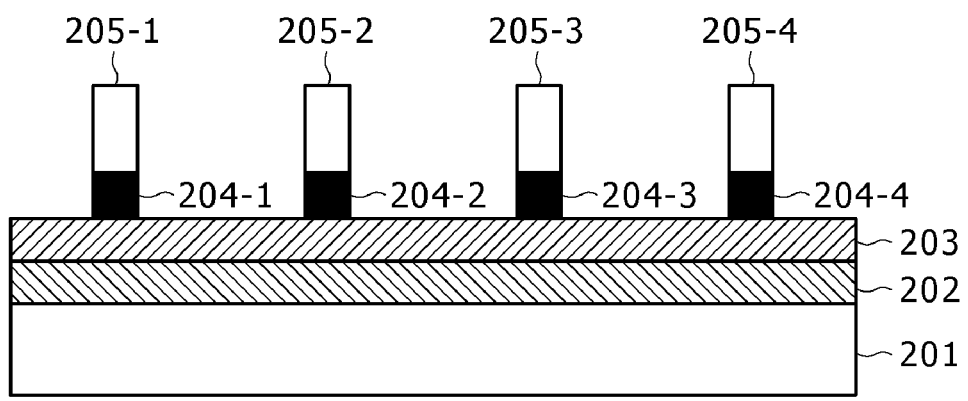
FIG. 15 is a diagram for explaining a manufacturing step for the liquid device.

In general, the upper limit of the film thickness of the material of this black matrix is about 1 (μm) to 2 (μm). Therefore, in Step S6, the partition forming section 136 controls the manufacturing unit 112 to perform resist application by spin-coating, exposure, development, and so on. Thereby, partitions 205-1 to 205-4 composed of a resist material that allows formation of partitions at a high aspect ratio, such as SU-8, are formed on the partitions 204-1 to 204-4, respectively, as shown in FIG. 15 for example.

That is, the partitions 205-1 to 205-4 are also formed in a mesh manner in practice, and are continuous with each other and are formed as one component. Hereinafter, if there is no need to make a description with distinguishing among these partitions 205-1 to 205-4, they will be referred to as the partition 205.

As described above, due to the formation of the partition 205 composed of e.g. SU-8 on the partition 204 as the black matrix, the height of the partition 205 is adjusted (a partition having the desired height is formed). It is also possible to fabricate the partition 205 with use of an epoxy resin resist and by a publicly-known photolithography technique and so on for example.

The height of the partition 205 can be controlled based on the setting of the concentration of the resist. For example, if the partition 205 is formed by using SU-8, the concentration is adjusted in advance by using cyclopentanone as the major solvent depending on the desired thickness of the partition 205.

Figure 16:
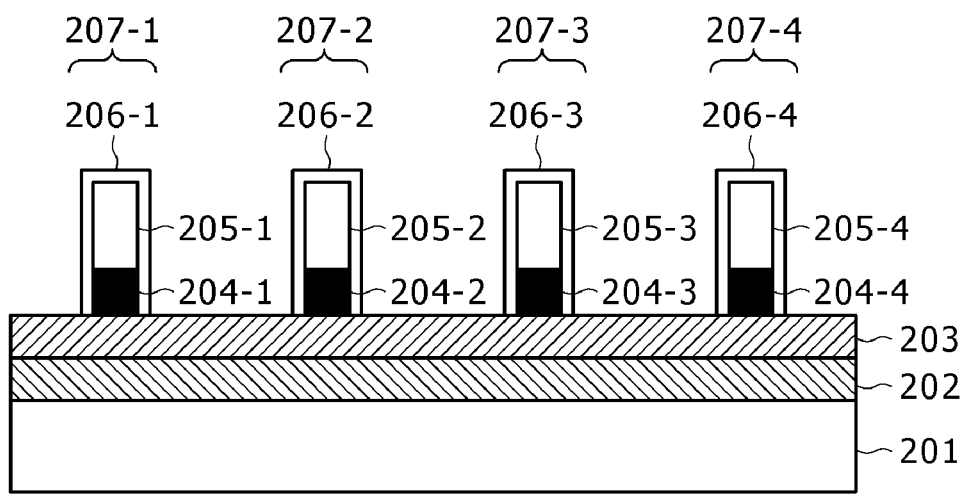
FIG. 16 is a diagram for explaining a manufacturing step for the liquid device.

After the partition 205 is formed in the above-described manner, in Step S7, the surface treatment section 137 performs surface treatment for the formed partition 204 and partition 205 by using a dry-type method such as an ultraviolet ozone treatment method or an oxygen plasma ashing method for example. The surface treatment section 137 performs surface treatments 206-1 to 206-4 for each of the partitions 204-1 to 204-4 and the partitions 205-1 to 205-4 as shown in FIG. 16 for example. If there is no need to make a description with distinguishing among the surface treatments 206-1 to 206-4, they will be referred to as the surface treatment 206.

Hereinafter, the partition 204-1 and the partition 205-1 for which the surface treatment 206-1 has been performed will be referred to as a rib 207-1 collectively. Similarly, the partition 204-2 and the partition 205-2 for which the surface treatment 206-2 has been performed will be referred to as a rib 207-2 collectively. The partition 204-3 and the partition 205-3 for which the surface treatment 206-3 has been performed will be referred to as a rib 207-3 collectively. The partition 204-4 and the partition 205-4 for which the surface treatment 206-4 has been performed will be referred to as a rib 207-4 collectively. Furthermore, if there is no need to make a description with distinguishing among the ribs 207-1 to 207-4, they will be referred to as the rib 207.

By such surface treatment 206, the wettability of the rib 207 to the polar liquid 47 is controlled.

After the surface treatment for the rib is ended, a gap forming component is dispersed in the outer peripheral part of the transparent-electrode-equipped substrate 201, i.e. in the periphery of the part on which the lower electrode 42 is disposed, of the lower substrate 41, in order for the inter-electrode distance between the lower electrode 42 and the upper electrode 48 to be kept at a predetermined value that is set in advance. As the material of this gap forming component, e.g. an adhesion in which silica spheres are mixed or a sticker adhesion type is used. Although illustration is omitted, this gap forming component is generally so dispersed as to have a height larger than that of the rib 207.

Figure 17:
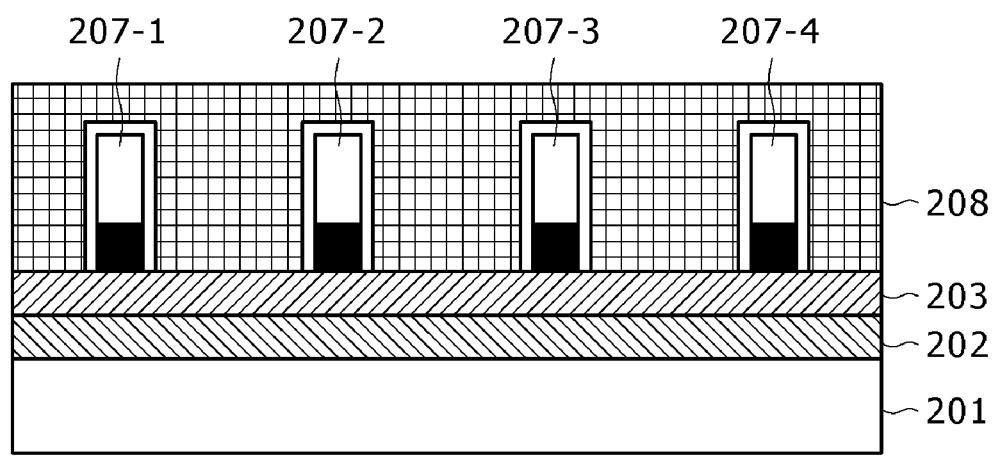
FIG. 17 is a diagram for explaining a manufacturing step for the liquid device.

After the rib 207 is formed, in Step S8, the oil solution applying section 138 controls the manufacturing unit 112 to apply an oil solution 208 as the nonpolar liquid 46 over the transparent-electrode-equipped substrate 201 wholly in such a way that the oil solution 208 is packed in the respective rib pixels as shown in FIG. 17 for example.

Figure 18:
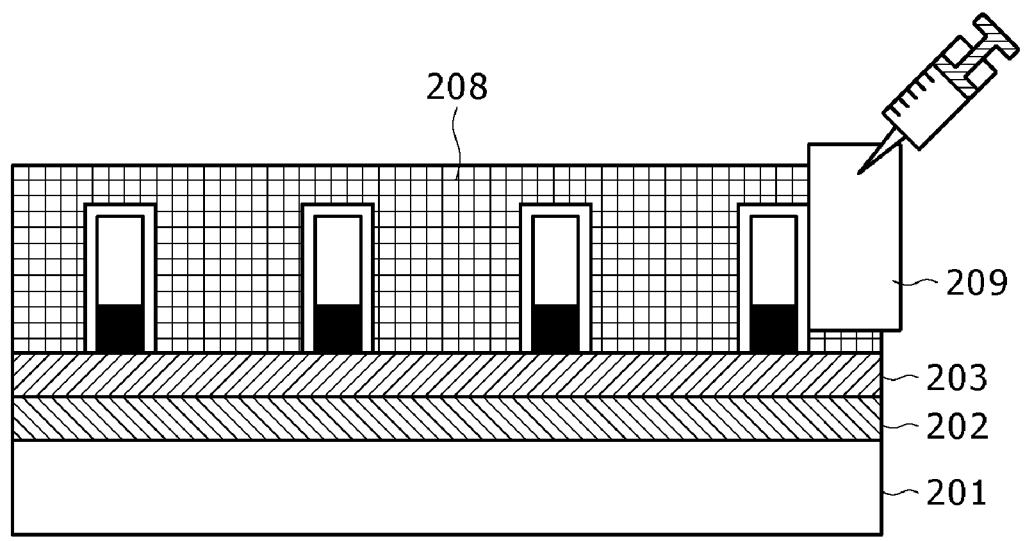
FIG. 18 is a diagram for explaining a manufacturing step for the liquid device.

After the oil solution 208 is applied, in Step S9, the purified water injecting section 139 controls the manufacturing unit 112 to pour purified water 209 as the polar liquid 47 into the surface of covering of the colored oil solution 208 as shown in FIG. 18 for example. In the injection of this purified water 209, the speed of the spreading of the purified water along the surface direction of the transparent-electrode-equipped substrate 201 is set constant by using a dispenser or the like. Furthermore, a scheme may be used in which a substrate covered by an oil is put into a water tank that is filled with the purified water 209 in advance, at a constant speed and a constant angle.

The amount of the oil solution held in the area surrounded by the partition can be defined depending on the size of the area surrounded by the partition, the height of the partition, and, depending on the case, the intensity of wettability modification treatment by UV ozone treatment for the partition before the liquid injection. For example, in a liquid lens variable device system, adjustment is so carried out that an isolated liquid lens can be formed in the area surrounded by the partition. Furthermore, in a liquid shutter device system, adjustment is so carried out that the oil is packed in the whole inside the partition.

For example, if the purified water 209 is injected by using a dispenser, a part of the colored oil as the excess part floats, and therefore it needs to be removed. In Step S10, the excess oil removing section 140 controls the manufacturing unit 112 to remove the excess oil solution 208 floating on the surface of the purified water 209.

Figure 19:
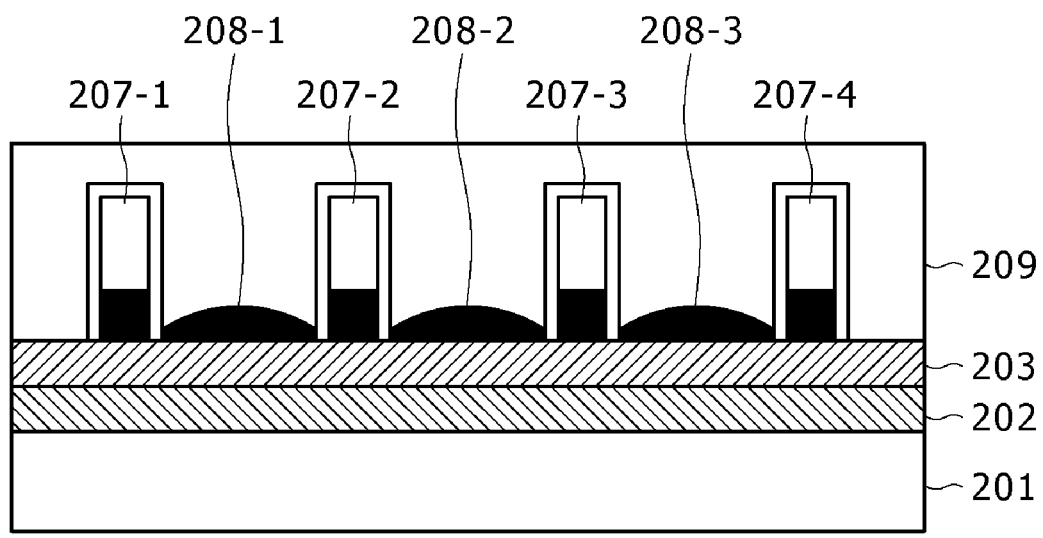
FIG. 19 is a diagram for explaining a manufacturing step for the liquid device.

FIG. 19 is a diagram showing the condition after the excess oil is removed. After the purified water 209 is injected and the excess oil is removed, as shown in FIG. 19, an adequate amount of an oil solution 208-1 forms a layer in the rib pixel between the rib 207-1 and the rib 207-2. An adequate amount of an oil solution 208-2 forms a layer in the rib pixel between the rib 207-2 and the rib 207-3. An adequate amount of an oil solution 208-3 forms a layer in the rib pixel between the rib 207-3 and the rib 207-4. As above, the layer of the oil solution 208 and the layer of the purified water 209 are formed in each rib pixel. At this time, because of the wettability, the nonpolar liquid 46 and the polar liquid 47 form a layer on the lower side and on the upper side, respectively, and become stable, irrespective of the specific gravities of the polar liquid 47 and the nonpolar liquid 46.

Figure 20:
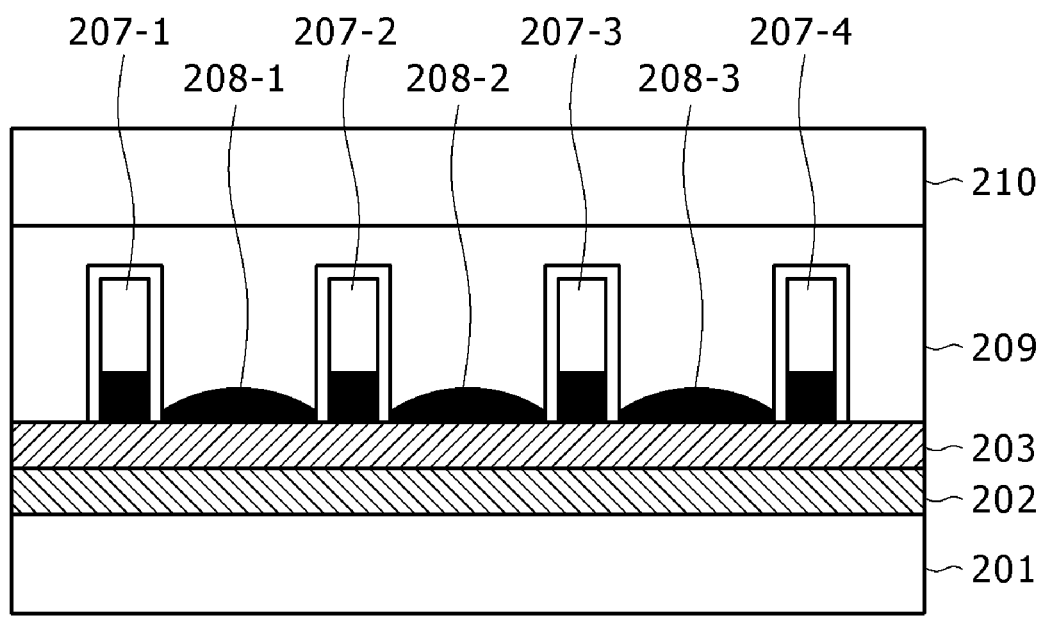
FIG. 20 is a diagram for explaining a manufacturing step for the liquid device.

After the excess oil is removed, in Step S11, the sealing section 141 controls the manufacturing unit 112 to bond a transparent-electrode-equipped substrate 210 to the transparent-electrode-equipped substrate 201 from the upper side of the polar liquid 47 with the intermediary of the gap forming component in such a way that the transparent-electrode-equipped substrate 210 is opposed to the transparent-electrode-equipped substrate 201, and seal the periphery of the bonded panels by a sealing resin, as shown in FIG. 20 for example. As the sealing resin, e.g. an ionomer or adhesive polyethylene can be used.

Upon the end of the sealing, the manufacturing processing is ended.

In the above-described manner, the manufacturing apparatus 101 can manufacture the liquid device 31.

Next, a description will be made about specific use examples of the liquid device 31, to which the present invention is applied, produced in the above-described manner.

Figure 21:
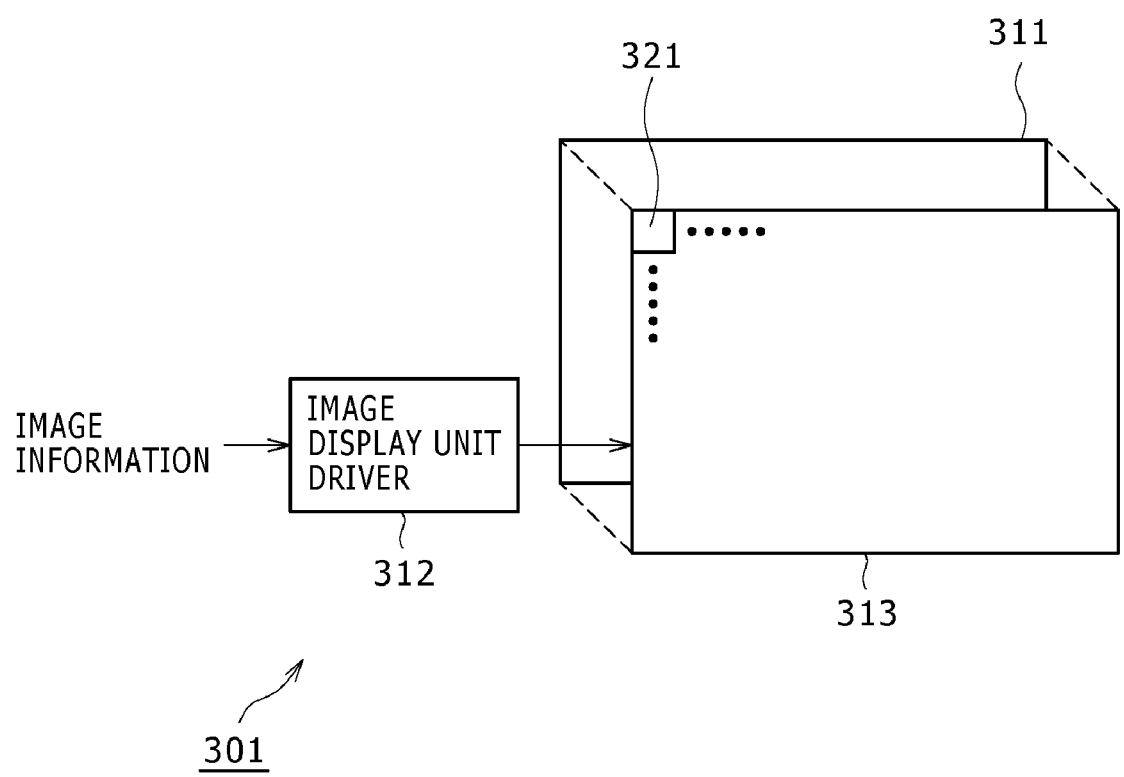
FIG. 21 is a block diagram showing a configuration example of an image display device to which the present invention is applied.

FIG. 21 is a block diagram showing a configuration example of an image display device to which the present invention is applied.

In FIG. 21, an image display device 301 is a device that displays an image, and has a light emitting source 311, an image display unit driver 312, and an image display unit 313. The image display device 301 is a transmissive display in which light emitted from the light emitting source 311 passes through the screen display unit 313 to reach a user.

The light emitting source 311 is a light source for image displaying, referred to as a so-called backlight. For example, a hot cathode tube or a cold cathode tube is used as it. It is obvious that any unit may be used as long as it functions as a light source for image displaying similarly to them.

The image display unit driver 312 controls the operation of the image display unit 313 (the respective liquid devices 321 that form the image display unit 313) based on image information (e.g. a video signal) supplied from the external.

The image display unit 313 is a device that displays an image and in which plural liquid devices 321 that control transmission of light emitted from the light emitting source 311 under control by the image display unit driver 312 are arranged in a flat surface manner or a curved surface manner.

This liquid device 321 is an application of the liquid device 31, to which the present invention is applied, described with reference to FIG. 2. Specifically, as the nonpolar liquid 46, a liquid containing a black dye or a liquid colored to black through dissolving of a colorant is used. As this colorant, one that dissolves in the nonpolar liquid 46 but does not dissolve in the polar liquid 47 is used. Furthermore, a pigment that does not dissolve also in the nonpolar liquid 46 may be mixed in the nonpolar liquid 46. That is, it is sufficient that the nonpolar liquid 46 is in the state of preventing light transmission as a result while having the characteristics described with reference to FIG. 2, and the color thereof may be one other than black.

Furthermore, the controller 51 shown in FIG. 2 corresponds to the image display unit driver 312 in the example of FIG. 21. In other words, the image display unit driver 312 has the functions equivalent to the power supply 61 and the switch unit 62, for applying any voltage within a predetermined range to the respective liquid devices 321, as with the controller 51 of FIG. 2. In practice, the configuration of the image display unit driver 312 is more complex because it carries out the control of the respective liquid devices 321 in a comprehensive manner. However, in the following, a description will be made in such a way that such a control function of the image display unit driver 312 is represented as the power supply 61 and the switch unit 62, for simplified description.

As shown in FIG. 21, the light emitting source 311 has a light emitting surface of a flat surface manner or a curved surface manner, from which light is emitted. The liquid devices 321 of the image display unit 313 are so arranged and disposed as to be substantially opposed to this light emitting surface. The liquid device 321 operates as an optical shutter that controls the transmission amount of light emitted from the light emitting surface of the light emitting source 311, i.e. the intensity of the transmitted light that has passed through the liquid device 321 (transmitted-light intensity), although the details thereof will be described later. The respective liquid devices 321 control the transmitted-light intensity based on image information under control by the image display unit driver 312. Thereby, the image corresponding to the image information is displayed on the surface of the whole of the group of the liquid devices 321, i.e. the surface of the whole of the image display unit 313, on the opposite side to the light emitting source 311. In other words, the light that has passed through the liquid device 321 operating based on the image information reaches the eyes of a user positioned on the opposite side to the light emitting source 311 on the basis of the image display unit 313. Thereby, for the user, the image corresponding to the image information appears to be displayed on a surface of the image display unit 313 (the surface on the user side).

That is, the surface of the image display unit 313 on the opposite side to the light emitting source 311 (the surface on the opposite side to the light emitting source 311, formed by the arranging of the liquid devices 321) serves as the image display surface. In general, the liquid device 321 is required to have response speed higher than the light emission cycle of the light emitting source 311.

Light emitted from the light emitting surface of the light emitting source 311 does not have to be direct light emitted from the light source but may be e.g. indirect light reflected by a reflector or the like. Furthermore, it is preferable that light emitted from the light emitting surface be white light that is uniform across the entire light emitting surface in general. However, the light does not necessarily have to be uniform and be white light.

In general, it is preferable that the area and shape of the light emitting surface of the light emitting source 311 be identical to those of the image display surface of the image display unit 313, and the light emitting source 311 and the image display unit 313 be disposed in parallel with a predetermined interval in such a way that the light emitting surface and the image display surface overlap with each other without protruding from each other. However, the areas and shapes of the light emitting surface and the image display surface do not necessarily have to be identical to each other. In addition, the light emitting surface and the image display surface do not necessarily have to overlap with each other without protruding from each other, and the light emitting source 311 and the image display unit 313 do not necessarily have to be disposed in parallel with a predetermined interval. For example, the light emitting source 311 and the image display unit 313 may be formed in an integrated manner.

Furthermore, in the image display unit 313, the liquid devices 321 may be so disposed as to be arranged with any pattern. For example, they may be arranged with a regular pattern such as a matrix manner or a honeycomb structure, or may be arranged with an irregular pattern.

Figure 22:
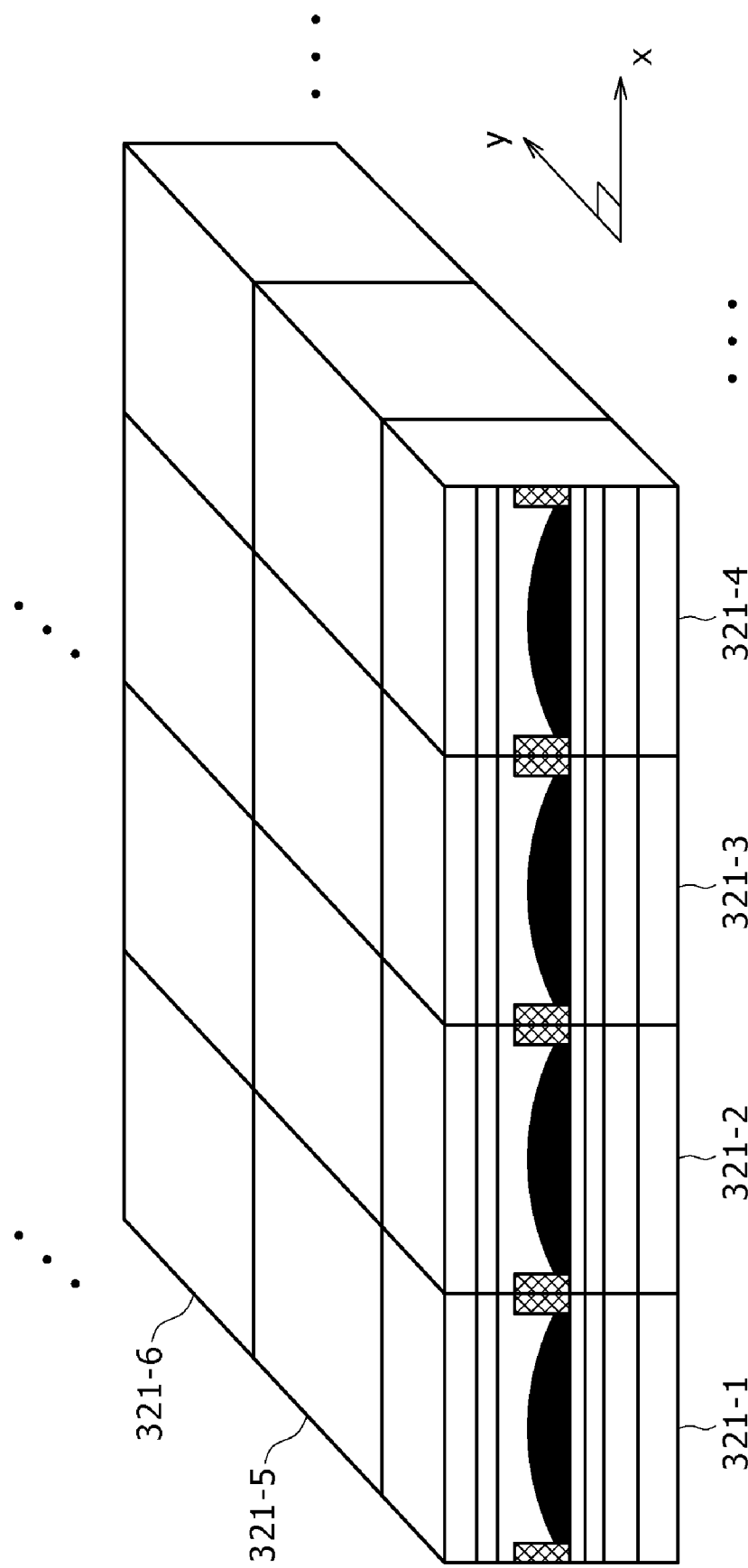
FIG. 22 is a diagram showing an example of the arrangement of the liquid devices.

One example of the arrangement of the liquid devices 321 is shown in FIG. 22. In the example of FIG. 22, plural liquid devices 321 are so disposed as to be arranged in a matrix manner without gaps like a liquid device 321-1, a liquid device 321-2, a liquid device 321-3, a liquid device 321-4, . . . along the x direction and the liquid device 321-1, a liquid device 321-5, a liquid device 321-6, . . . along the y direction.

In other words, in the case of FIG. 22, the space sandwiched between the lower substrate 41 and the upper substrate 49 is simply partitioned in a matrix manner by the rib 45, so that the plural rib pixels are formed. Each of the plural rib pixels is filled with the nonpolar liquid 46 and the polar liquid 47, and the configuration of each rib pixel is so configured as to operate as the individual liquid device 321.

In FIG. 22, the illustration is so made that the lower electrode 42 and the upper electrode 48 are in contact with each other between adjacent liquid devices 321 for simplification of the description. However, in practice, the lower electrode 42 and the upper electrode 48 of at least the liquid devices 321 that are operated independently of each other are so disposed as not to be in contact with each other. In general, the lower electrode 42 and the upper electrode 48 of each liquid device 321 are so disposed as not to be in contact with the lower electrode 42 and the upper electrode 48 of the adjacent liquid device 321, and are so configured that voltage can be applied thereto independently of another liquid device 321. That is, the image display unit driver 312 can operate the respective liquid devices 321 independently of each other.

Figure 23:
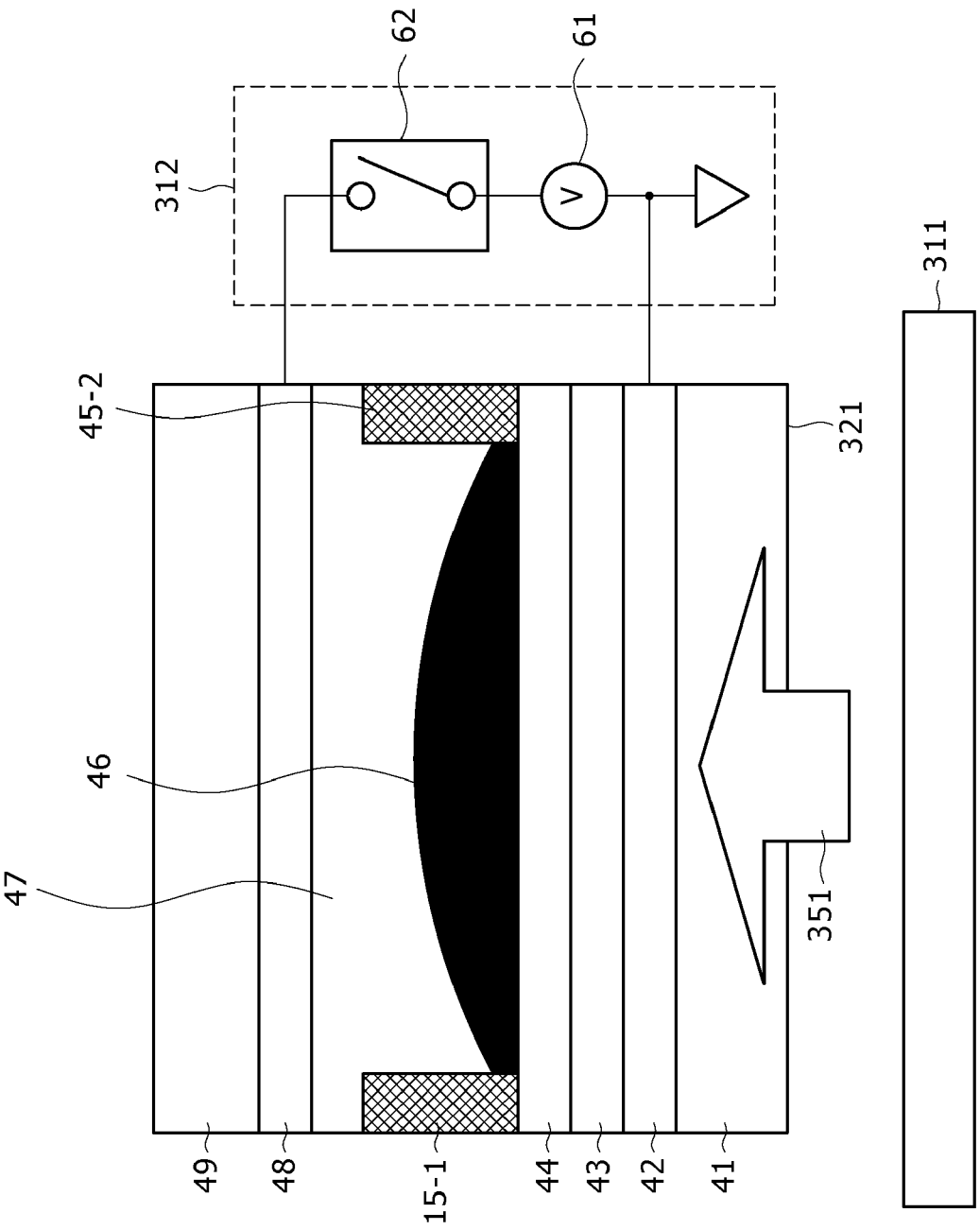
FIG. 23 is a diagram for explaining the operation of the liquid device.

Next, the operation of the liquid device 321 having such a structure will be described. FIG. 23 is a diagram showing the condition of the liquid device 321 in the state in which the switch unit 62 is set to the off-state, i.e. the disconnecting state, and voltage is not applied to the lower electrode 42 and the upper electrode 48.

As shown in FIG. 23, if the switch unit 62 is in the off-state and the potential difference between the lower electrode 42 and the upper electrode 48 is zero or regarded as approximating zero, because the water-repellent film 44 is hydrophobic, a state is kept in which the nonpolar liquid 46 exists closer to the water-repellent film 44 than the polar liquid 47 because of the surface tension. That is, if voltage is not applied between the lower electrode 42 and the upper electrode 48, the colored nonpolar liquid 46 is stabilized in the state of being spread over the whole of the rib pixel, i.e. the whole of the light transmissive part, as shown in FIG. 23.

Therefore, at this time, light (visual information) 351 emitted from the light emitting source 311 on the backside of the liquid device 321, which is on the lower side in FIG. 23, can not pass through the liquid device 321 although reaching the liquid device 321, because the nonpolar liquid 46 is composed of a material having a black dye, or is colored by a black colorant, or is doped with a black pigment. That is, the light emitted from the light emitting source 311 is blocked by the nonpolar liquid 46.

Figure 24:
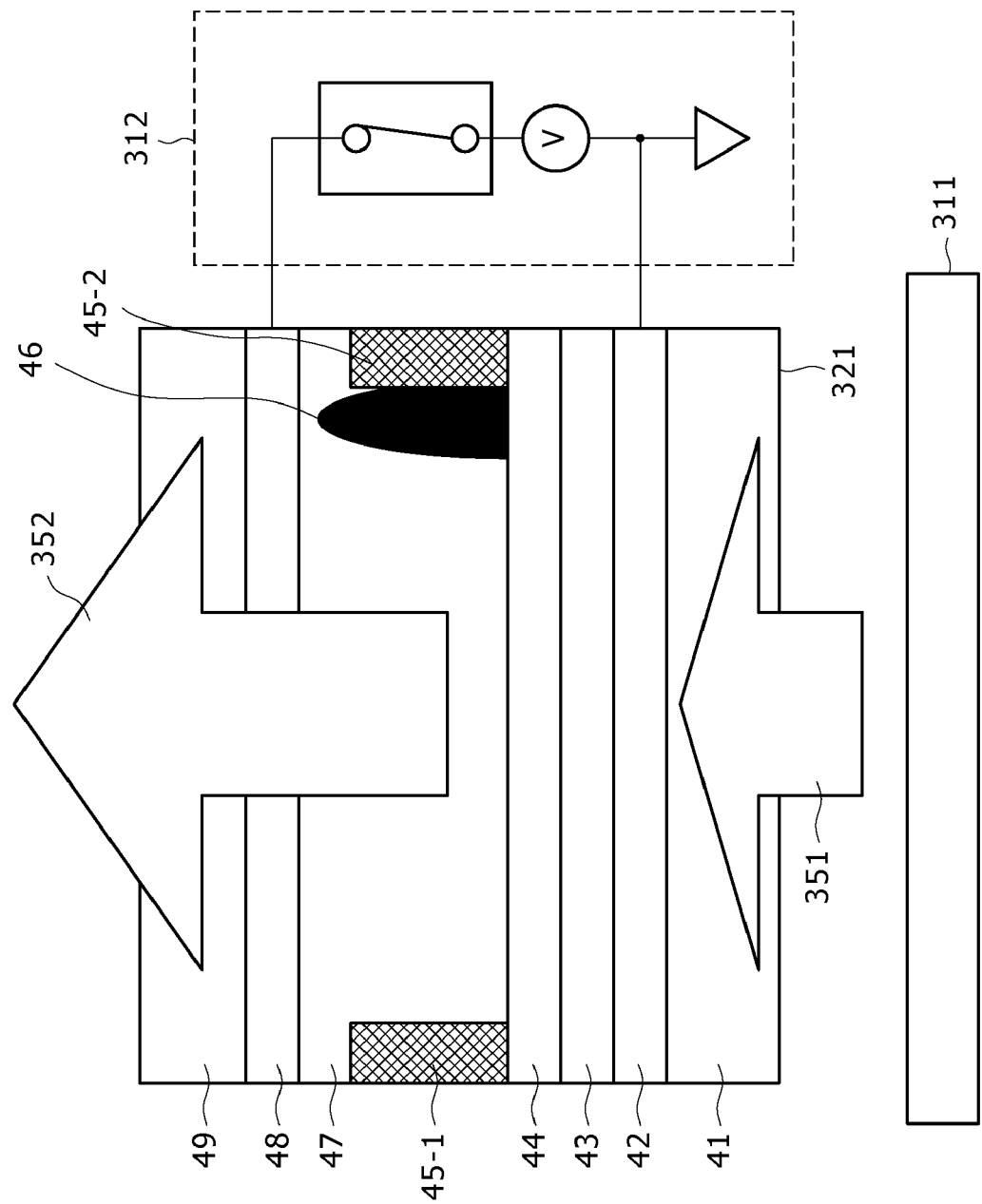
FIG. 24 is a diagram for explaining the operation of the liquid device.

FIG. 24 is a diagram showing the condition of the liquid device 321 in the state in which the switch unit 62 is set to the on-state, i.e. the connecting state, and the maximum voltage in the range that can be set in the power supply 61 is applied between the lower electrode 42 and the upper electrode 48 by the power supply 61.

If the supply voltage of the power supply 61 is applied between the lower electrode 42 and the upper electrode 48, polarization charges are generated in the electric field direction in the insulating film 43 and the water-repellent film 44 in the vicinity of the lower electrode 42 and charges are accumulated in the surfaces of the near insulating film 43 and water-repellent film 44, so that a so-called charge double layer state is obtained. Because the polar liquid 47 has polarity, it is attracted toward the water-repellent film 44 in the vicinity of the lower electrode 42 by Coulomb's force of the charges. That is, the wettability of the water-repellent film 44 to the polar liquid 47 changes depending on the magnitude of the voltage applied between the lower electrode 42 and the upper electrode 48. In contrast, such force is not generated for the nonpolar liquid 46 because it is nonpolar. Therefore, the black nonpolar liquid 46 is pushed out and moved by the polar liquid 47 moved to the vicinity of the water-repellent film 44, and is stabilized in the state of aggregating at a part of the section surrounded by the rib 45 of the liquid device 321 as shown in FIG. 24. In the case of the example of FIG. 24, the maximum voltage is applied. Therefore, the black nonpolar liquid 46 is pushed out and deformed to the maximum extent by the polar liquid 47 that is so deformed as to aggregate in the vicinity of the water-repellent film 44, and is stabilized in the state of aggregating at a part of the section surrounded by the rib 45 of the liquid device 321 to the most extent.

That is, in this state, the black nonpolar liquid 46 concentrates to the most extent at one part of the rib pixel, i.e. at one part of the light transmissive surface perpendicular to the light transmission direction equivalent to the vertical direction in FIG. 24, and the most part of the rib pixel other than this one part is occupied by only the layer of the polar liquid 47, which is colorless and transparent. That is, of the light transmissive surface, the part on which the nonpolar liquid 46 does not exist occupies the highest ratio. Therefore, most of the light 351 emitted from the light emitting source 311, i.e. the visual information, passes through the part of only the layer of the polar liquid 47, in which the layer of the black nonpolar liquid 46 does not exist, in the rib pixel of the liquid device 321, and is emitted, without being blocked, as transmitted light 352 from the image display surface as the front surface of the liquid device 321 shown on the upper side in FIG. 24. That is, the transmitted-light intensity of this liquid device 321 becomes the maximum.

Because the magnitude of the voltage applied between the lower electrode 42 and the upper electrode 48 changes depending on the magnitude of the supply voltage of the power supply 61, the deformation amount of the nonpolar liquid 46 also changes as a result. Therefore, the image display unit driver 312 can also stabilize the shape of the nonpolar liquid 46 at the state between the example of FIG. 23 and the example of FIG. 24 by controlling the magnitude of the supply voltage of the power supply 61. That is, the image display unit driver 312 can arbitrarily control the transmitted-light intensity of the corresponding liquid device 321, i.e. the degree of opening of the optical shutter.

As above, the liquid device 321 controls the amount of light that passes through this liquid device 321, of the light emitted from the light emitting source 311. That is, the liquid device 321 operates as an optical shutter that arbitrarily changes the intensity of the light emitted from the light emitting source 311.

In FIG. 24, the illustration is so made that the nonpolar liquid 46 aggregates near the rib 45-2 when the supply voltage of the power supply 61 is applied between the lower electrode 42 and the upper electrode 48. However, the position to which this nonpolar liquid 46 moves is any. It is sufficient that the nonpolar liquid 46 is so configured as to spread across the whole of the bottom surface in the rib pixel (the surface closer to the water-repellent film 44) in the state in which the supply voltage of the power supply 61 is not applied between the lower electrode 42 and the upper electrode 48 and aggregate at one part of the light transmissive surface in the rib pixel in the state in which the supply voltage of the power supply 61 is applied between the lower electrode 42 and the upper electrode 48.

Furthermore, hereinafter, spreading of the nonpolar liquid 46 across the whole of the light transmissive surface in the rib pixel like that shown in FIG. 23 will be referred to as expansion, and the aggregation of the nonpolar liquid 46 at one part of the light transmissive surface in the rib pixel like that shown in FIG. 24 will be referred to as contraction, although the nonpolar liquid 46 does not necessarily expand or contract in practice due to the voltage application between the lower electrode 42 and the upper electrode 48. Specifically, the nonpolar liquid 46 expands if the voltage applied between the lower electrode 42 and the upper electrode 48 becomes lower or zero. In contrast, the nonpolar liquid 46 contracts if the voltage applied between the lower electrode 42 and the upper electrode 48 becomes higher.

The amount of this nonpolar liquid 46 can be controlled based on the height of the rib 45. However, it is preferable that this amount be an adequate amount with respect to the area of the light transmissive surface in the rib pixel of the liquid device 321, and both too large an amount and too small an amount are not preferable.

Specifically, it is preferable that the amount of the nonpolar liquid 46 be set to such an amount that the nonpolar liquid 46 sufficiently expands to sufficiently suppress the light transmittance in the state in which voltage is not applied between the lower electrode 42 and the upper electrode 48 and the nonpolar liquid 46 sufficiently contracts to be capable of sufficiently enhancing the light transmittance in the state in which the maximum voltage in the allowable range is applied between the lower electrode 42 and the upper electrode 48. That is, it is preferable that the amount of the nonpolar liquid 46 be set to such an adequate amount that the amount of change in the light transmittance between these two states is sufficiently large.

Furthermore, it is more preferable that the response speed of the liquid device 321 be higher, and it is more preferable that the speed of the transition between the above-described two states (the expansion speed and contraction speed of the nonpolar liquid 46) be higher. That is, it is more preferable that the nonpolar liquid 46 have lower viscosity and the amount thereof be smaller within such ranges that the amount of change in the light transmittance between the above-described two states is sufficiently large.

The amount of this nonpolar liquid 46 is controlled based on not only the height of the rib 45 but also the treatment time of ultraviolet ozone treatment performed for the surface of the rib 45, the materials of the respective components, and so on.

The above-described liquid device 321 does not need a polarizing filter and so on, and thus can significantly enhance the light extraction efficiency compared with a conventional optical shutter employing no liquid device. That is, the liquid device 321 operates at higher speed and can further enhance the light extraction efficiency. Furthermore, the liquid device 321 can operate even with driving voltage equal to or lower than 30 V, and can operate with lower voltage compared with the conventional optical shutter.

The image display device 301 of FIG. 21 carries out blocking and transmission of light from the light emitting source 311 partially with respect to the entire image display surface through opening and closing of the optical shutter in each liquid device 321. Thereby, the image display device 301 can display a so-called binary image represented with only two colors on the image display surface based on the presence and absence of transmitted light of each liquid device 321. For example, if the light emitting source 311 emits white light, displayed on the image display surface is a binary image for which the part of the liquid device 321 of the state in which the optical shutter is opened is represented as white and the part of the liquid device 321 of the state in which the optical shutter is closed is represented as black.

Furthermore, the image display device 301 controls the light transmittance of each liquid device 321 arbitrarily or in a multilevel manner by controlling the degree of opening and closing of the optical shutter in each liquid device 321 arbitrarily or in a multilevel manner and controlling the length of the state in which the optical shutter is opened arbitrarily or in a multilevel manner. Thereby, the image display device 301 can display, on the image display surface, a so-called grayscale image represented based on the degree of the brightness of transmitted light of each liquid device 321. For example, if the light emitting source 311 emits white light, displayed on the image display surface is a grayscale image including, besides white and black, gray as intermediate colors between white and black.

Moreover, the image display device 301 may be so configured as to be capable of displaying a so-called color image represented with use of e.g. red, blue, and green on the image display surface. For example, a color image can be displayed on the image display surface by employing red, blue, or green as the color of the nonpolar liquid 46 in each of the liquid devices 321 of the image display unit 313 as shown in FIG. 25.

Figure 25:
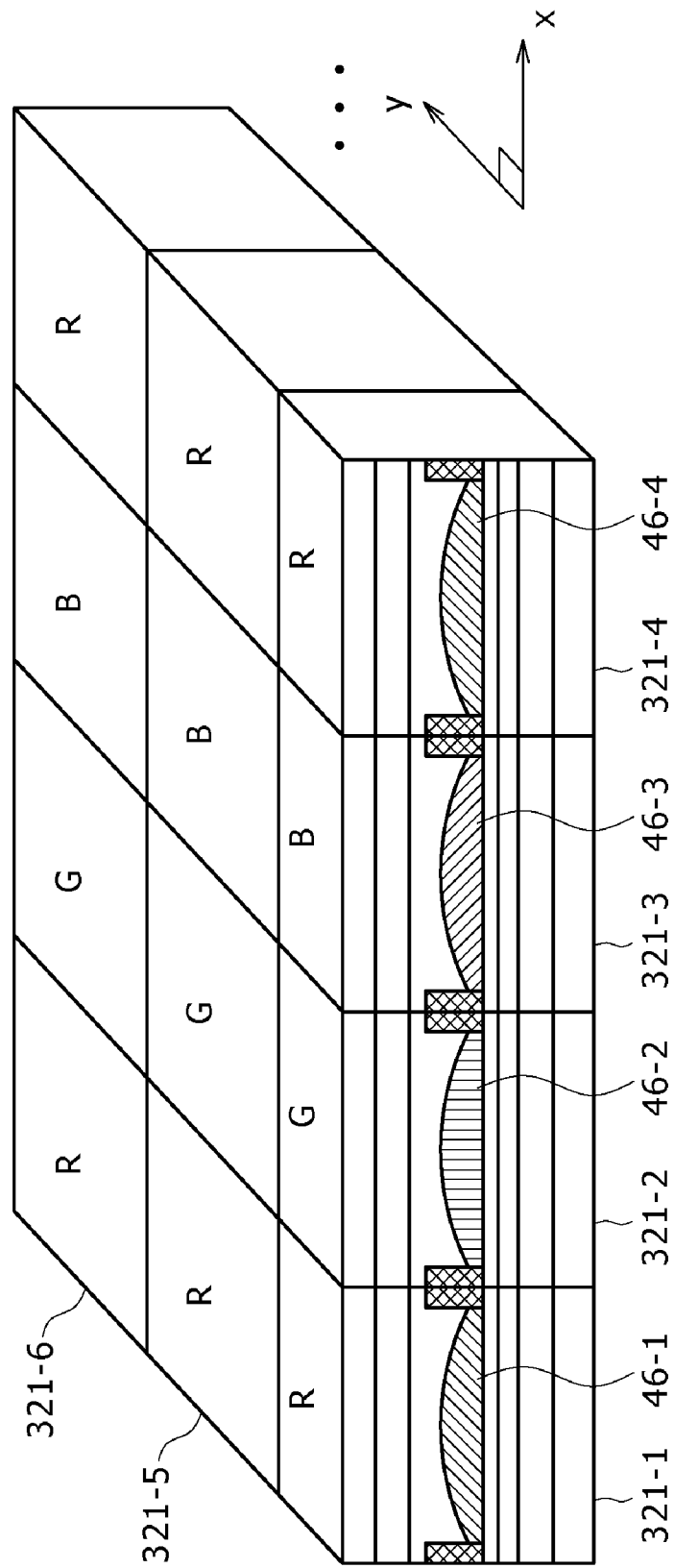
FIG. 25 is a diagram showing another configuration example of the liquid device.

FIG. 25 is a diagram showing an array example of liquid devices when the liquid devices to which the present invention is applied are applied to an image display device that displays color images, and is a diagram corresponding to FIG. 22. Specifically, in the case of FIG. 25, although the way of the arrangement of the liquid devices 321 is the same as that of FIG. 22, the nonpolar liquid 46 of each liquid device 321 is rendered not black but red, blue, or green. For example, a nonpolar liquid 46-1 of a liquid device 321-1 and a nonpolar liquid 46-4 of a liquid device 321-4, which are indicated by a pattern of oblique lines running from the upper right to the lower left, are red. A nonpolar liquid 46-2 of a liquid device 321-2, which is indicated by a pattern of vertical lines, is green. A nonpolar liquid 46-3 of a liquid device 321-3, which is indicated by a pattern of oblique lines running from the lower right to the upper left, is blue.

Furthermore, in FIG. 25, all of the nonpolar liquids 46 of the liquid devices 321 whose top surface is indicated by a character "R," like a liquid device 321-5 and a liquid device 321-6, are red. All of the nonpolar liquids 46 of the liquid devices 321 whose top surface is indicated by a character "G" are green. All of the nonpolar liquids 46 of the liquid devices 321 whose top surface is indicated by a character "B" are blue. That is, in the case of the example of FIG. 25, the liquid devices 321 are so arranged that the colors of the nonpolar liquids 46 are the same color along the y direction and are repeated in the order of "red," "green," and "blue" along the x direction. The arrangement of the colors of the nonpolar liquids 46 of the respective liquid devices 321 in the group of the liquid devices 321 arranged in such an array manner is any. For example, an arrangement way other than that shown in FIG. 25, like the Bayer array, may be employed. Furthermore, the number of colors of the nonpolar liquid 46 may be two or four or more.

The representation of "R," "G," and "B" of FIG. 25 is given for convenience of description and they are not characters printed on the actual liquid devices 321.

As shown in the example of FIG. 25, if the color of the nonpolar liquid 46 of the liquid device 321 is not black but red, green, or blue, i.e. if a red, green, or blue material is used as the nonpolar liquid 46, of if a red, green, or blue colorant is dissolved in the nonpolar liquid 46, or if a red, green, or blue pigment is mixed in the nonpolar liquid 46, the liquid device 321 allows the passage of light from the light emitting source 311 therethrough also when the nonpolar liquid 46 is expanded.

Specifically, in this case, the nonpolar liquid 46 is transparent and allows the passage of light having a predetermined wavelength, i.e. light of the same color as that of the nonpolar liquid 46, of the light from the light emitting source 311. In this case, the transmitted light beams emitted from the neighboring liquid devices 321 overlap with each other. Thereby, for a user, a displayed image appears to include also colors other than red, green, and blue.

However, in this case, the liquid device 321 does not block light from the light emitting source 311 but only changes the color of the light from the light emitting source 311. Therefore, the number of components is the same as that of the case of FIG. 22 and hence small, which reduces the manufacturing cost. However, the color reproducibility is low.

Figure 26:
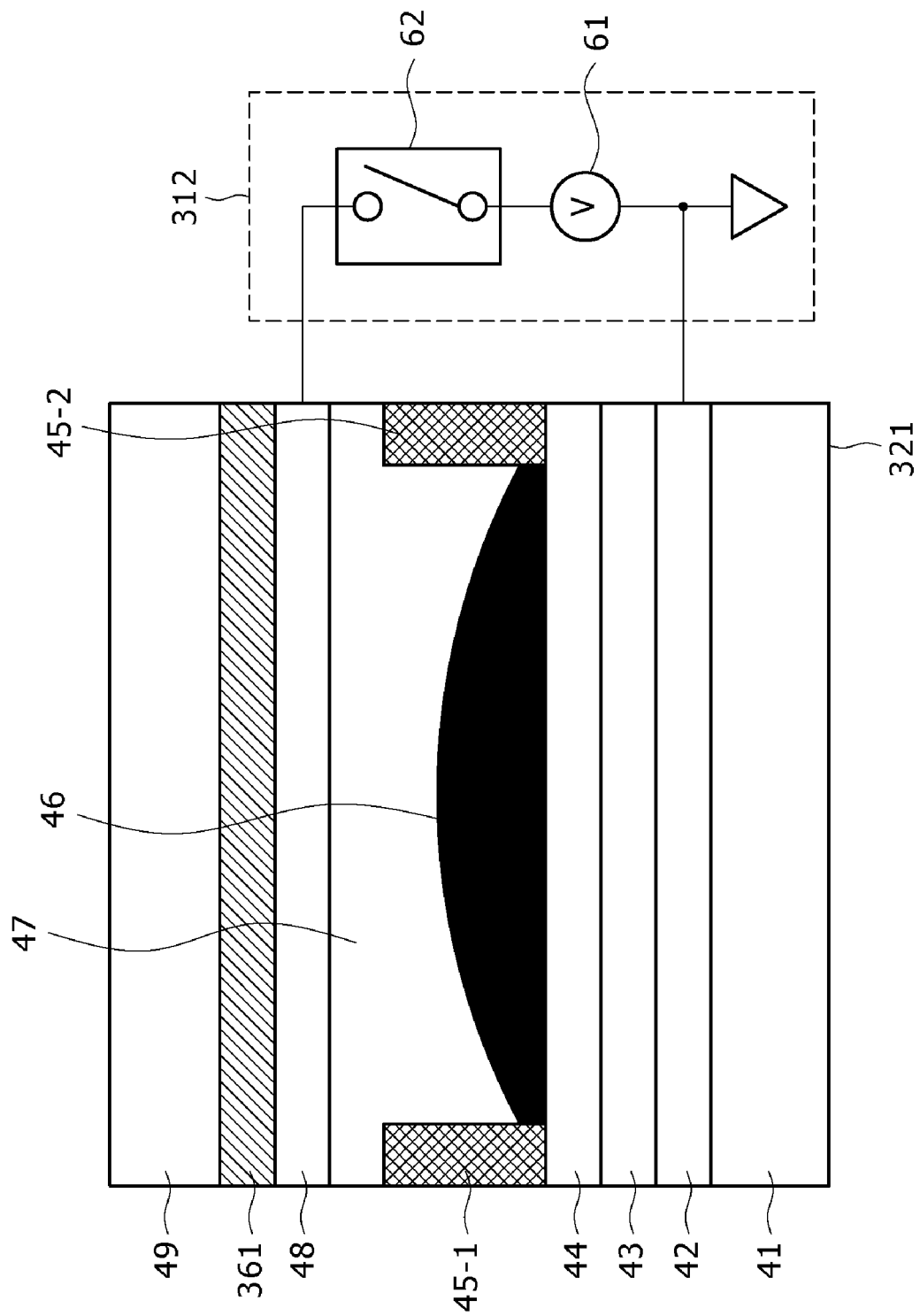
FIG. 26 is a diagram showing yet another configuration example of the liquid device.

In contrast thereto, colors may be reproduced by using a color filter as shown in FIG. 26. FIG. 26 is a diagram showing a configuration example of the liquid device 321 in this case, and is a diagram corresponding to FIG. 2. In the case of the example of FIG. 26, in the liquid device 321, a transparent color filter 361 that allows the passage of only light of red, green, or blue is provided between the upper electrode 48 and the upper substrate 49. That is, the transmitted light of the liquid device 321 inevitably passes through the color filter 361.

The color of the nonpolar liquid 46 at this time is black, and the nonpolar liquid 46 blocks light when being expanded. Specifically, when the state in which the nonpolar liquid 46 is contracted and the optical shutter is opened is obtained, light emitted from the light emitting source 311 passes through the part in which the layer of the nonpolar liquid 46 does not exist but only the layer of the polar liquid 47 exists, in the rib pixel of the liquid device 321. Then this light passes through the color filter 361 and is emitted from the liquid device 321. Therefore, in the state in which the nonpolar liquid 46 is contracted and the optical shutter is opened, the liquid device 321 emits the transmitted light of the color of the color filter 361. In the state in which the nonpolar liquid 46 is expanded and the optical shutter is closed, the liquid device 321 blocks the transmission light. Therefore, compared with the case in which the color of the nonpolar liquid 46 is red, green, or blue, the number of components is increased and thus the manufacturing cost is possibly increased. However, the difference in the manufacturing cost is not large. On the contrary, the color reproducibility is greatly enhanced.

Figure 27:
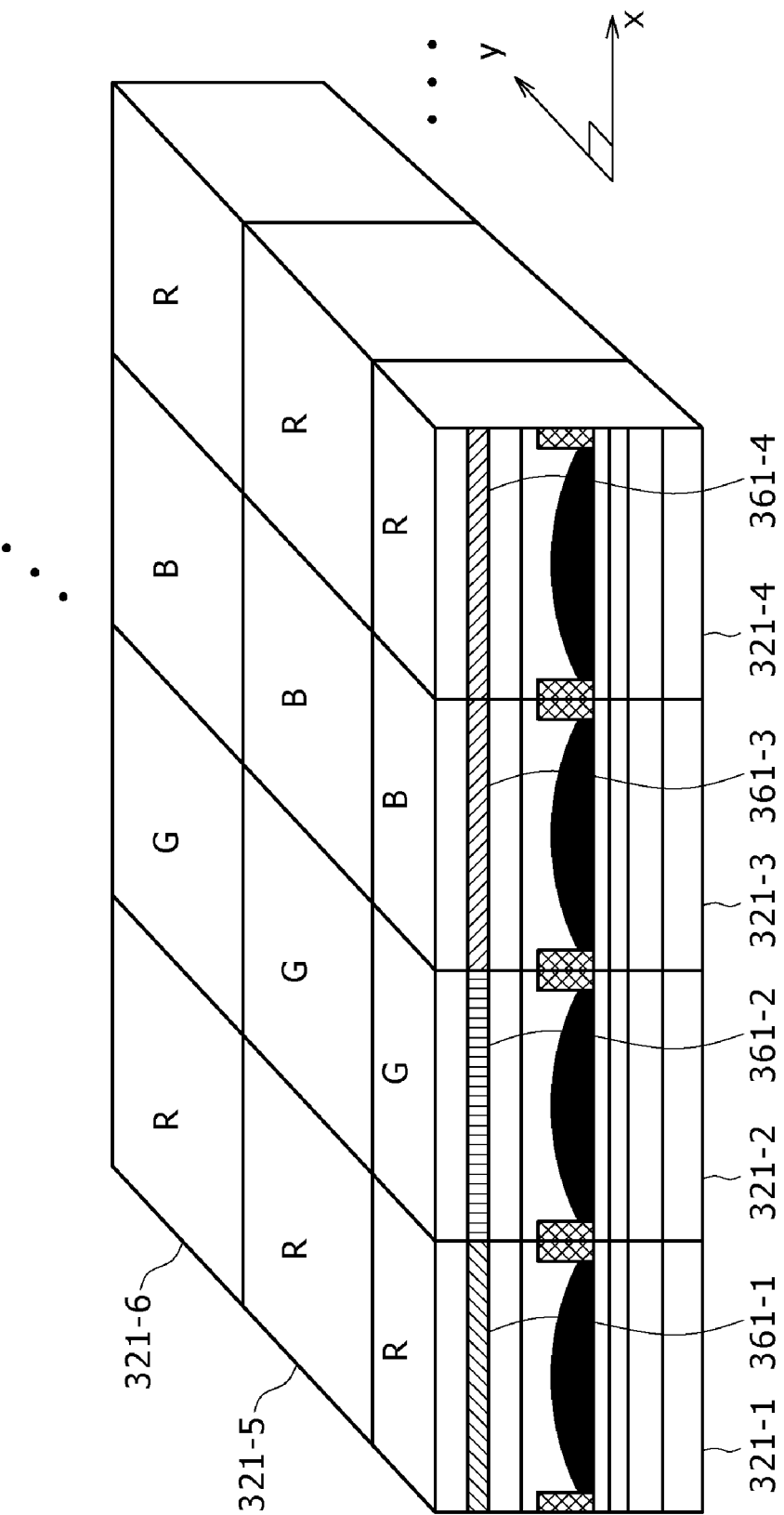
FIG. 27 is a diagram showing another example of the arrangement of the liquid devices.

An arrangement example of such liquid devices 321 is shown in FIG. 27. As shown in FIG. 27, also in this case, the liquid devices 321 are so arranged that the colors of the color filters 361 are the same color along the y direction and are repeated in the order of red, green, and blue along the x direction, as with the case shown in FIG. 25.

For example, the color of a color filter 361-1 of a liquid device 321-1 and a color filter 361-4 of a liquid device 321-4, which are indicated by a pattern of oblique lines running from the upper right to the lower left, is red. The color of a color filter 361-2 of a liquid device 321-2, which is indicated by a pattern of vertical lines, is green. The color of a color filter 361-3 of a liquid device 321-3, which is indicated by a pattern of oblique lines running from the lower right to the upper left, is blue. Furthermore, all of the colors of the color filters 361 of the liquid devices 321 whose top surface is indicated by a character "R," like a liquid device 321-5 and a liquid device 321-6, are red. All of the colors of the color filters 361 of the liquid devices 321 whose top surface is indicated by a character "G" are green. All of the colors of the color filters 361 of the liquid devices 321 whose top surface is indicated by a character "B" are blue. In addition, in the case of FIG. 27, the color of the nonpolar liquids 46 of all of the liquid devices 321 is black.

As with the case of FIG. 25, the arrangement of the colors of the color filters 361 of the respective liquid devices 321 is any. For example, an arrangement way other than that shown in FIG. 27, like the Bayer array, may be employed. Furthermore, the number of colors of the color filter 361 may be two or four or more. Moreover, the representation of "R," "G," and "B" of FIG. 27 is given for convenience of description and they are not characters printed on the actual liquid devices 321.

In addition, as with the case of FIG. 22, the color of the nonpolar liquid 46 of each liquid device 321 is any, and it is sufficient that the nonpolar liquid 46 is so configured as not to allow the passage of light therethrough.

In the above, the description is so made that the image display device 301 is a transmissive display having the light emitting source 311 on the backside of the image display unit 313. However, it may be a display other than this, such as a reflective display.

Figure 28:
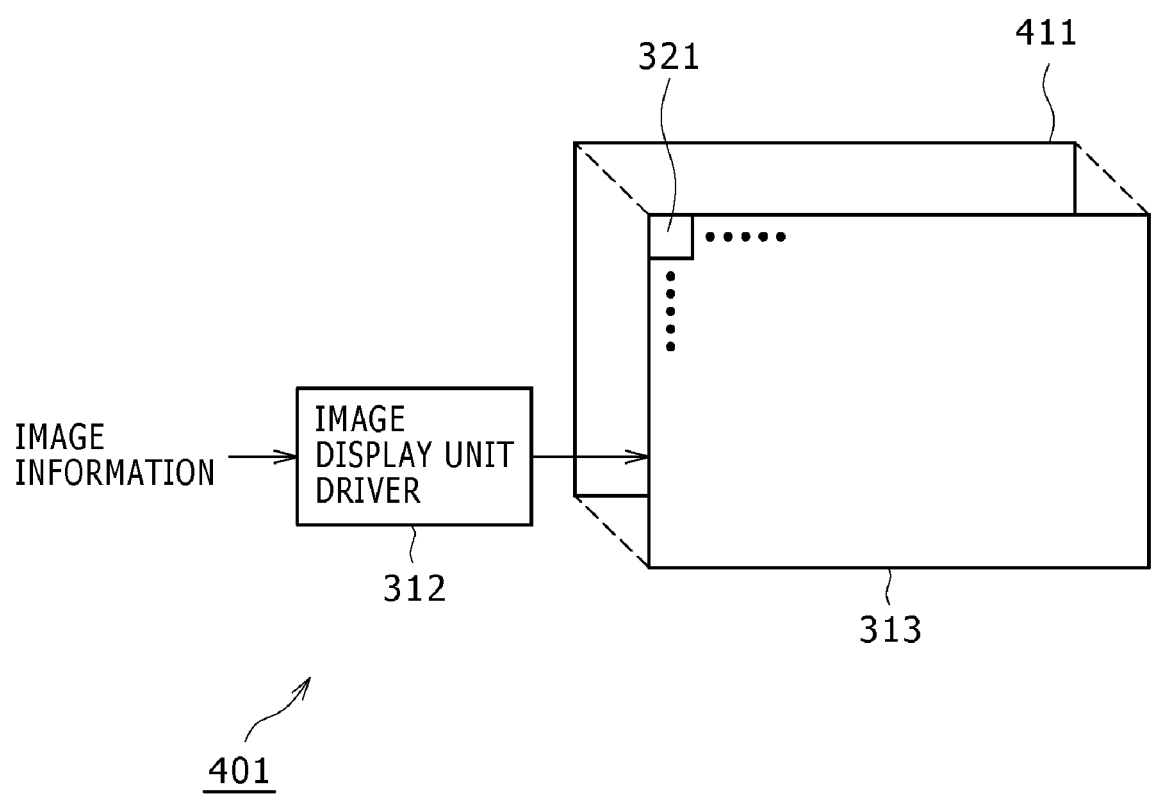
FIG. 28 is a block diagram showing another configuration example of the image display device to which the present invention is applied.

FIG. 28 is a block diagram showing a configuration example of a reflective image display device to which the present invention is applied. FIG. 28 is a diagram corresponding to FIG. 21. An image display device 401 shown in FIG. 28 has the image display unit driver 312 and the image display unit 313 as with the image display device 301 of FIG. 21, but has a light reflector 411 instead of the light emitting source 311.

The light reflector 411 is formed of a metal plate or the like having high reflectivity, and reflects the transmitted light of the liquid device 321 to return the light to the liquid device 321. The light reflector 411 may be formed of a white scattering plate that is composed of titanium oxide or the like and reflects light in such a way that the reflected light is uniformly scattered in the space.

In the case of the image display device 401, incident light that is incoming from the front surface side of the image display unit 313 passes through the image display unit 313 and is reflected by the light reflector 411. The reflected light passes through the image display unit 313 again and reaches the user's eyes. Thus, for a user, the image display surface appears to display an image.

Specifically, although illustration is omitted, a light source is disposed on the user-existing side, which is the opposite side to the light reflector 411 on the basis of the image display unit 313, and light is emitted from this light source toward the image display unit 313. It should be noted that, this light may be artificial light like illuminating light, or sunlight, or both of them.

The structure of the liquid device 321 in this case is basically the same as that of the case of the image display device 301 shown in FIG. 21. However, in this case, light enters the liquid device 321 through the upper substrate 49. Of the incident light that has entered the image display unit 313, the light incident on the liquid device 321 of the state in which the optical shutter is opened passes through this liquid device 321 and is reflected by the light reflector 411. The action of the liquid device 321 on this reflected light is the same as that of the case of the liquid device 321 in the image display device 301, described with reference to FIGS. 23 and 24.

In this case, in the state in which the optical shutter is closed, light that is incoming through the upper substrate 49 of the liquid device 321 is blocked in the expanded nonpolar liquid 46. It is preferable that, at this time, the occurrence of reflected light due to the nonpolar liquid 46 be suppressed. Specifically, it is preferable that an image be represented as black at the position of the liquid device 321 of the state in which the optical shutter is closed, and it is preferable that the color of the nonpolar liquid 46 be set to a color that absorbs light of many wavelengths, such as black, for example.

Figure 29:
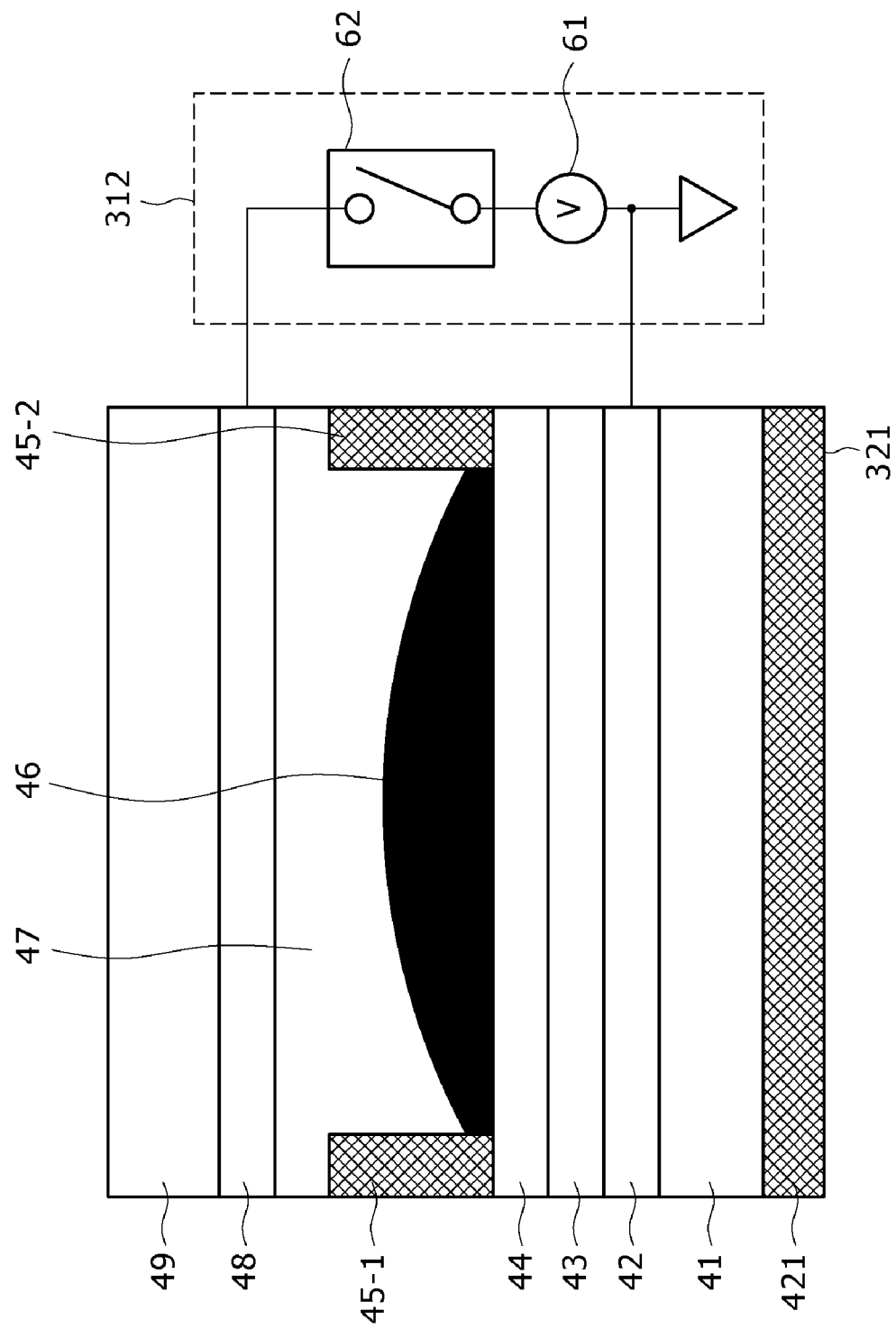
FIG. 29 is a diagram showing yet another configuration example of the liquid device.
Figure 30:
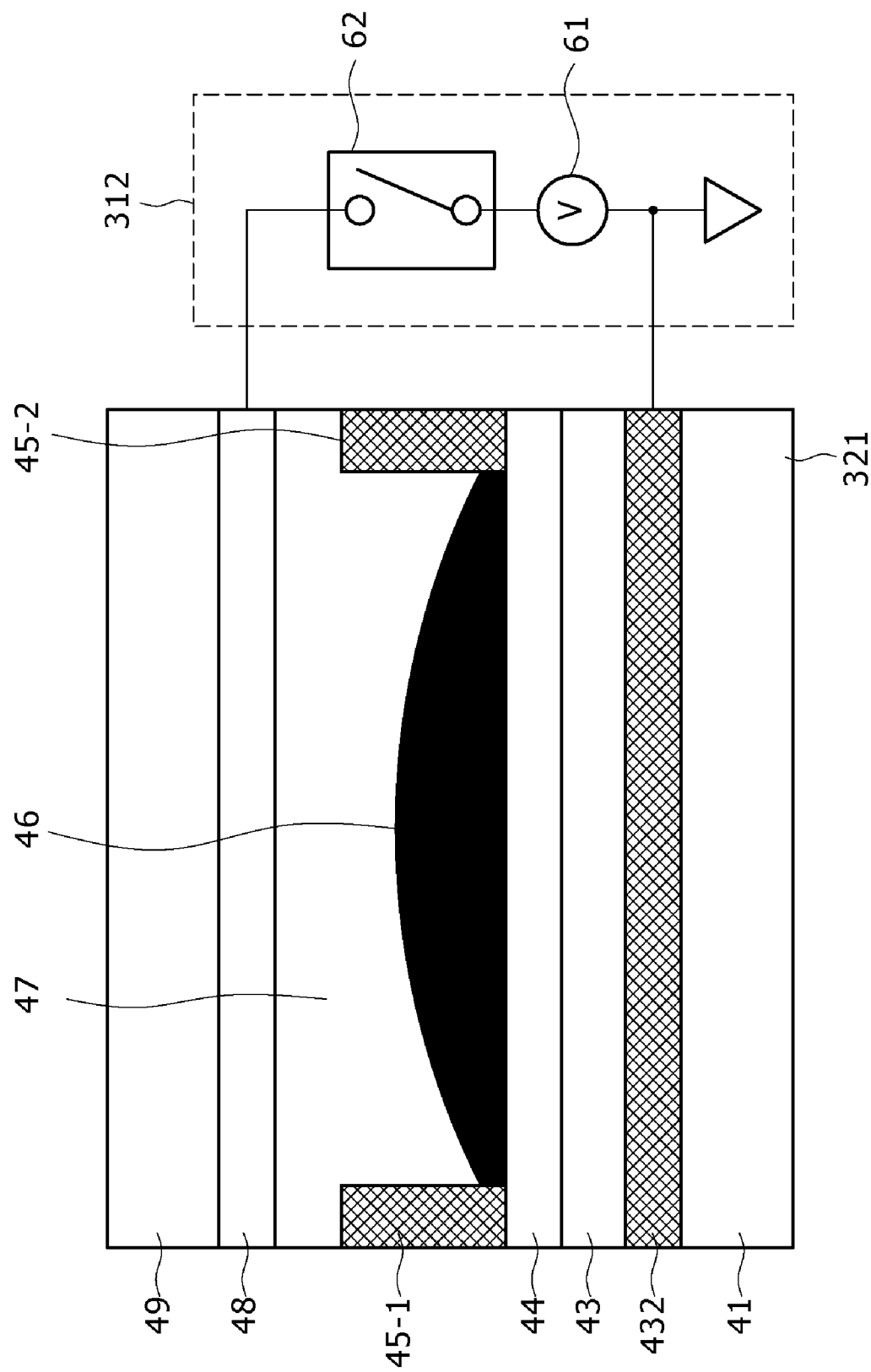
FIG. 30 is a diagram showing yet another configuration example of the liquid device.

In the case of the image display device 401 shown in FIG. 28, the liquid device 321 may be configured as shown in FIGS. 29 and 30, with the image display unit 313 and the light reflector 411 integrally configured.

In the case of the example shown in FIG. 29, a layer of a white scattering plate 421 is further formed under the lower substrate 41, i.e. on the backside of the image display unit 313. This white scattering plate 421 is a layer that reflects light in such a way that the reflected light is uniformly scattered in the space, and is composed of titanium oxide or the like, as described above. Specifically, in this case, incident light that is incoming from the upper side in FIG. 29 is reflected by this white scattering plate 421 and is emitted toward the upper side of FIG. 29 again.

In the case of the example shown in FIG. 30, a non-transparent lower electrode 432 composed of a metal or the like is used instead of the transparent lower electrode 42. In this case, incident light that is incoming from the upper side in FIG. 30 is reflected by this lower electrode 432 and is emitted toward the upper side of FIG. 30 again.

In the case of the example of FIG. 29, reflected light is clean white light, and therefore the image quality of a displayed image is enhanced compared with the case of FIG. 30. In contrast, this example has a characteristic that the configuration is complicated and the manufacturing cost is high.

Also in the case of such a reflective image display device 401, by rendering the nonpolar liquid 46 of the liquid device 321 non-transparent black, a binary image and a grayscale image can be displayed as with the case of the transmissive image display device 301 described with reference to FIG. 21.

Furthermore, the image display device 401 may be so configured that the image display unit 313 can display a color image, by arranging the liquid devices 321 in which the color of the nonpolar liquid 46 is red, green, or blue into a predetermined pattern as described with reference to FIG. 25. At this time, the nonpolar liquid 46 may be rendered semi-transparent or non-transparent. If the nonpolar liquid 46 is non-transparent, the incident light that has entered the liquid device 321 from the front surface is reflected by this nonpolar liquid 46 and is emitted from the front surface as light of a predetermined color. That is, in this case, the configuration such as the light reflector 411 and the white scattering plate 421 for reflecting light can be omitted. In this case, the reflected light is more intense when the optical shutter is closed to a larger extent, whereas the reflected light is less intense when the optical shutter is opened to a larger extent. That is, the control method for the image display unit driver 312 is opposite to that of the case of the above-described other examples.

Figure 31:
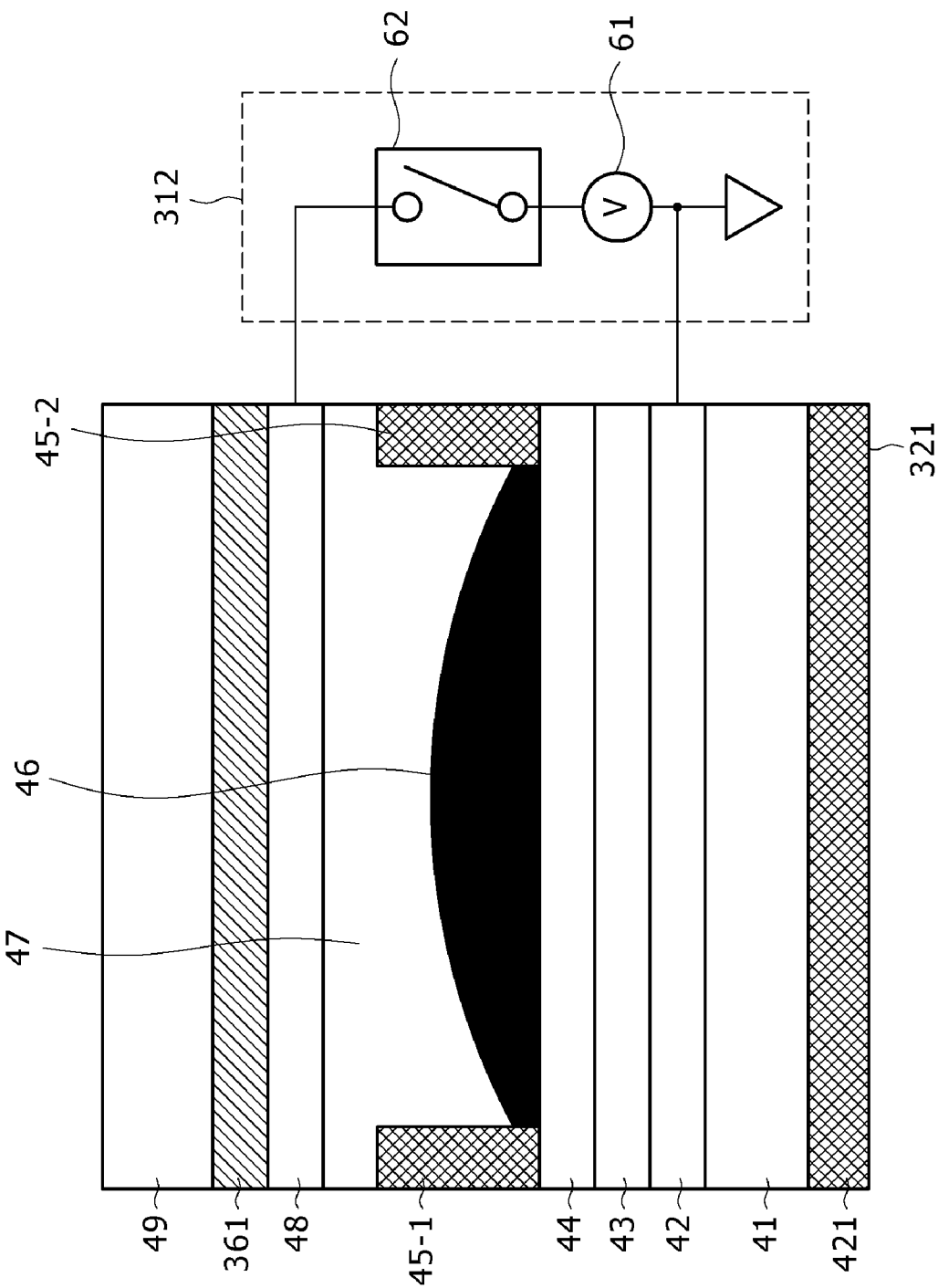
FIG. 31 is a diagram showing yet another configuration example of the liquid device.
Figure 32:
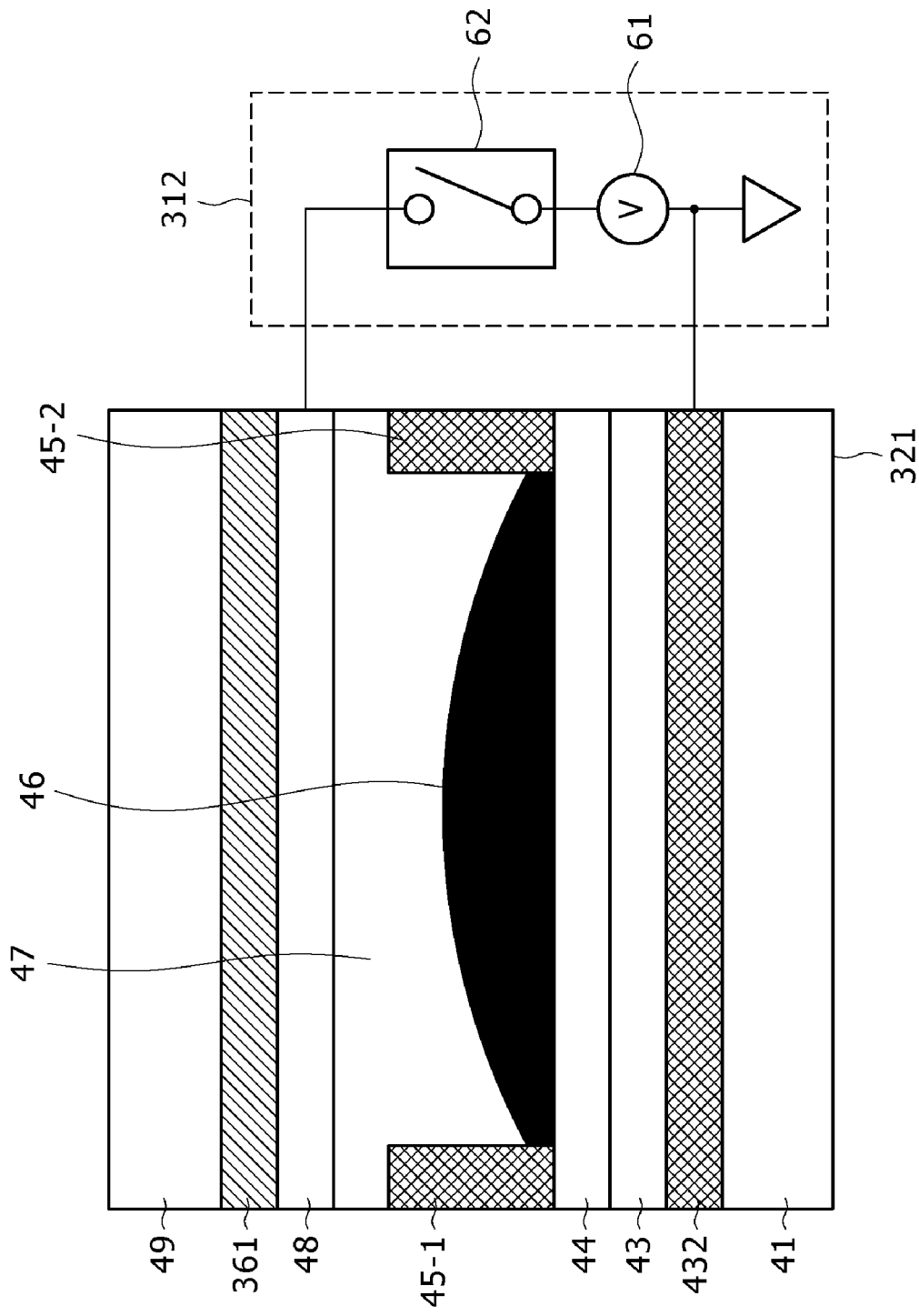
FIG. 32 is a diagram showing yet another configuration example of the liquid device.

Furthermore, also in the case of the reflective image display device 401, the liquid device 321 may have the color filter 361 as shown in FIGS. 31 and 32, as with the case of the transmissive image display device 301. FIG. 31 shows a configuration example of the liquid device 321 in the case of having the color filter 361 and the white scattering plate 421. FIG. 32 shows a configuration example of the liquid device 321 in the case of having the color filter 361 and the non-transparent lower electrode 432. Specifically, FIG. 31 is a diagram that corresponds to FIG. 29 and shows an example of the configuration resulting from addition of the color filter 361 to the configuration shown in FIG. 29. FIG. 32 is a diagram that corresponds to FIG. 30 and shows an example of the configuration resulting from addition of the color filter 361 to the configuration shown in FIG. 30.

In the case of FIGS. 31 and 32, reflected light arising from reflection by the white scattering plate 421 or the lower electrode 432 passes through the color filter 361 and passes through the liquid device 321. Specifically, in the liquid device 321 of the state in which the black nonpolar liquid 46 is contracted and the optical shutter is opened, light of the color of the color filter 361 is emitted from the front surface as with the case of the transmissive image display device 301. In the liquid device 321 of the state in which the black nonpolar liquid 46 is expanded and the optical shutter is closed, transmission light is blocked as with the case of the transmissive image display device 301. Specifically, also in this case, it is preferable that an image be represented as black at the position of the liquid device 321 of the state in which the optical shutter is closed, and it is preferable that the color of the nonpolar liquid 46 be set to a color that absorbs light of many wavelengths, such as black, for example.

As above, the reflective image display device can be achieved in the same manner as that of the case of the transmissive image display device basically, and can display all of binary images, grayscale images, or color images.

Figure 33:
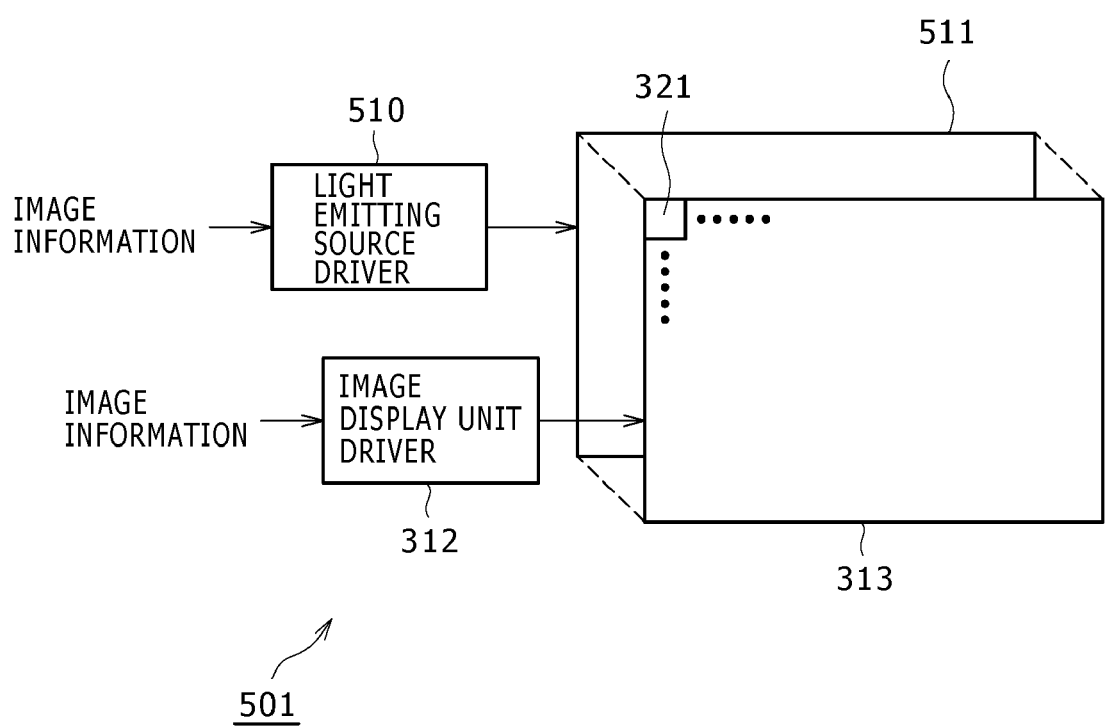
FIG. 33 is a block diagram showing yet another configuration example of the image display device to which the present invention is applied.

Instead of the light emitting source that emits single-color light, a color light emitting source that emits light of plural colors may be used. FIG. 33 is a block diagram showing a configuration example of an image display device to which the present invention is applied in this case.

In FIG. 33, an image display device 501 has the image display unit driver 312 and the image display unit 313 as with the image display device 301 of FIG. 21, but has a light emitting source driver 510 and a color light emitting source 511 instead of the light emitting source 311 of the image display device 301.

The color light emitting source 511 includes e.g. LED (Light Emitting Diode) as its light source. Due to the light emission of the respective LEDs, the color light emitting source 511 sequentially emits red, green, and blue light beams repeatedly in a time-division manner from the light emitting surface opposed to the image display unit 313. Across the whole of the light emitting surface of the color light emitting source 511, red LEDs that emit red light, green LEDs that emit green light, and blue LEDs that emit blue light are disposed in an array manner. The respective LEDs emit light in accordance with control by the light emitting source driver 510.

The light emitting source driver 510 controls the light emission of the respective LEDs of the color light emitting source 511 in synchronization with input image information, and sequentially emits, from the light emitting surface, light beams of the respective colors with a predetermined pattern repeatedly.

Specifically, based on the control by the light emitting source driver 510, red light, green light, and blue light are emitted with a predetermined time-division pattern from the whole of the light emitting surface of the color light emitting source 511. Therefore, red light is emitted from the whole of the light emitting surface at a certain time. Green light is emitted from the whole of the light emitting surface at another certain time, and blue light is emitted from the whole of the light emitting surface at yet another certain time.

Any component may be used as the respective LEDs disposed on the light emitting surface of the color light emitting source 511. The size, shape, light emission amount, the number of colors, and so on of the LEDs are any, and may be different from each other. Furthermore, the arrangement patterns of the LEDs of the respective colors may be different from each other. LEDs of three colors may be disposed with a predetermined regular pattern like the Bayer array, or may be disposed with an irregular pattern. Specifically, although the arrangement positions of the LEDs are any on the light emitting surface, it is preferable to, as a result, obtain the state in which light beams of the respective colors are emitted from the whole of the light emitting surface with a uniform light amount, i.e. partial bias of the light amount is absent and difference in the light amount is absent also among the respective colors, e.g. by arranging, in plurality, each of red LED, green LED, and blue LED whose light emission amounts are identical to each other in such a way that these LEDs are uniformly dispersed across the whole of the light emitting surface.

Although a description will be made below with use of an LED as an example of the light source, another light source may be used instead of the LED.

The time-division pattern of three colors and the length of the time-division cycle are any. However, it is preferable that the cycle length be so short that, for the human eye, changes of the light emission color can not be confirmed but the respective colors appear to be mixed, for example.

Specifically, it is preferable that, when all of the liquid devices 321 of the image display unit 313 are fixed with the optical shutter opened, all of the light beams of three colors appear to be uniformly mixed with the maximum amount and be uniform across the entire screen and look like a white image that is free from also temporal changes for a user viewing the image display surface.

The image display unit 313 employs such three-color light beams as its backlight and controls the transmission of light beams of the respective colors in the respective liquid devices 321 in accordance with control by the image display unit driver 312 based on image information. Thereby, the image display unit 313 controls the way of mixing of three colors and displays a color image on the image display surface.

In this case, because the transmitted light is red, green, or blue, the configuration of the liquid device 321 in this case is the same as that of the configuration shown in FIG. 23. Specifically, the nonpolar liquid 46 is a liquid containing a black dye, or a liquid in which a black colorant is dissolved, or a liquid in which a black pigment is mixed, and is configured as a non-transparent black liquid. Furthermore, a color filter, a white scattering plate, and so on are also not provided. In addition, a transparent electrode is also used as the lower electrode 42.

The liquid device 321 controls the way of mixing of three colors by controlling the transmission of light beams of the respective colors. Specifically, the liquid device 321 is so driven as to make the color of the light emitted from this liquid device 321, i.e. the color seen by a user, by mixing the respective colors of the three-color backlight emitted in a time-division manner. That is, any color can be made by one liquid device 321. The "mixing the colors" in this case refers to making of the color that is seen by a user viewing the image as a result, and does not refer to actual mixed-existence of the light beams of the respective colors. That is, the light beams of the respective colors are temporally separated, although the details thereof will be described later.

The respective liquid devices 321 may be driven independently of each other. Alternatively, plural liquid devices 321 may be collected as a group and they may be driven on a group-by-group basis.

Figure 34:
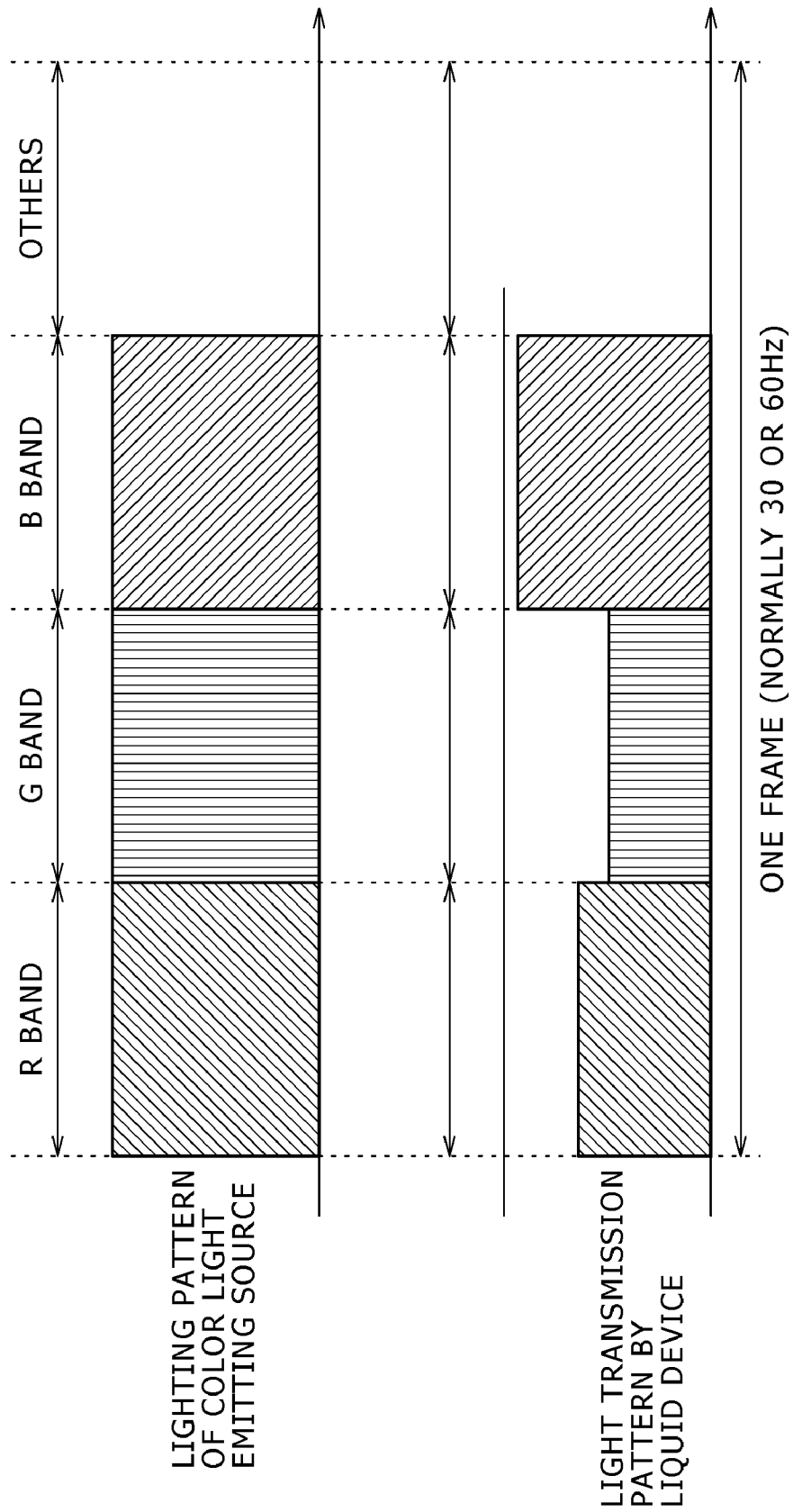
FIG. 34 is a diagram for explaining an example of a color mixing method.
Figure 35:
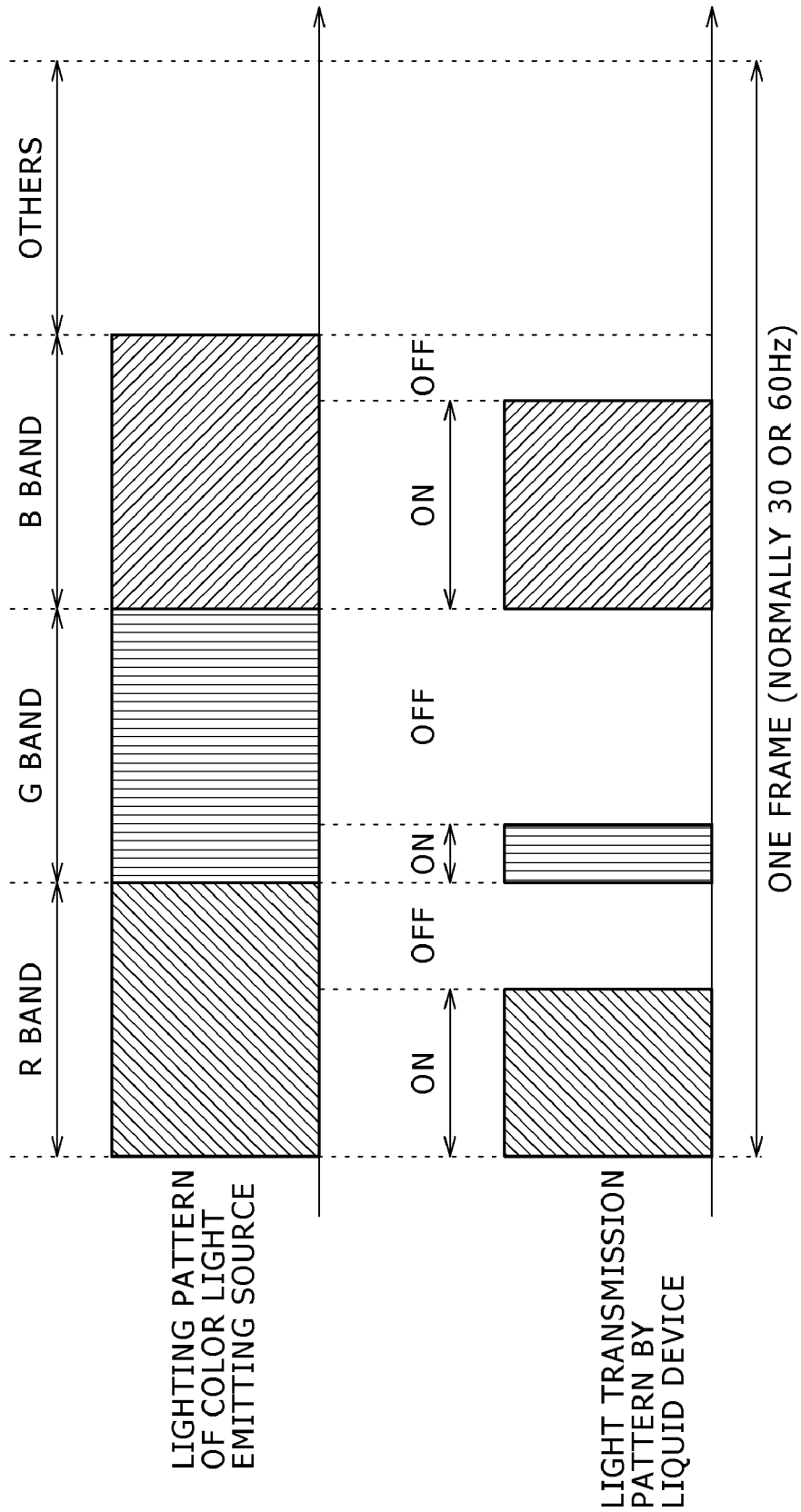
FIG. 35 is a diagram for explaining an example of another color mixing method.
Figure 36:
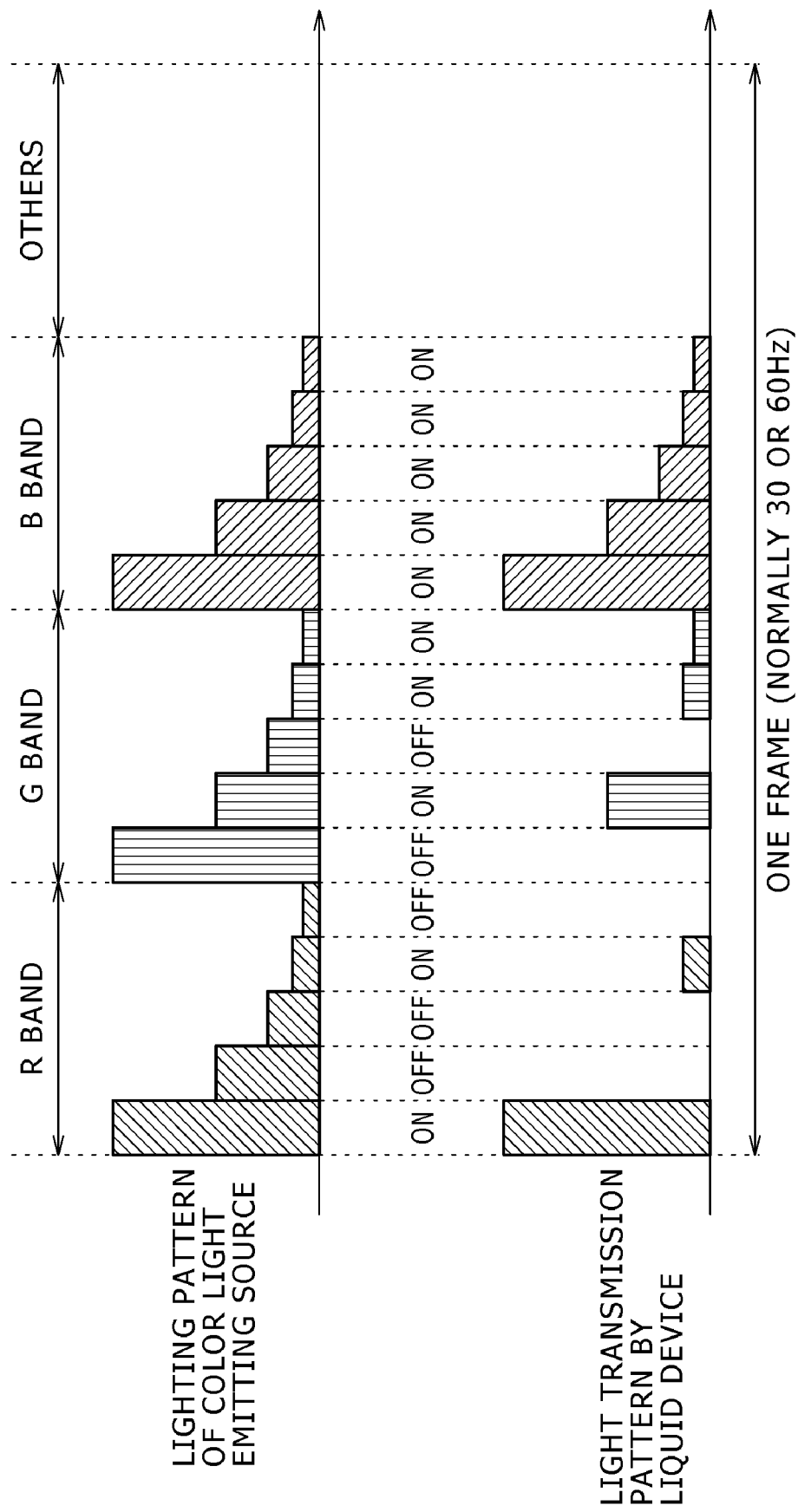
FIG. 36 is a diagram for explaining an example of yet another color mixing method.

With reference to FIGS. 34 to 36, examples of the lighting pattern of the color light emitting source 511 and the driving pattern of the liquid device 321 for this color mixing will be described. In FIGS. 34 to 36, the abscissa indicates the time series and the ordinate indicates the luminance.

In the case of the example of FIG. 34, the color light emitting source 511 divides one cycle of a frame of a frequency of 30 Hz normally or one cycle of a field of a frequency of 60 Hz into four parts of R band, G band, B band, and others. The red LED is turned on with certain luminance in the R band. The green LED is turned on with certain luminance in the G band. The blue LED is turned on with certain luminance in the B band. At this time, the luminances at the time of the lighting of the LEDs of the respective colors are equal to each other. Furthermore, the lengths of at least the R band, the G band, and the B band are equal to each other. That is, from the light emitting surface of the color light emitting source 511, red light is emitted in the R band, green light is emitted in the G band, and blue light is emitted in the B band. The light amounts of light beams of the respective colors are equal to each other.

On the other hand, the liquid device 321 changes the degree of opening of the optical shutter in an analogous manner and controls the light amount of transmitted light, i.e. the light transmission amount, in an analogous manner. The image display unit driver 312 adjusts the voltage of the power supply 61 in an analogous manner to thereby apply any voltage to the lower electrode 42 and the upper electrode 48 of each liquid device 321 and arbitrarily control the change amount of the nonpolar liquid 46, i.e. the degree of contraction or expansion. This allows the liquid device 321 to control the amount of light that passes through the rib pixel in an analogous manner. Therefore, by arbitrarily controlling each of the transmission amounts of light beams of the respective colors as shown in FIG. 34, the liquid device 321 can arbitrarily control the light amounts of the respective colors to be mixed and can make any color.

In the band of others, the color light emitting source 511 does not cause the LEDs of any color to emit light. That is, the color of the backlight becomes black. Furthermore, it is also possible that, in the band of others, the color of the backlight is rendered white by turning on all of the LEDs. Moreover, it is also possible that only one part of the LEDs is turned on. The color of the backlight in this band of others may be any color as long as it is other than red, green, and blue.

One cycle of a frame or a field may be divided into three bands of the R band, the G band, and the B band without the provision of such a band of others. However, in general, in the case of employing such a field sequential color system, in which the respective colors emitted in a time-division manner are mixed, color breakup, which is a phenomenon that the color on the display screen appears to be different from its original color, easily occurs when a user moves the gaze point from the upper right to the lower left on the display screen. The occurrence of this color breakup can be reduced by dividing one cycle of a frame or a field into not three parts but four parts as described above.

For the example of FIG. 34, the description is so made that the liquid device 321 controls the light amount of transmitted light based on the degree of opening of the optical shutter. However, instead of this, the light amount of transmitted light may be controlled by controlling the time period during which the optical shutter is opened.

In the case of the example of FIG. 35, the LEDs of the respective colors in the color light emitting source 511 are turned on for each certain time period with certain luminance, with the same pattern as that of the example of FIG. 34. However, the respective liquid devices 321 of the image display unit 313 operate with a pattern different from that of the example of FIG. 34. In the case of the example of FIG. 35, the liquid device 321 controls the time period during which the optical shutter is opened in an analogous manner.

Specifically, the image display unit driver 312 adjusts the time periods of the on-state and the off-state of the switch unit 62 in an analogous manner to thereby arbitrarily control the time period during which voltage is applied to the lower electrode 42 and the upper electrode 48 of each liquid device 321 and arbitrarily control the time period of the state in which the nonpolar liquid 46 is contracted and stabilized or the time period of the state in which the nonpolar liquid 46 is expanded and stabilized. That is, in this case, the liquid device 321 is stabilized in only two states: the state in which the optical shutter is opened and the state in which it is closed. Based on the lengths of the time periods of these two stable states, the liquid device 321 controls the time period during which light passes through the rib pixel and controls the light amount of the transmitted light. In this manner, by arbitrarily controlling each of the transmission amounts of light beams of the respective colors as shown in FIG. 35, the liquid device 321 can arbitrarily control the light amounts of the respective colors to be mixed and can make any color.

The example of FIG. 34 and the example of FIG. 35 may be combined with each other, obviously. Specifically, each liquid device 321 may control both the degree of opening of the optical shutter and the time period of the opening to thereby control the light amounts of transmitted light beams of the respective colors and make any color.

Furthermore, as shown in FIG. 36, the luminance at the time of the lighting of the respective LEDs of the color light emitting source 511 may be changed.

In the case of the example of FIG. 36, small bands arising from further division of each of the R band, the G band, and the B band into five parts are provided, and the respective LEDs are so configured as to be turned on in the respective small bands with luminances different from each other. In the case of the example of FIG. 36, the LED is turned on with the maximum luminance in the first small band, and, in each of the subsequent small bands, is turned on with luminance lower than that in the previous small band. Specifically, the color light emitting source 511 emits red light in such a way that the luminance is the highest at the time of the activation and becomes lower gradually, in the whole of the R band. The color light emitting source 511 emits green light in such a way that the luminance is the highest at the time of the activation and becomes lower gradually, in the whole of the G band. The color light emitting source 511 emits blue light in such a way that the luminance is the highest at the time of the activation and becomes lower gradually, in the whole of the B band. In the band of others, the color light emitting source 511 turns off all of the LEDs.

For the color light emitting source 511 that emits light with such a pattern, each liquid device 321 of the image display unit 313 controls the opening and closing of the optical shutter for each small band. That is, the image display unit driver 312 controls the turning-on/off of the switch unit 62 for each small band based on image information. This allows the liquid device 321 to control transmission or blocking of light emitted from the light emitting surface of the color light emitting source 511 for each small band. As described above, the luminances of the light emitted from the light emitting surface of the color light emitting source 511 in the respective small bands are different. Therefore, by selectively allowing the passage of light beams of the respective small bands, the liquid device 321 can control the light amount of this color in a multilevel manner.

For example, in the case of the example of FIG. 36, the liquid device allows the passage of light beams of the first small band and the fourth small band in the R band. In the G band, the liquid device allows the passage of light beams of the second small band, the fourth small band, and the fifth small band. In the B band, the liquid device allows the passage of light beams of all of the small bands. The total of the amounts of the light beams of the respective small bands transmitted in the band of a certain color, i.e. the R band, the G band, or the B band, is the light amount of this color. Therefore, the liquid device 321 can control the light amounts of the respective colors in a multilevel manner based on the combination of the small bands in which light is transmitted. Therefore, the liquid device 321 can control the light amounts of the respective colors to be mixed in a multilevel manner and can make any color substantially.

The number of small bands arising from division of the band of each color is any. Furthermore, the luminance may be linearly changed in the band of each color. Moreover, like in the example of FIG. 34, the degree of opening of the optical shutter of the liquid device 321 may also be controlled simultaneously. Like in the example of FIG. 35, the time period during which the optical shutter of the liquid device 321 is opened may be arbitrarily controlled.

As above, the liquid device 321, to which the present invention is applied, can be applied to image display devices of various systems.

The following experiments were performed on the liquid device 321 operating as such an optical shutter.

First, as "Comparative example 1" as the reference, a liquid device that does not have the insulating film 43 but has only the water-repellent film 44, which is a conventional configuration, is used. Furthermore, liquid devices having the insulating film 43, which are the configuration to which the present invention is applied, are defined as "Working example 1" to "Working example 3" for each of various conditions. About these "Comparative example 1" and "Working examples," experimental results are compared with each other. That is, the liquid devices of "Working example 1" to "Working example 3" have the same structure as that of the liquid device 321 basically. The liquid device of "Comparative example 1" has the same structure as that of the liquid device 321 basically, except that it does not have the insulating film 43.

Figures 37, 38:
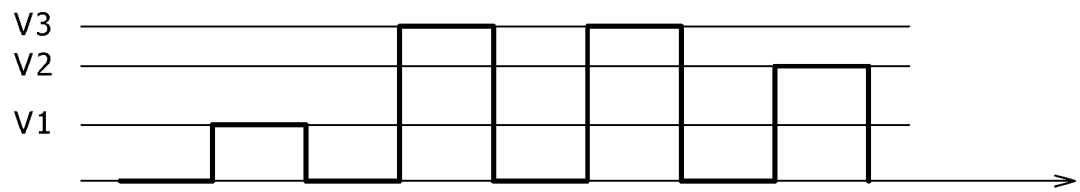
FIG. 37 is a table showing an example of experimental conditions.
FIG. 38 is a diagram showing an example of the waveform of a pulse applied to the liquid device.

In the first experiment, the film thicknesses of the insulating film 43 and the water-repellent film 44 of the respective liquid devices are employed as the conditions as shown in the table of FIG. 37, and the relationships between the amplitude voltage of the voltage applied between the lower electrode 42 and the upper electrode 48 and the transmittance of light that passes through the liquid device, i.e. the relationships between the magnitude of the applied voltage and the degree of opening of the optical shutter, under the respective conditions are compared.

Specifically, as shown in FIG. 37, as "Comparative example 1" as the reference, the film thickness of the water-repellent film 44 in the liquid device having the conventional configuration is set to 300 nm. In this case, the insulating film 43 is not formed. Furthermore, as "Working example 1," the film thickness of the insulating film 43 of the liquid device to which the present invention is applied is set to 100 nm and the film thickness of the water-repellent film 44 is set to 150 nm. As "Working example 2," the film thickness of the insulating film 43 of the liquid device to which the present invention is applied is set to 100 nm and the film thickness of the water-repellent film 44 is set to 80 nm. As "Working example 3," the film thickness of the insulating film 43 of the liquid device to which the present invention is applied is set to 200 nm and the film thickness of the water-repellent film 44 is set to 80 nm.

About the respective cases of "Comparative example 1," "Working example 1," "Working example 2," and "Working example 3," the relationships between the magnitude of the applied voltage and the degree of opening of the optical shutter are compared.

In all of the cases of "Comparative example 1," "Working example 1," "Working example 2," and "Working example 3," a partition employing a black resist is so fabricated as the rib 45 on the water-repellent film 44 by a photolithography step as to have a width of 5 µm, a partition interval of 300 µm, and a film thickness of 3 µm. Furthermore, as the nonpolar liquid 46, a liquid prepared by dispersing carbon black as a general black pigment in an oil material (e.g. an aliphatic hydrocarbon solvent typified by dodecane) is used. The gap between the ITO electrodes opposed to each other, i.e. the interval between the lower electrode 42 and the upper electrode 48, is set to 100 µm. Furthermore, the size of one pixel is set to 300 µm square.

To the liquid devices having such a structure, a positive single-polarity pulse that has a waveform like that shown in FIG. 38 and whose Duty=50% is applied in such a way that the potential of the lower electrode 42, over which the water-repellent film 44 is formed, is defined as the reference potential. The relationships between the amplitude voltage and the transmittance at that time are shown in the graphs of FIGS. 39 and 40.

Figure 39:
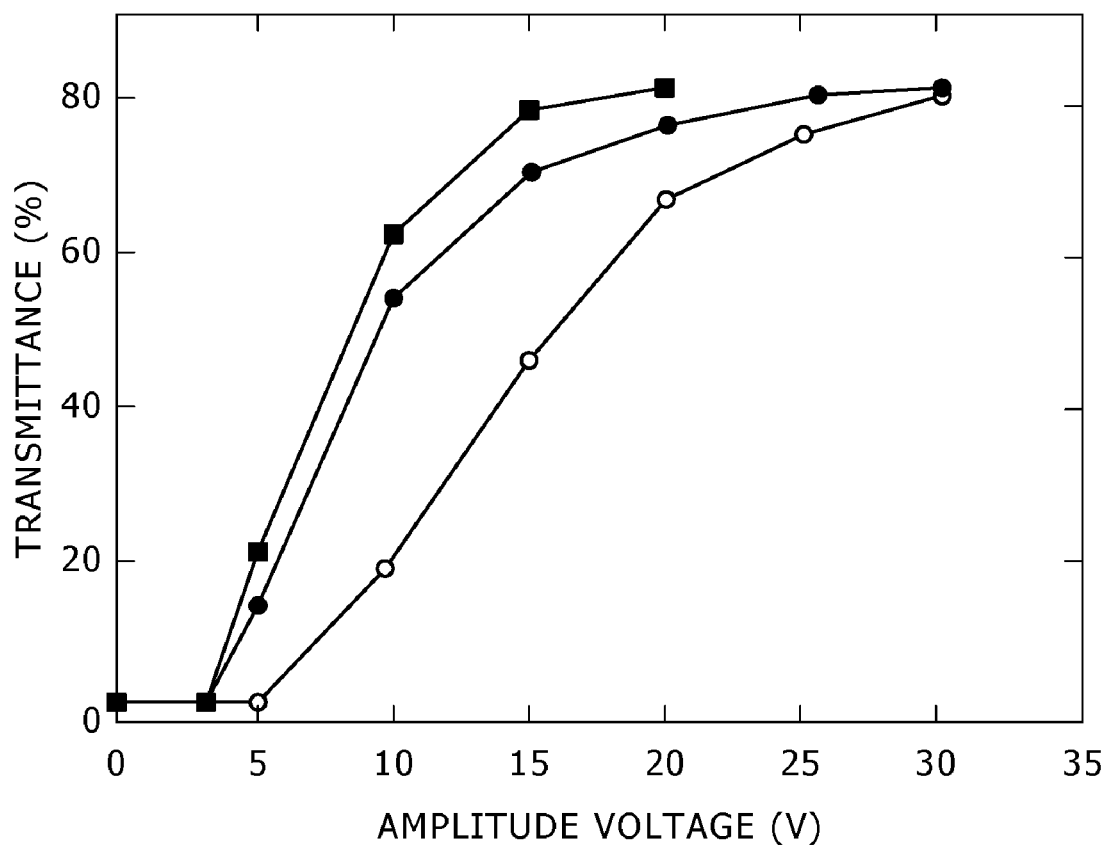
FIG. 39 is a graph showing an example of the relationships between the amplitude voltage and the transmittance.
Figures 40, 41:
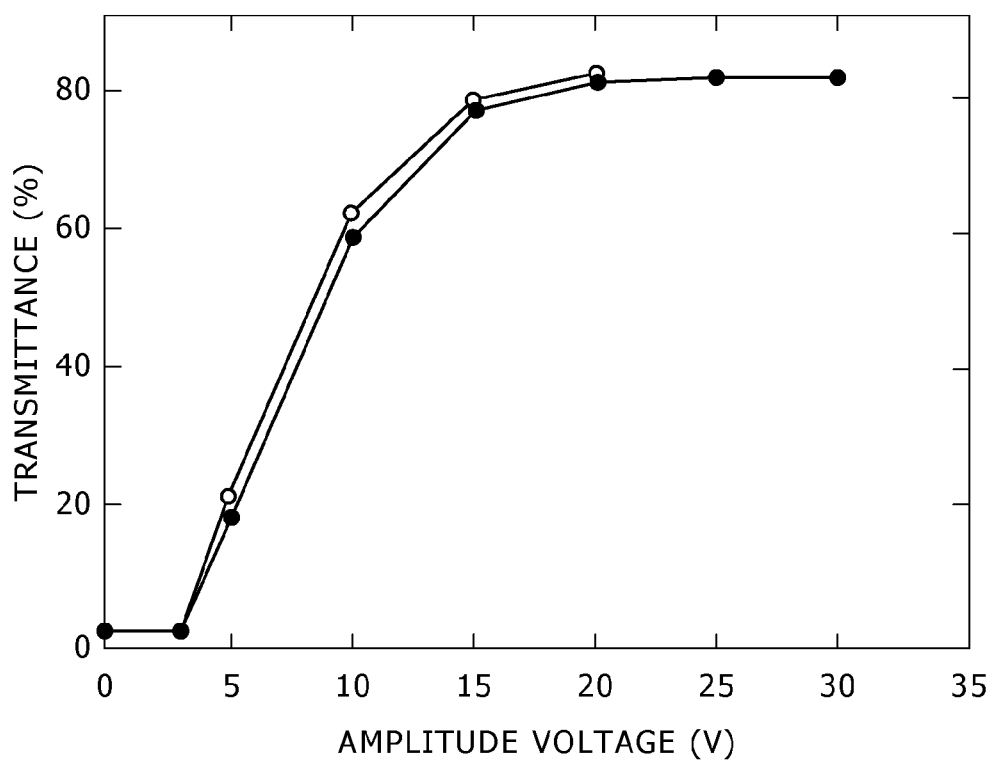
FIG. 40 is a graph showing an example of the relationships between the amplitude voltage and the transmittance.
FIG. 41 is a table showing another example of experimental conditions.

In FIG. 39, the white circles (○) indicate the relationship between the amplitude voltage and the transmittance of "Comparative example 1," the black circles (●) indicate the relationship between the amplitude voltage and the transmittance of "Working example 1," and the black squares (■) indicate the relationship between the amplitude voltage and the transmittance of "Working example 2."

If the liquid device is "Comparative example 1," which does not have the insulating film 43 but has only the water-repellent film 44 whose film thickness is 300 nm, the transmittance is increased as the amplitude voltage is increased. At this time, if the amplitude voltage surpasses 20 V, breakdown occurs in a part of the pixels. In contrast, in the case of "Working example 1" and "Working example 2," in which the liquid device has a double-layered structure with the insulating film 43 and the water-repellent film 44, the transmittance is increased with voltages lower than those of "Comparative example 1," and it is apparent that the present element structure contributes to a decrease in the voltage. Furthermore, if the voltage is equal to or lower than 20 V, breakdown does not occur at all even in the case of "Working example 2," in which the film thickness of the water-repellent film 44 is small.

That is, in the case of "Working example 1" and "Working example 2," the transmittance can be sufficiently enhanced with voltages lower than the amplitude voltage with which breakdown occurs, so that the power consumption can be lowered and the reliability can be enhanced.

Furthermore, in FIG. 40, the white circles (○) indicate the relationship between the amplitude voltage and the transmittance of "Working example 2," and the black squares (■) indicate the relationship between the amplitude voltage and the transmittance of "Working example 3."

Although the film thickness of the water-repellent film 44 is in common (80 nm) in "Working example 2" and "Working example 3," the film thickness of the insulating film 43 is different: it is 100 nm in "Working example 2" whereas it is 200 nm, larger than 100 nm, in "Working example 3." However, the voltage-transmittance curve is substantially the same between "Working example 2" and "Working example 3" as shown in FIG. 40. However, in the case of "Working example 3," the liquid device is more robust against breakdown and breakdown does not occur even when voltage of 30 V is applied.

A spin-coating method is used as a process for forming the water-repellent film 44. However, in practice, it is considerably difficult to deposit a thin film of 100 nm or thinner with a certain size extremely uniformly, and unevenness easily occurs. However, if the water-repellent film 44 has a thin part, the possibility of the occurrence of breakdown at this part is high. The influence thereof can be alleviated by forming the insulating film 43 having a large thickness. As shown in FIG. 40, even if the insulating film 43 having a large thickness is formed, increase in the driving voltage is sufficiently suppressed.

Thus, by employing a double-layered structure with the insulating film 43 and the water-repellent film 44 for the coating of the lower electrode 42 and the upper substrate 41 and setting the film thickness of the insulating film 43 sufficiently large, increase in the capacitance of the liquid device and suppression of breakdown can be simultaneously achieved. That is, the lowering of the power consumption of the liquid device and enhancement in the reliability thereof can be achieved by applying the present invention.

Moreover, under the structural condition of "Working example 1," the relationships between the amplitude voltage and the transmittance are compared with variation in the material of the insulating film 43 as shown in FIG. 41.

As shown in the table of FIG. 41, in "Working example 1" as the reference, a film whose relative dielectric constant is 20 is applied as the insulating film 43. In "Working example 4," a film whose relative dielectric constant is 14 is applied as the insulating film 43. In "Working example 5," a film whose relative dielectric constant is 6.5 is applied as the insulating film 43. All of the film thicknesses of the insulating film 43 and the water-repellent film 44 and the interval between the lower electrode 42 and the upper electrode 48 (the gap between the electrodes) are in common to each other in the respective working examples. The film thickness of the insulating film 43 is 100 nm, and the film thickness of the water-repellent film 44 is 150 nm. In addition, the gap between the electrodes is 100 μm.

Figure 42:
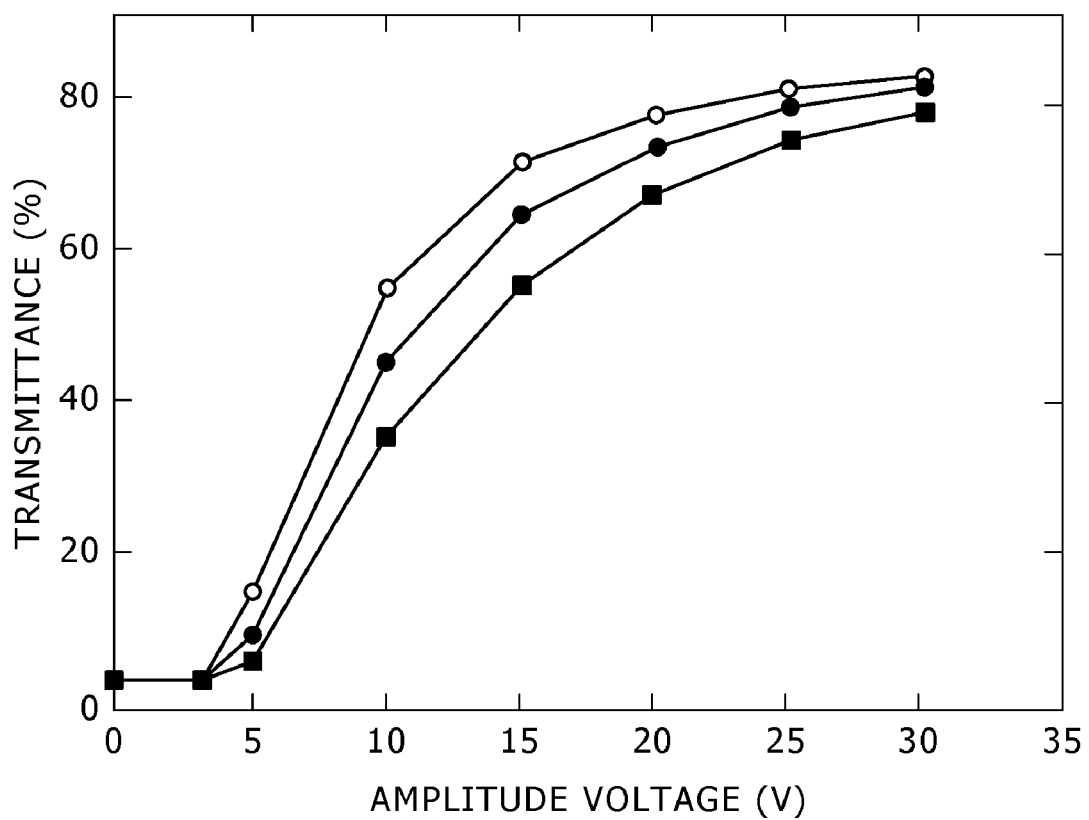
FIG. 42 is a graph showing an example of the relationships between the amplitude voltage and the transmittance.

The relationships between the amplitude voltage and the transmittance of these working examples are shown in the graph of FIG. 42. In FIG. 42, the white circles (○) indicate the relationship between the amplitude voltage and the transmittance of "Working example 1," the black circles (●) indicate the relationship between the amplitude voltage and the transmittance of "Working example 4," and the black squares (■) indicate the relationship between the amplitude voltage and the transmittance of "Working example 5."

As shown in the graph of FIG. 42, higher relative dielectric constant of the insulating film 43 contributes to a decrease in the voltage to a larger extent.

In order to enhance the generative force of electrowetting with lower voltage in the above-described liquid device, it is preferable that the film thicknesses of the insulating film 43 and the water-repellent film 44 be decreased and the relative dielectric constants thereof be increased in theory. However, at present, the relative dielectric constant of the substance that can be used as the insulating film 43 is at most about 20 in practice. Furthermore, decreasing the film thickness increases the possibility of the occurrence of breakdown and makes it more difficult to render the film thickness uniform without unevenness at the time of the manufacturing. Moreover, if unevenness of the film thickness is caused, breakdown occurs more easily at a thin part. In an actual manufacturing technique at present, it is difficult to stably form the insulating film 43 and the water-repellent film 44 having a film thickness equal to or smaller than 100 nm uniformly without unevenness by a spin-coating method, which is high in the process property.

Thus, the relative dielectric constant and the reliability can be enhanced compared with the conventional configuration by forming the insulating film 43 and the water-repellent film 44 to employ a double-layered part as the insulating part that structurally insulates the lower electrode 42 and the upper electrode 48. Although each of the film thicknesses of the insulating film 43 and the water-repellent film 44 is any, it is preferable that the film thickness of the insulating film 43 be set to 100 nm or larger for enhancement in the insulating property and the film thickness of the water-repellent film 44 be decreased in order to further decrease the driving voltage of the liquid device and further enhance the reliability thereof under such various practical conditions. Obviously, the film thicknesses are not limited thereto if they do not apply to the above-described conditions due to e.g. development of a new material and a new manufacturing method, but it is also possible that different film thicknesses provide a preferable configuration. Although the description is made about a liquid device utilized as an optical shutter in the above, the same applies also to another liquid device utilized for a use purpose other than the optical shutter.

Next, another use example of the liquid device 31 will be described.

Figure 43:
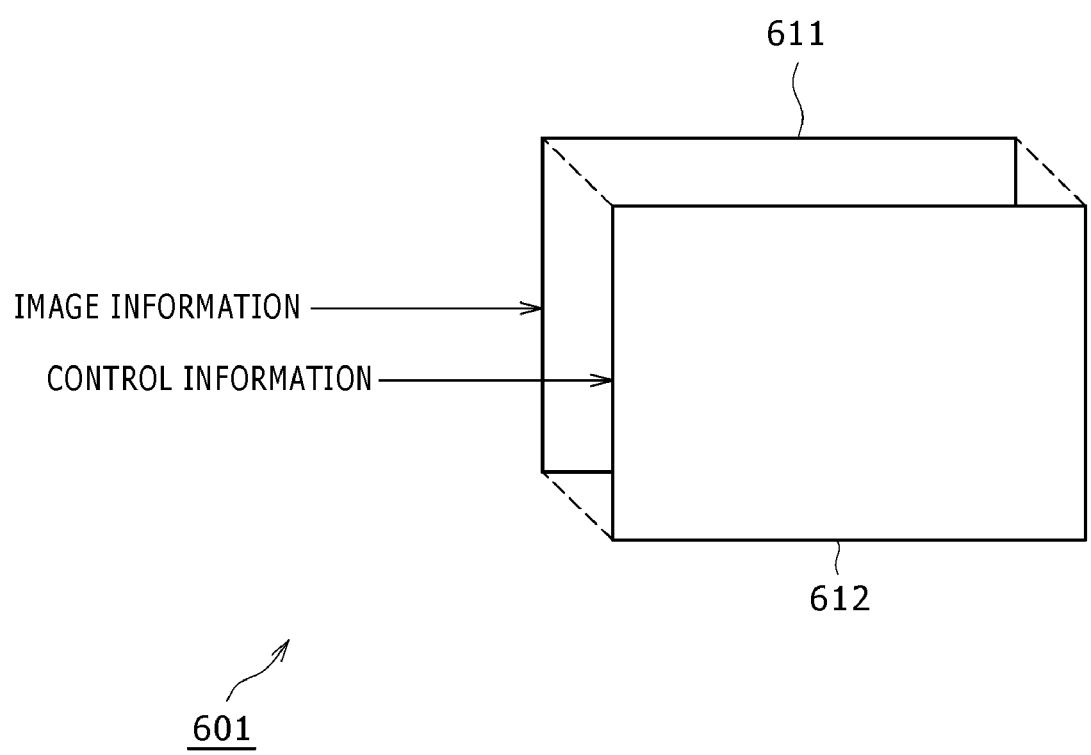
FIG. 43 is a block diagram showing yet another configuration example of the image display device to which the present invention is applied.

FIG. 43 shows the configuration of an embodiment of an image display device to which the present invention is applied. An image display device 601 has an image display unit 611 and a parallax generator 612.

The image display unit 611 causes light emitting pixels to emit light based on image information supplied from the external, to thereby two-dimensionally display a parallax image including parallax information. The parallax refers to a phenomenon that, although only one object is viewed, this object looks as images different from each other depending on the viewpoint. For example, in the ray reconstruction method (the integral photography method (hereinafter, referred to as the IP method)) as one of three-dimensional displaying methods, the phenomenon that the appearance (visual image) of a three-dimensional object differs depending on the viewing angle to this object is reproduced by using many parallax images. That is, for a user viewing one parallax image that is so displayed that a parallax is generated, the image (the contents of the parallax image) appears to differ depending on the position of the user (e.g. in the horizontal direction).

The parallax image is composed of plural planar images arranged in units of predetermined pixels and in a predetermined order for example. For example, for a parallax image that is composed of two planar images and generates a parallax in the horizontal direction, partial images of the respective planar images are alternately arranged along the horizontal direction in units of predetermined pixels. This partial image is an image arising from division of the original planar image along the vertical direction in units of the predetermined pixels along the horizontal direction. The number of pixels along the horizontal direction, of this partial image, is this predetermined number of pixels, and the number of pixels along the vertical direction, of this partial image, is the number of pixels along the vertical direction, of the original image. In the parallax image, these partial images are alternately arranged in the order of the arrangement in the respective original planar images. That is, if the arranged partial images are coupled to each other along the horizontal direction in such a way that every other partial image is skipped, one original planar image is restored. If the other partial images are coupled, the other planar image is restored.

Therefore, even when a user directly views a parallax image two-dimensionally displayed on the image display unit 611, because plural images are included in this parallax image, the user can not correctly understand these images.

The parallax generator 612 is superimposed on the surface on which a parallax image is displayed, of the image display unit 611. Based on control information supplied from the external, the parallax generator 612 operates in such a manner as to generate a parallax for a parallax image displayed on the image display unit 611. Thereby, the parallax generator 612 allows a user who views the parallax image two-dimensionally displayed on the image display unit 611 via the parallax generator 612 to see different images depending on the viewpoint thereof.

Although one example of the method for generating a parallax image is described above, it is obvious that the image synthesizing method may be a method other than the above-described method as long as it matches the parallax generating method of the parallax generator 612.

The parallax generator 612 has a liquid lens group that employs the above-described liquid device 31 and achieves a lens effect by utilizing the interface of a liquid, as described later. The parallax generator 612 generates a parallax of a parallax image displayed on the image display unit 611 by utilizing the lens effect of this liquid lens.

Specifically, in the image display device 601 of FIG. 43, the image display unit 611 two-dimensionally displays a parallax image, and the parallax generator 612, which is so provided that the liquid lenses are matched with the respective pixels of the image display unit 611, generates a parallax of this parallax image. Thus, for a user who views the parallax image two-dimensionally displayed on the image display unit 611 via the parallax generator 612, this parallax image looks as not the original parallax image but an image whose contents changes depending on the viewpoint. That is, a parallax is generated.

Due to such a parallax, for example, an image can be three-dimensionally displayed by causing the left and right eyes of a user to see images from angles different from each other. Furthermore, for example, it is also possible to allow a user who views the screen from the right front side and a user who views it from the left front side to see images different from each other. It is obvious that the image display device 601 can generate a parallax not only in the horizontal direction but also in any direction such as the vertical direction and an oblique direction.

Figure 44:
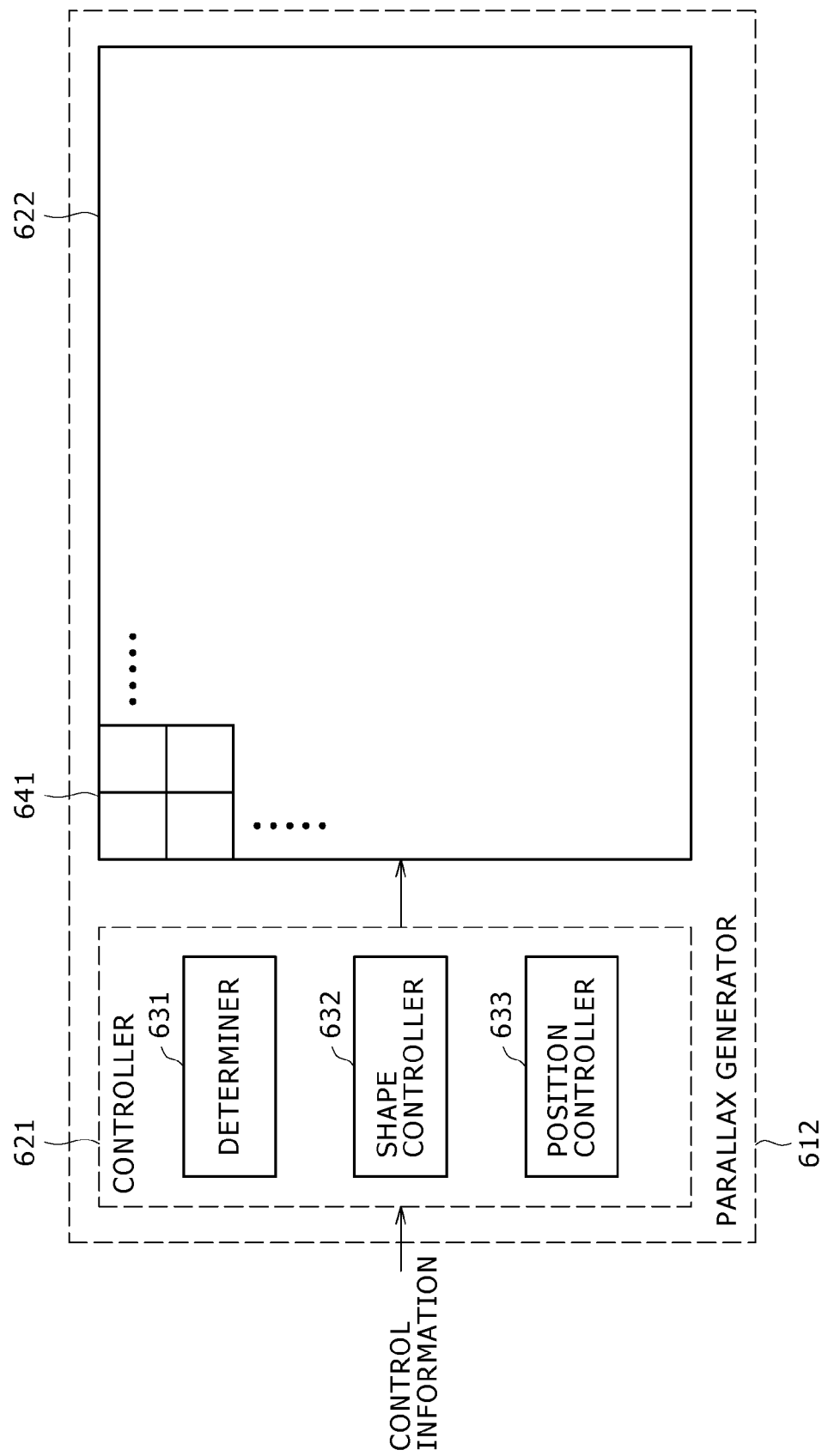
FIG. 44 is a diagram showing a configuration example of a parallax generator 612.

FIG. 44 is a diagram showing a detailed configuration example of the parallax generator 612 of FIG. 43.

The parallax generator 612 has a controller 621 and an optical path controller 622. The controller 621 is a processor that controls the optical path controller 622 and executes control processing relating to generation of a parallax of a parallax image displayed on the image display unit 611, based on the control information supplied from the external. The controller 621 has a determiner 631, a shape controller 632, and a position controller 633. The determiner 631 carries out various kinds of determinations. The shape controller 632 executes control processing relating to the shape of a nonpolar liquid of the liquid lens, and the position controller 633 executes control processing relating to the position (change) of this nonpolar liquid.

The determiner 631, the shape controller 632, and the position controller 633 denote the functions possessed by the controller 621, and are so configured as to be capable of giving and receiving information with each other or with the external in practice.

The optical path controller 622 controls the optical path of light emitted from the image display unit 611. Specifically, the optical path controller 622 generates a parallax of a parallax image displayed on the image display unit 611. The optical path controller 622 has plural liquid lenses 641 disposed in an array manner (in a planar manner) on a flat surface opposed to the display surface of the parallax image, of the image display unit 611. Each of the liquid lenses 641 is an optical element that controls the optical path of passing light by utilizing the interface of a liquid and is so disposed as to correspond to plural pixels different from each other in the image display unit 611. Specifically, the respective liquid lenses 641 are so provided as to be opposed to plural light emitting pixels (groups of light emitting pixels different from each other for each liquid lens 641) of the image display unit 611, and are so configured that light emitted from these light emitting pixels passes through the liquid lens 641. This liquid lens 641 is a liquid displacing device that displaces the position of a liquid to thereby control the optical path of transmission light, as described later.

Figure 45:
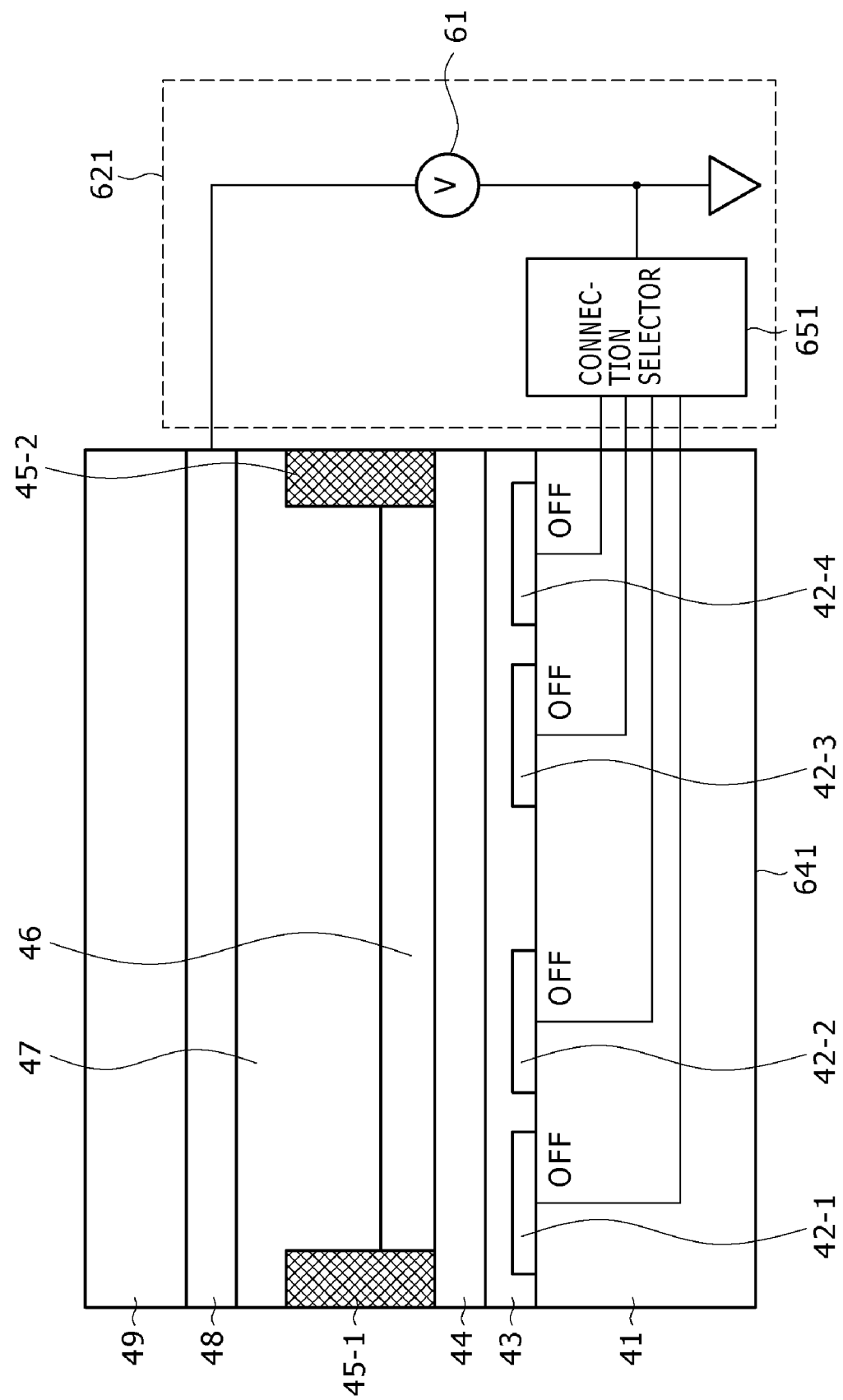
FIG. 45 is a diagram showing a configuration example of a liquid lens.

FIG. 45 is a diagram showing a detailed configuration example of the liquid lens 641 of FIG. 44, and is a schematic diagram showing a configuration example on a section obtained when the liquid lens 641 is cut along the light passage direction. This liquid lens 641 is the application of the liquid device 31, to which the present invention is applied, described with reference to FIG. 2, and has the same configuration as that of the liquid device 31 basically. Specifically, as with the liquid device 31, the liquid lens 641 has the lower substrate 41, the lower electrode 42, the insulating film 43, the water-repellent film 44, the rib 45-1, the rib 45-2, the nonpolar liquid 46, the polar liquid 47, the upper electrode 48, and the upper substrate 49. However, in the case of this liquid lens 641, the nonpolar liquid 46 is not colored but a colorless, transparent liquid is applied thereto. It is preferable that the polar liquid 47 and the nonpolar liquid 46 be not mixed with each other and have refractive indexes greatly different from each other, and both have low viscosity.

Furthermore, the lower electrode 42 is subjected to patterning and is configured as four line electrodes from a lower electrode 42-1 to a lower electrode 42-4. Hereinafter, if there is no need to make a description with distinguishing among the lower electrodes 42-1 to 42-4, they will be referred to as the lower electrode 42. In FIG. 45, the respective lower electrodes 42 are shown equally with a large size for convenience of description. However, the respective widths of the lower electrodes 42-1 to 42-4 are any, and the widths may be identical to each other or may be different from each other. In general, the respective widths of the lower electrodes 42 are frequently smaller than those in the example shown in FIG. 45 compared with the length between the rib 45-1 and the rib 45-2. Furthermore, in many cases, the lower electrode 42-1 and the lower electrode 42-2 are disposed near the rib 45-1, and the lower electrode 42-3 and the lower electrode 42-4 are disposed near the rib 45-2. That is, the respective lower electrodes 42 are frequently so disposed that the interval between the lower electrode 42-2 and the lower electrode 42-3 is longer than the other intervals between the lower electrodes.

Each of the lower electrodes 42-1 to 42-4 is coupled to a connection selector 651 of the controller 621. As shown in FIG. 45, the controller 621 has, for each liquid lens 641, the functions of the power supply 61 for applying any voltage between the lower electrode 42 and the upper electrode 48 and the connection selector that selects the electrode to which the voltage by the power supply 61 is applied from the lower electrodes 42-1 to 42-4 and connects the selected electrode to the power supply 61.

In practice, the controller 621 has the same functions for each of the liquid lenses 641 and therefore has a more complex configuration. However, the following description will be so made that the controller 621 has the power supply 61 and the connection selector 651 for simplification of description.

As shown in FIG. 45, one electrode of the power supply 61 is connected to the upper electrode 48, and the other electrode is connected to one electrode of the connection selector 651. The other electrode of the connection selector 651 is composed of plural electrodes, and each of the electrodes is connected to any one of the lower electrodes 42-1 to 42-4. That is, when one electrode is selected from the lower electrodes 42-1 to 42-4 and electrically connected to the power supply 61 by the connection selector 651, any voltage set in the power supply 61 is applied between the lower electrode 42 and the upper electrode 48.

As with the liquid device 31 described with reference to FIG. 2, due to this voltage application, the wettability of the polar liquid 47 to the water-repellent film 44 changes, so that the polar liquid 47 is so deformed (moved) as to aggregate around the lower electrode 42 to which the voltage is applied. Due to the deformation of the polar liquid 47, the nonpolar liquid 46 is pushed and deformed (moved). As a result, the interface between the nonpolar liquid 46 and the polar liquid 47 is deformed, which changes the optical path (the emission direction) of transmission light that passes through this liquid lens 641 upward along the vertical direction in FIG. 45. Although the details of the operation of this liquid lens 641 will be described later, the liquid lens 641 can control the emission direction of the transmitted light based on this deformation of the interface between the nonpolar liquid 46 and the polar liquid 47.

In the liquid lens 641 shown in FIG. 45, no voltage is applied to any of the lower electrodes 42-1 to 42-4 (all of the lower electrodes are in the OFF-state). At this time, the interface between the nonpolar liquid 46 and the polar liquid 47 is in a flat surface manner, which causes the liquid lens 641 to have no influence on transmission light that passes therethrough along the vertical direction in the diagram.

Figure 46:
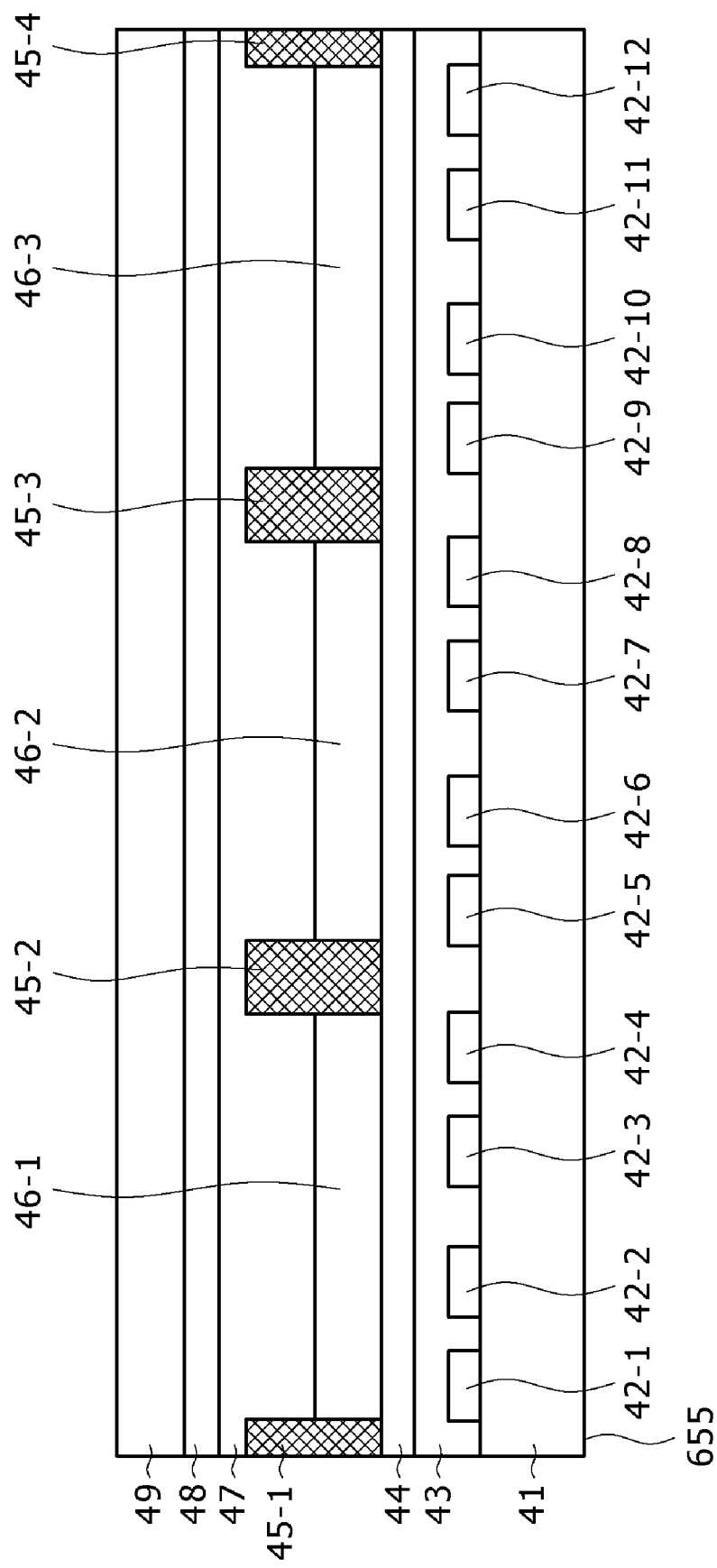
FIG. 46 is a diagram showing a configuration example of a liquid lens array.

In practice, this liquid lens 641 is formed as a liquid lens array 655 in which plural liquid lenses are arranged in an array manner (in a planar manner) as shown in FIG. 46. At this time, as shown in FIG. 46, the components that can be shared by plural liquid lens arrays, such as the lower substrate 41, the insulating film 43, the water-repellent film 44, the polar liquid 47, the upper electrode 48, and the upper substrate 49, are each formed as one component.

Next, the operation of the liquid lens 641 will be described with reference to FIGS. 47 to 50.

Figure 47:
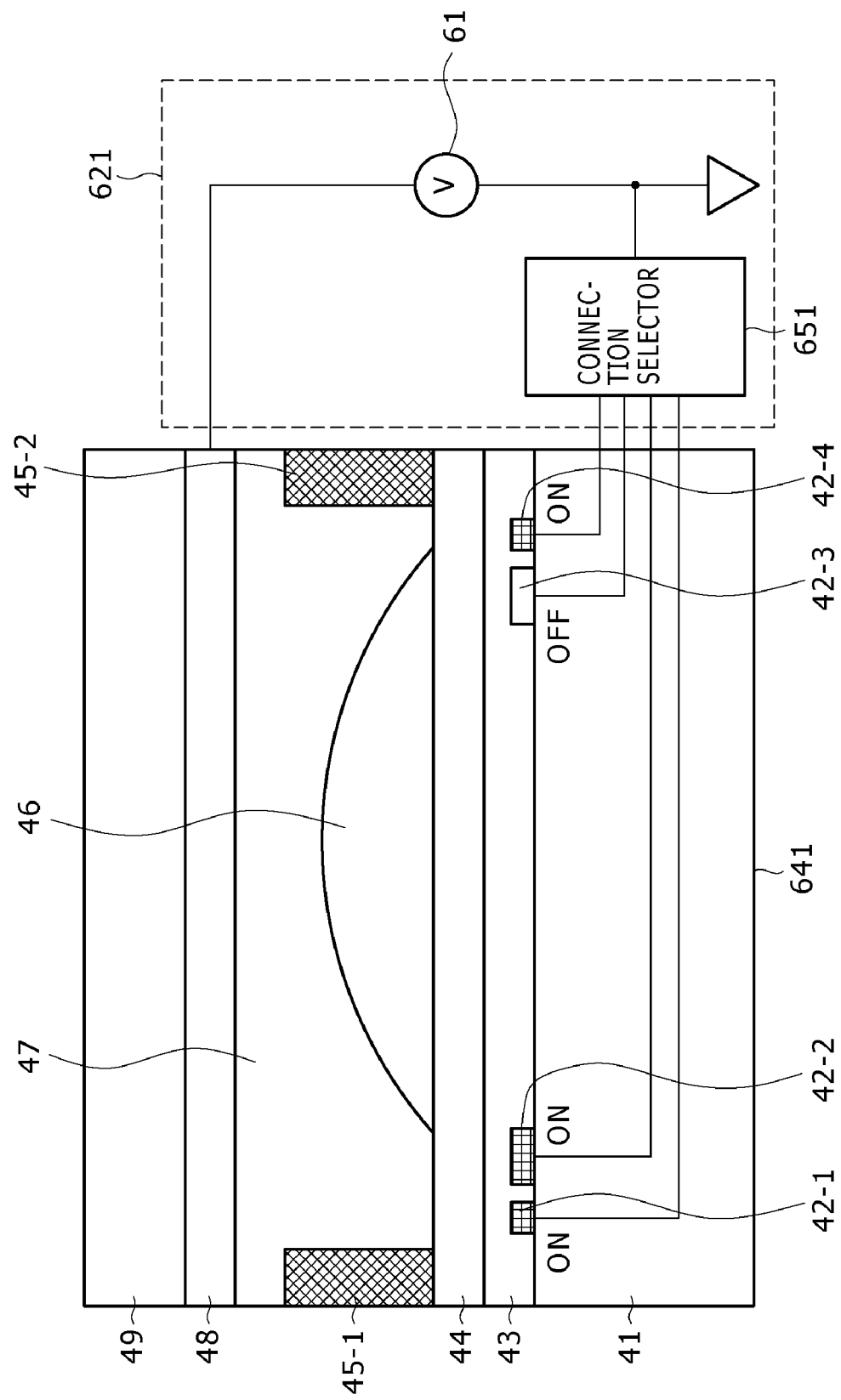
FIG. 47 is a diagram showing an example of the movement of a nonpolar liquid.
Figure 49:
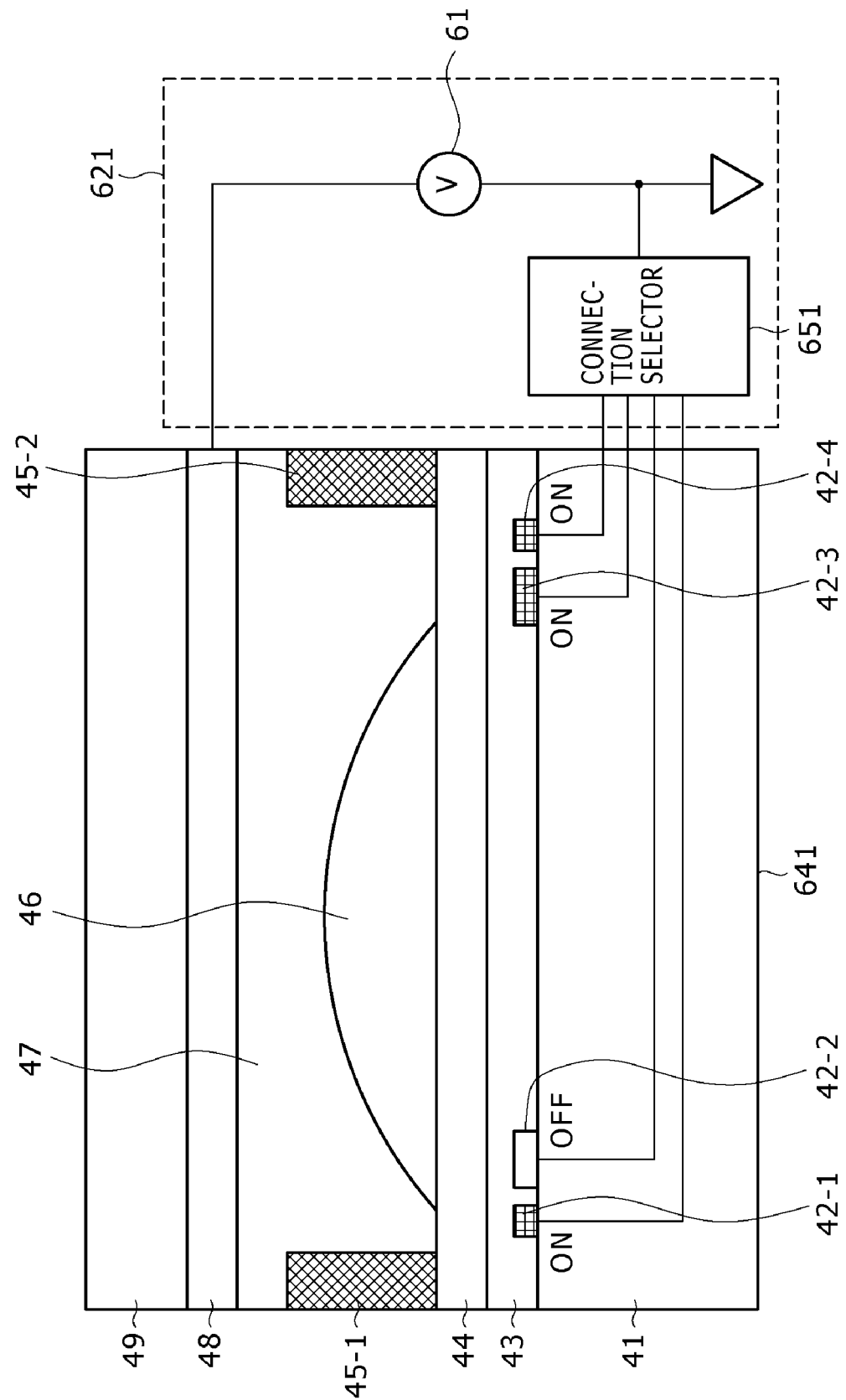
FIG. 49 is a diagram showing an example of the movement of the nonpolar liquid.

As shown in FIG. 45, the interface between the nonpolar liquid 46 and the polar liquid 47 is flat in the state in which no voltage is applied to any of the lower electrodes 42-1 to 42-4. However, as shown in FIGS. 47 and 49, if the connection selector 651 connects any of the lower electrodes 42-1 to 42-4 to the power supply 61 and applies voltage between the lower electrode 42 and the upper electrode 48, the interface between the nonpolar liquid 46 and the polar liquid 47 is curved to become a lens state depending on the positions of the lower electrodes 42, the magnitude of the applied voltage, and so on. At this time, due to the difference in the refractive index between the nonpolar liquid 46 and the polar liquid 47, the optical path of transmission light that passes through the curved interface changes.

Specifically, in the state of FIG. 45, most of the transmission light passes through the interface between the nonpolar liquid 46 and the polar liquid 47 perpendicularly to the interface, and therefore the optical path thereof is hardly affected. Thus, most of the transmitted light of the liquid lens 641 is emitted from the liquid lens 641 substantially perpendicularly to the upper surface of the upper substrate 49.

On the other hand, as shown in FIGS. 47 and 49, if voltage is applied between the lower electrode 42 and the upper electrode 48, the interface between the nonpolar liquid 46 and the polar liquid 47 is curved to become a lens state. Therefore, the optical path of most of the transmission light of the liquid lens 641 is refracted and the refracted light is emitted from the liquid lens 641 in a direction that is not perpendicular to the upper surface of the upper substrate 49.

Furthermore, the emission direction of this transmitted light is controlled based on what magnitude of the voltage is applied to which of the lower electrodes 42-1 to 42-4 by the connection selector 651 and the power supply 61. Specifically, the controller 621 controls the magnitude of the applied voltage and which lower electrode 42 to select as the voltage application target, and thereby can control the position to which the nonpolar liquid 46 is contracted and the degree of the contraction. Thereby, the controller 621 can control the emission direction of the transmitted light.

FIG. 47 shows an example of the case in which the nonpolar liquid 46 is contracted to the right side part of the liquid lens 641 in the diagram. In FIG. 47, the connection selector 651 connects the lower electrode 42-1, the lower electrode 42-2, and the lower electrode 42-4 to the power supply 61, and these electrodes are in the "ON" state. That is, the voltage set in the power supply 61 is applied between the lower electrode 42-1, the lower electrode 42-2, and the lower electrode 42-4 and the upper electrode 48. On the other hand, the connection selector 651 does not connect the lower electrode 42-3 to the power supply 61 but opens the connection path therebetween. That is, the lower electrode 42-3 is in the "OFF" state, and the voltage by the power supply 61 is not applied between the lower electrode 42-3 and the upper electrode 48.

If the voltage by the power supply 61 is thus applied between the lower electrode 42-1, the lower electrode 42-2, and the lower electrode 42-4 and the upper electrode 48, polarization charges are generated in the electric field direction in the water-repellent film 44 (and the insulating film 43) in the vicinity of the lower electrode 42-1, the lower electrode 42-2, and the lower electrode 42-4, and charges are accumulated in the surfaces of the near water-repellent film 44 (and the insulating film 43), so that a so-called charge double layer state is obtained. The polar liquid 47 has polarity, and therefore approaches the water-repellent film 44 in the vicinity of the lower electrode 42-1, the lower electrode 42-2, and the lower electrode 42-4 due to Coulomb's force. That is, the polar liquid 47 gets closer to the vicinity of the water-repellent film 44 near the lower electrode 42-1, the lower electrode 42-2, and the lower electrode 42-4. On the other hand, such force is not generated for the nonpolar liquid 46 because it is nonpolar. Therefore, the nonpolar liquid 46 in the vicinity of the water-repellent film 44 near the lower electrode 42-1, the lower electrode 42-2, and the lower electrode 42-4 is pushed out by the polar liquid 47, and aggregates, in a droplet state, near the water-repellent film 44 in the vicinity of the lower electrode 42-3, to which no voltage is applied with respect to the upper electrode 48. Thus, the interface between the nonpolar liquid 46 and the polar liquid 47 becomes a lens state.

That is, as a result, the positions, in the horizontal direction in the diagram, of the interface between the nonpolar liquid 46 and the polar liquid 47 near the water-repellent film 44 are in the vicinity of the end of the lower electrode 42-2 closer to the lower electrode 42-3 and in the vicinity of the end of the lower electrode 42-4 closer to the lower electrode 42-3 as shown in FIG. 47. That is, the nonpolar liquid 46 is contracted, in a droplet state, to the part to which no voltage is applied near the water-repellent film 44.

At this time, the interface between the nonpolar liquid 46 and the polar liquid 47 refracts the optical path of light emitted from the image display unit 611 (light passing through the liquid lens 641) due to the difference in the refractive indexes between two liquids and the interfacial shape. Thus, the liquid lens 641 actually generates a parallax of a parallax image as described later.

The curvature of this interface may be so adjusted in advance that the refractive index of the passing light becomes the optimum based on the refractive indexes of the nonpolar liquid 46 and the polar liquid 47. Specifically, not only the materials, sizes, shapes, and so on of the respective components included in the liquid lens 641 but also the voltage applied between the electrodes may be so decided in advance or timely that the refractive index of the passing light becomes the optimum.

Figure 48:
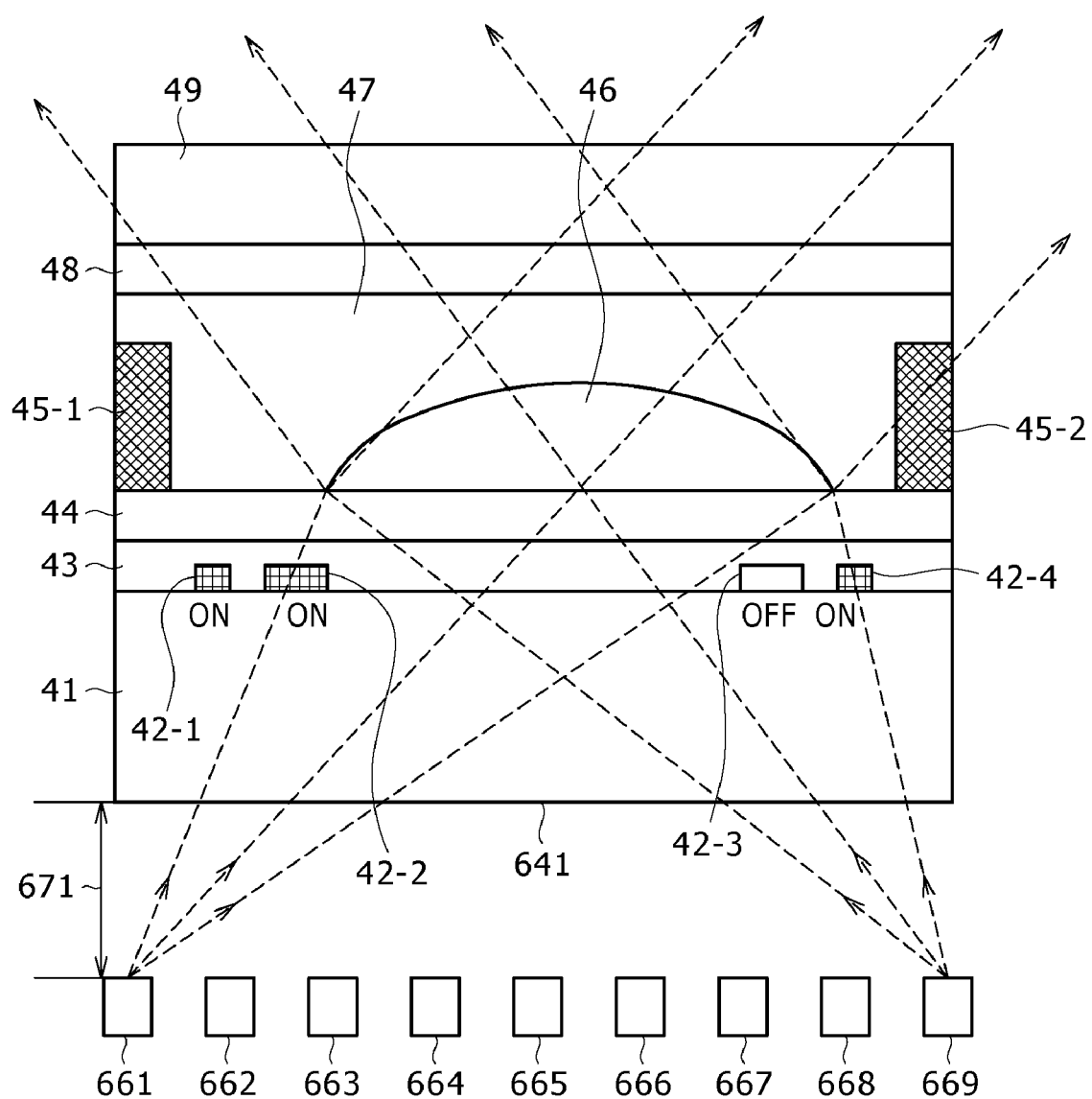
FIG. 48 is a diagram for explaining optical paths of transmission light.

FIG. 48 shows an example of optical paths in the state of FIG. 47. In FIG. 48, the liquid lens 641 is so disposed that light (visual information) emitted from light emitting pixels 661 to 669 of the image display unit 611 enter the liquid lens 641. At this time, the light (visual information) emitted from the light emitting pixels 661 to 669 of the image display unit 611 is a light ray for three-dimensional displaying (an image including a parallax image). Furthermore, the light emitting pixels 661 to 669 are provided distantly from the liquid lens 641 by the focal length of the nonpolar liquid 46 (the distance indicated by double arrowheads 671) in consideration of the lens characteristics of the nonpolar liquid 46.

The light emitted from the light emitting pixels 661 to 669 (i.e. the light that passes through the liquid lens 641) is refracted depending on the shape of the interface between the nonpolar liquid 46 and the polar liquid 47 and is emitted from the liquid lens 641. For example, in the case of FIG. 48, if the light emitting pixel 661 is employed as a point light source, the light that is emitted from the light emitting pixel 661 and is emitted from the liquid lens 641 via the interface between the nonpolar liquid 46 and the polar liquid 47 is ideally collimated light that travels in the direction from the light emitting pixel 661 to the center of the nonpolar liquid 46 in the droplet state. Similarly, for example, if the light emitting pixel 669 is employed as a point light source, the light that is emitted from the light emitting pixel 669 and is emitted from the liquid lens 641 via the interface between the nonpolar liquid 46 and the polar liquid 47 is ideally collimated light that travels in the direction from the light emitting pixel 669 to the center of the nonpolar liquid 46 in the droplet state. In this manner, the liquid lens 641 can emit the respective light beams emitted from the light emitting pixels 661 to 669 as light beams that travel in directions different from each other. At this time, the liquid lens 641 can emit the passing light as collimated light or light close to collimated light ideally.

FIG. 49 shows an example of the case in which the nonpolar liquid 46 is moved to the left side of the liquid lens 641 in the diagram, in contrast to the case shown in FIG. 47. In FIG. 49, the connection selector 651 connects the lower electrode 42-1, the lower electrode 42-3, and the lower electrode 42-4 to the power supply 61, and these electrodes are in the "ON" state. On the other hand, the connection selector 651 does not connect the lower electrode 42-2 to the power supply 61 but opens the connection path therebetween ("OFF" state).

As with the case of FIG. 47, Coulomb's force is generated for the polar liquid 47 due to the voltage application. Therefore, the nonpolar liquid 46 in the vicinity of the water-repellent film 44 near the lower electrode 42-1, the lower electrode 42-3, and the lower electrode 42-4 is pushed out by the polar liquid 47, and aggregates, in a droplet state, near the water-repellent film 44 in the vicinity of the lower electrode 42-3, to which no voltage is applied with respect to the upper electrode 48. Thus, the interface between the nonpolar liquid 46 and the polar liquid 47 becomes a lens state.

That is, as a result, the positions, in the horizontal direction in the diagram, of the interface between the nonpolar liquid 46 and the polar liquid 47 near the water-repellent film 44 are in the vicinity of the end of the lower electrode 42-1 closer to the lower electrode 42-2 and in the vicinity of the end of the lower electrode 42-3 closer to the lower electrode 42-2 as shown in FIG. 49. That is, the nonpolar liquid 46 is contracted, in a droplet state, to the part to which no voltage is applied near the water-repellent film 44.

Figure 50:
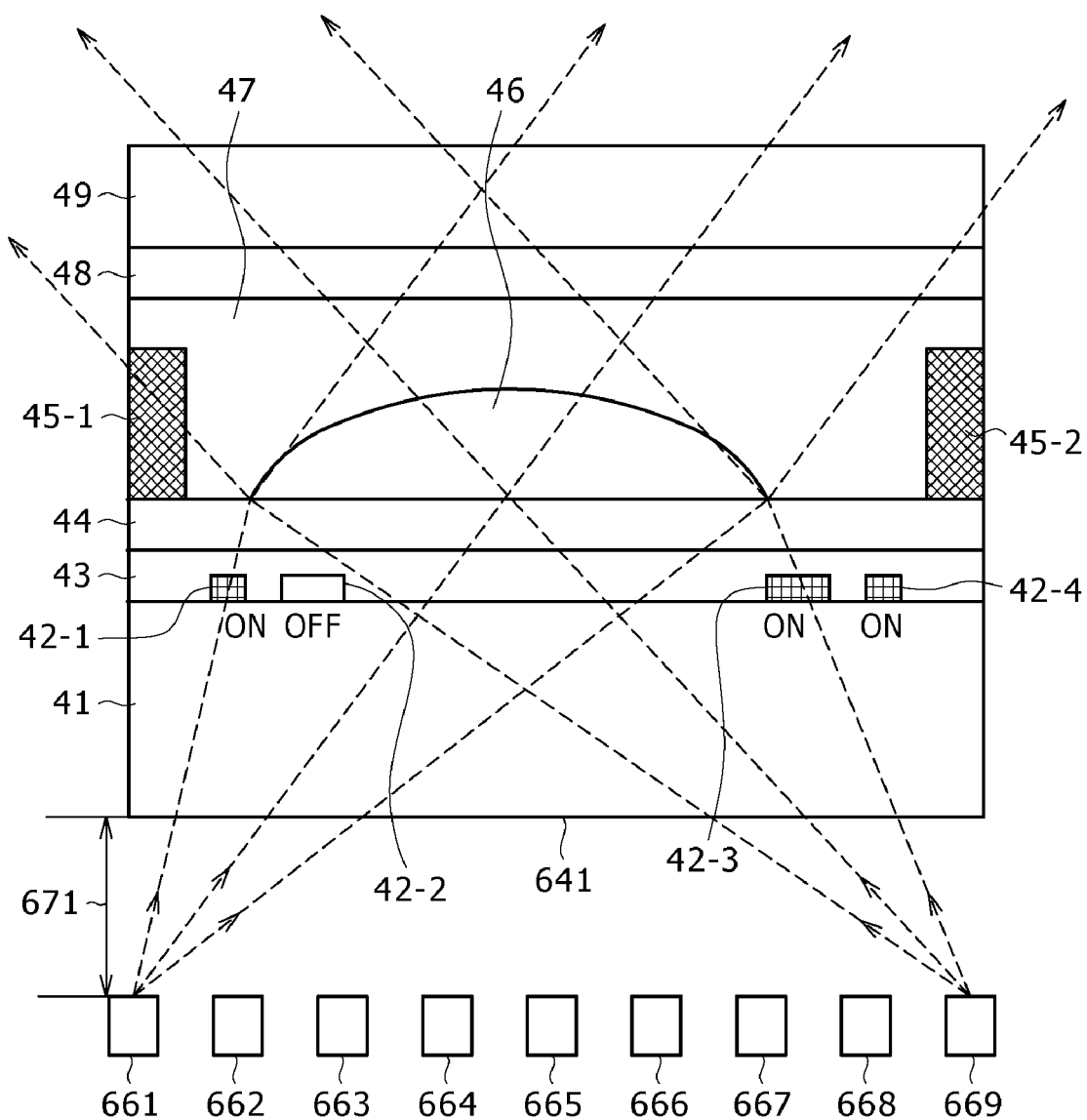
FIG. 50 is a diagram for explaining optical paths of transmission light.

Therefore, as shown in FIG. 50, the light emitted from the light emitting pixels 661 to 669 (i.e. the light that passes through the liquid lens 641) is refracted depending on the shape of the interface between the nonpolar liquid 46 and the polar liquid 47 and is emitted from the liquid lens 641 as with the case of FIG. 48. For example, in the case of FIG. 50, if the light emitting pixel 661 is employed as a point light source, the light that is emitted from the light emitting pixel 661 and is emitted from the liquid lens 641 via the interface between the nonpolar liquid 46 and the polar liquid 47 is ideally collimated light that travels in the direction from the light emitting pixel 661 to the center of the nonpolar liquid 46 in the droplet state. Similarly, for example, if the light emitting pixel 669 is employed as a point light source, the light that is emitted from the light emitting pixel 669 and is emitted from the liquid lens 641 via the interface between the nonpolar liquid 46 and the polar liquid 47 is ideally collimated light that travels in the direction from the light emitting pixel 669 to the center of the nonpolar liquid 46 in the droplet state.

Between the case of FIG. 50 and the case of FIG. 48, the position of the nonpolar liquid 46 differs from each other.

Therefore, the emission direction of the light that passes through the liquid lens 641 differs from each other. Specifically, as shown in FIG. 47 (FIG. 48) and FIG. 49 (FIG. 50), the connection selector 651 selects the lower electrode 42 to which the voltage is applied with respect to the upper electrode 48, and thereby can control the position of the nonpolar liquid 46. Specifically, the connection selector 651 can vary the position of the nonpolar liquid 46 by switching the lower electrode 42 to which the voltage is applied with respect to the upper electrode 48 e.g. in synchronization with an integral multiple of a synchronization signal of a displayed parallax image. This varies the emission direction of light emitted from the liquid lens 641. That is, the liquid lens 641 can emit light beams emitted from one light emitting pixel in plural directions. In other words, the parallax generator 612 increases the number of parallaxes generated by the respective liquid lenses 641, and can even increase the number of parallaxes of a parallax image displayed on the image display unit 611 to a value larger than the number of parallaxes originally set for the parallax image.

In FIGS. 47 and 49, the connection selector 651 selects the lower electrode 42 that is to be set to the "ON" state. This selection depends on control results by both the shape controller 632 and the position controller 633 in the controller 621.

Furthermore, it is also possible to utilize such a method for increasing the number of parallaxes and three-dimensionally display a normal two-dimensional image by the IP method.

Although the light emitting pixels 661 to 669 are shown in FIGS. 48 and 50, the number of light emitting pixels allocated to one liquid device (the number of light emitting pixels whose emission light is allowed to pass through one liquid device) is any, and this number may be equal to or smaller than eight or may be equal to or larger than ten.

As above, the liquid device 31, to which the present invention is applied, can be utilized also as a liquid displacing device that displaces the position of the nonpolar liquid 46.

Experiments were performed as follows on the liquid lens 641 as such a liquid displacing device.

The configuration of the liquid displacing device as the experiment subject is basically the same as that of the liquid lens 641 shown in FIG. 45 in all of examples. However, in "Comparative example 2" as the reference, the configuration of the conventional liquid device, which does not have the insulating film 43 but has only the water-repellent film 44, is employed.

An example of the respective conditions is set as shown in the table of FIG. 51. Specifically, the film thickness of the water-repellent film 44 in the liquid displacing device of "Comparative example 2" as the reference is set to 800 nm, whereas the insulating film 43 is not formed. On the other hand, for each of the liquid displacing devices of "Working example 6" and "Working example 7," the film thickness of the insulating film 43 is set to 100 nm and the film thickness of the water-repellent film 44 is set to 150 nm.

The gap between the electrodes as the interval between the lower electrode 42 and the upper electrode 48 is set to 100 μm in all of the cases of "Comparative example 2," "Working example 6," and "Working example 7." Furthermore, the rectangular-wave amplitude voltage applied between the lower electrode 42 and the upper electrode 48 is set to 20 V in the case of "Comparative example 2," set to 10 V in the case of "Working example 6," and set to 15 V in the case of "Working example 7."

Moreover, in all of the cases of "Comparative example 2," "Working example 6," and "Working example 7," the size of one pixel in the liquid displacing device is set to 300 μm square, dodecane is used as the nonpolar liquid 46, and an isolated liquid lens by a dodecane droplet whose φ=250 μm is formed in the area of 300 μm square.

In addition, as the driving waveform applied to this liquid displacing device, a positive single-polarity pulse whose Duty=50% like that shown in FIG. 38 is applied in such a way that the potential of the lower substrate 41, over which the water-repellent film 44 is formed, is employed as the reference potential in all of the cases of "Comparative example 2," "Working example 6," and "Working example 7."

Figure 52:
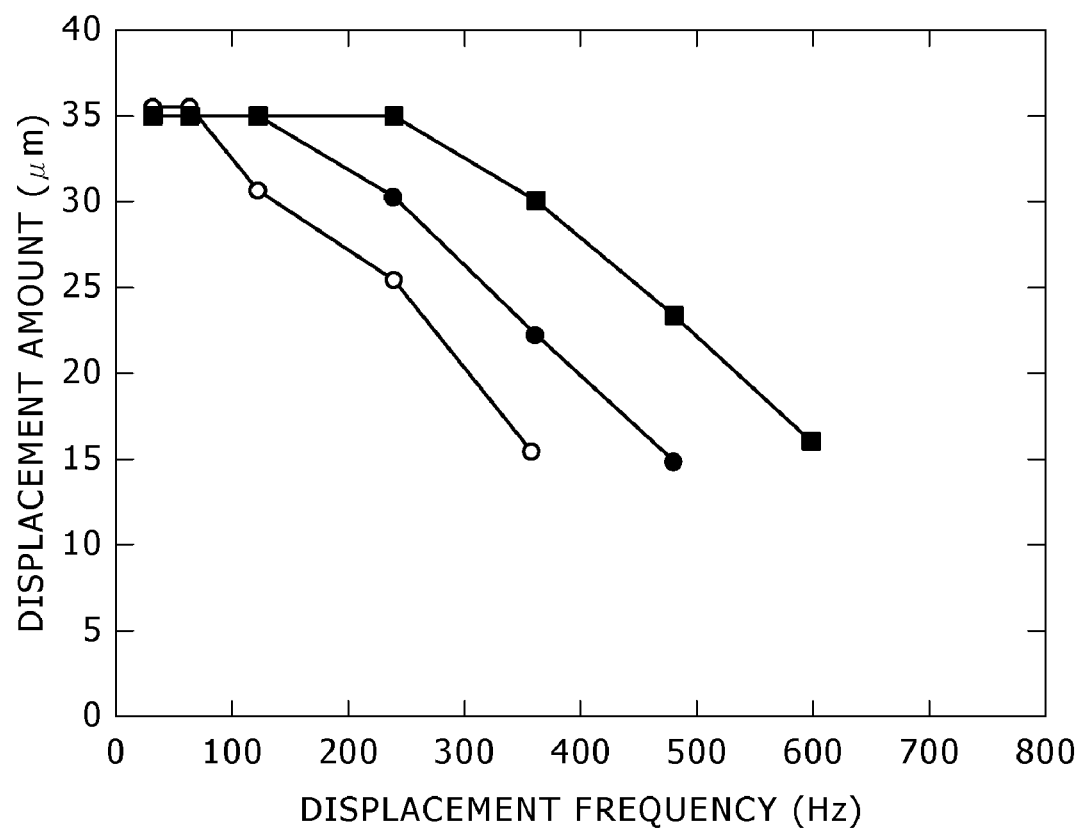
FIG. 52 is a graph for explaining the relationships between the displacement frequency and the displacement amount.

Furthermore, the relationships between the frequency of the pulse wave applied in order to displace the nonpolar liquid 46 (the displacement frequency) and the displacement amount of the nonpolar liquid 46 in all of "Comparative example 2," "Working example 6," and "Working example 7" are shown in the graph of FIG. 52. In all of the cases of "Comparative example 2," "Working example 6," and "Working example 7," the maximum displacement amount defined from the electrode structure is set to 35 μm.

It is preferable that the liquid displacing device displace the liquid to a larger extent with lower potential at higher speed basically.

In FIG. 52, the white circles (○) indicate the relationship between the displacement frequency and the displacement amount of "Comparative example 2," the black circles (●) indicate the relationship between the displacement frequency and the displacement amount of "Working example 6," and the black squares (■) indicate the relationship between the displacement frequency and the displacement amount of "Working example 7."

As shown in the graph of FIG. 52, in the case of "Comparative example 2," the maximum displacement amount of 35 μm, defined from the line electrode structure, can be held until the displacement frequency reaches about 60 Hz. However, if the displacement frequency is further increased, a displacement frequency equal to or higher than 60 Hz decreases the displacement amount. Under the condition of "Comparative example 2," breakdown occurs when the amplitude voltage is about 25 V. If the water-repellent film 44 is further thinned, breakdown occurs more easily. For example, when the film thickness of the water-repellent film 44 is 500 nm, breakdown occurs when the amplitude voltage is about 10 V.

On the other hand, although the amplitude voltage of the pulse is decreased to 10 V in "Working example 6" and to 15 V in "Working example 7," the lowering of the displacement amount is less in the case of "Working example 6" and "Working example 7" than in the case of "Comparative example 2" under the comparison with the same displacement frequency. Furthermore, the occurrence of breakdown is also reduced in the case of "Working example 6" and "Working example 7" compared with the case of "Comparative example 2."

Specifically, also in the case of the utilization as this liquid displacing device, when a double-layered structure with the insulating film 43 and the water-repellent film 44 is employed like in the liquid device of the present invention, the nonpolar liquid 46 can be displaced to a larger degree with lower potential at higher speed compared with the case of the structure with only the water-repellent film 44 like the conventional liquid device. Furthermore, the occurrence of breakdown can also be reduced.

As above, due to the possession of a double-layered structure with the insulating film 43 and the water-repellent film 44, the liquid device 31, to which the present invention is applied, can achieve increase in the capacitance and suppress breakdown in any application example. This allows the lowering of the power consumption and enhancement in the reliability.

Specifically, in the electrooptical element and the element employing electrowetting to which the present invention is applied, an inorganic insulating film that is more excellent in the insulating property is provided for the conventional structure in which both water repellency and electrical insulating property are allowed to function by a water-repellent film solely, and a material having a high relative dielectric constant is applied to the inorganic insulating film. This makes it possible to further decrease the film thickness of the water-repellent film for offering only water repellency, and the capacitance of the double-layer film obtained as a result is increased, which can contribute to a decrease in the voltage of the electrowetting.

The liquid device 31 may be utilized for any application other than the above-described ones. For example, it may be utilized as a liquid lens that controls the focal length and position of transmission light, and it is also possible to utilize it for flow path control of a liquid, a liquid pump, and so on. Also when being utilized as these devices, as with the above-described examples, the liquid device 31, to which the present invention is applied, can achieve increase in the capacitance and suppress breakdown. This allows the lowering of the power consumption and enhancement in the reliability.

Although the description is so made that the liquid device 31 has the nonpolar liquid 46 and the polar liquid 47 in the above, instead of this, the liquid device 31 may have only a polar liquid as shown in FIG. 1 for example.

The above-described series of processing can be executed by hardware, or alternatively can be executed by software. If the above-described series of processing is executed by software, the program forming the software is installed from a network or a recording media.

For example, as shown in FIG. 9, this recording media is formed of the removable media 121 that is distributed separately from the device main body for delivering a program to a user and in which the program is recorded, such as a magnetic disk (encompassing a flexible disk), an optical disk (encompassing a CD-ROM (Compact Disk-Read Only Memory) and a DVD (Digital Versatile Disk)), a magnet-optical disk (encompassing a MD (Mini-Disk) (registered trademark)), or a semiconductor memory. Alternatively, the recording media is formed of a ROM in which the program is recorded, a hard disk included in a storage, or the like that is delivered to a user in the state of being incorporated in the device main body in advance. These configurations are incorporated in the controller 111 for example.

In the present specification, the steps that describe the program recorded in the recording media encompass processing that is not necessarily to be executed in a time-series manner but to be executed in parallel or individually as well as processing that is to be executed in the described order in a time-series manner.

In the above, the configuration described as one device may be divided and be configured as a system composed of plural devices. Furthermore, a configuration other than the above-described ones may be added to the configurations of the respective components obviously. Moreover, a part of the configuration of a certain device or a certain processor may be included in the configuration of another device or processor as long as the configuration and operation as the system and the entire device are substantially the same. That is, embodiments of the present invention are not limited to the above-described embodiments but various changes are possible without departing from the gist of the present invention.

INDUSTRIAL APPLICABILITY

The present invention can be applied to a liquid device.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A liquid device, comprising:
a first electrode and a second electrode between which voltage is applied;
an insulating part that is formed on a surface of said first electrode and structurally insulates said first electrode from said second electrode; and
a liquid that is disposed between said insulating part and said second electrode and has polarity, wherein
an electric field being applied to said insulating part through voltage application between said first electrode and said second electrode to thereby control wettability of a surface of said insulating part to said liquid and cause deformation or displacement of said liquid,
said insulating part is formed of a double-layer structure with a first layer and a second layer,
said first layer is formed between said second layer and the surface of said first electrode and has a higher dielectric property and a higher insulating property than said second layer, and
said second layer is formed between said first layer and said liquid and has higher water repellency than said first layer.

2. said liquid device according to claim 1, wherein
said first electrode is composed of a plurality of electrodes and a surface of a whole of said first electrode is not a flat surface, and
said first layer is so formed that recesses and projections on the surface of the whole of said first electrode are absorbed and a surface of said first layer becomes a flat surface.

3. A liquid device manufacturing apparatus that manufactures a liquid device having a first electrode and a second electrode between which voltage is applied, an insulating part that is formed on a surface of said first electrode and structurally insulates said first electrode from said second electrode, and a liquid that is disposed between said insulating part and said second electrode and has polarity, an electric field being applied to said insulating part through voltage application between said first electrode and said second electrode to thereby control wettability of a surface of said insulating part to said liquid and cause deformation or displacement of said liquid, the liquid device manufacturing apparatus, comprising:
first forming means for forming a first layer having a high dielectric property and a high insulating property as said insulating part on a surface of a transparent substrate on which said first electrode is disposed; and
second forming means for forming a second layer having higher water repellency and a lower dielectric property than said first layer as said insulating part on a surface of said first layer formed by said first forming means.

4. The liquid device manufacturing apparatus according to claim 3, wherein said first forming means forms the first layer by using a spin-coating method in which a film thickness is rendered uniform by utilizing centrifugal force.

5. The liquid device manufacturing apparatus according to claim 3, wherein
if said first electrode is composed of a plurality of electrodes and a surface of a whole of said first electrode is not a flat surface, said first forming means forms said first layer in such a way that recesses and projections on the surface of the whole of said first electrode are absorbed and the surface becomes a flat surface.

6. A liquid device manufacturing method of a liquid device manufacturing apparatus that manufactures a liquid device having a first electrode and a second electrode between which voltage is applied, an insulating part that is formed on a surface of said first electrode and structurally insulates said first electrode from said second electrode, and a liquid that is disposed between said insulating part and said second electrode and has polarity, an electric field being applied to said insulating part through voltage application between said first electrode and said second electrode to thereby control wettability of a surface of said insulating part to said liquid and cause deformation or displacement of said liquid, the liquid device manufacturing method, comprising:
a first forming step of forming a first layer having a high dielectric property and a high insulating property as said insulating part on a surface of a transparent substrate on which said first electrode is disposed; and
a second forming step of forming a second layer having higher water repellency and a lower dielectric property than said first layer as said insulating part on a surface of said first layer formed by treatment of said first forming step.

7. An image display device that displays an image by emitting light, comprising
a liquid device having a first electrode and a second electrode between which voltage is applied, an insulating part that is formed on a surface of said first electrode and structurally insulates said first electrode from said second electrode, and a liquid that is disposed between said insulating part and said second electrode and has polarity, an electric field being applied to said insulating part through voltage application between said first electrode and said second electrode to thereby control wettability of a surface of said insulating part to said liquid and cause deformation or displacement of said liquid, wherein
said insulating part is formed of a double-layer structure with a first layer and a second layer,
said first layer is formed between said second layer and the surface of said first electrode and has a higher dielectric property and a higher insulating property than said second layer,
said second layer is formed between said first layer and said liquid and has higher water repellency than said first layer, and
said light that is emitted is caused to pass through said liquid device, and an amount or direction of said light is controlled based on deformation or displacement of said liquid by said liquid device.

8. The image display device according to claim 7, wherein
said first electrode is composed of a plurality of electrodes and a surface of a whole of said first electrode is not a flat surface, and
said first layer is so formed that recesses and projections on the surface of the whole of said first electrode are absorbed and a surface of said first layer becomes a flat surface.

* * * * *